(12) United States Patent
Murakami et al.

(10) Patent No.: US 6,806,417 B2
(45) Date of Patent: Oct. 19, 2004

(54) CONDUCTIVE THIN FILM SHEET, SHIELD HARNESS AND METHOD OF MANUFACTURING THE SAME

(75) Inventors: Kazuhiro Murakami, Shizuoka (JP); Yoshihiko Watanabe, Shizuoka (JP); Akira Baba, Shizuoka (JP); Tomohiro Ikeda, Shizuoka (JP); Satoshi Saito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/146,033

(22) Filed: May 16, 2002

(65) Prior Publication Data

US 2002/0170729 A1 Nov. 21, 2002

(30) Foreign Application Priority Data

May 18, 2001 (JP) ........................................ 2001-148961

(51) Int. Cl.⁷ ................................................ H01B 7/34
(52) U.S. Cl. ........................................................ 174/36
(58) Field of Search ............................... 428/369, 36.92, 428/34.1, 34.2, 34.3, 34.4, 34.5, 36.1, 35.7, 35.8; 174/36, 105 R, 107, 108, 115

(56) References Cited

U.S. PATENT DOCUMENTS

| | | | | |
|---|---|---|---|---|
| 3,321,572 A | * | 5/1967 | Garner .................... | 174/105 R |
| 3,325,589 A | * | 6/1967 | Mildner ....................... | 174/107 |
| 3,459,877 A | * | 8/1969 | Bullock et al. ............. | 174/107 |
| 3,467,761 A | * | 9/1969 | Plummer ...................... | 174/36 |
| 4,045,607 A | * | 8/1977 | Swearingen et al. ........ | 428/200 |
| 4,150,249 A | * | 4/1979 | Pedersen ...................... | 174/36 |
| 4,323,721 A | * | 4/1982 | Kincaid et al. ................ | 174/36 |
| 4,327,246 A | * | 4/1982 | Kincaid ........................ | 174/36 |
| 4,453,031 A | * | 6/1984 | Justiss .......................... | 174/36 |
| 4,737,598 A | * | 4/1988 | O'Connor ..................... | 174/36 |
| 4,800,236 A | * | 1/1989 | Lemke .......................... | 174/36 |
| 5,023,395 A | * | 6/1991 | O'Connor ..................... | 174/36 |
| 5,132,491 A | * | 7/1992 | Mulrooney et al. ........... | 174/36 |
| 5,144,098 A | * | 9/1992 | VanDeusen ................... | 174/36 |
| 5,208,426 A | * | 5/1993 | Kennedy et al. .............. | 174/36 |
| 5,250,753 A | * | 10/1993 | Schneider ..................... | 174/36 |
| 5,268,531 A | * | 12/1993 | Nguyen et al. ................ | 174/36 |
| 5,541,361 A | * | 7/1996 | Friesen et al. ................ | 174/34 |
| 5,584,122 A | * | 12/1996 | Kato et al. .................... | 29/872 |
| 6,247,977 B1 | * | 6/2001 | Tanaka et al. ............. | 439/874 |
| 6,255,584 B1 | * | 7/2001 | Renaud ........................ | 174/36 |
| 6,259,019 B1 | * | 7/2001 | Damilo et al. ................ | 174/36 |
| 6,433,273 B1 | * | 8/2002 | Kenyon et al. ................ | 174/36 |

FOREIGN PATENT DOCUMENTS

| | | | | |
|---|---|---|---|---|
| JP | 05-121139 A | * | 5/1993 | ........... H01R/43/02 |
| JP | 6-150732 | | 5/1994 | |
| JP | 11-31426 | | 2/1999 | |
| JP | 11-353952 | | 12/1999 | |

* cited by examiner

*Primary Examiner*—William H. Mayo, III
(74) *Attorney, Agent, or Firm*—Armstrong, Kratz, Quintos, Hanson & Brooks, LLP

(57) ABSTRACT

A conductor-equipped conductive thin film sheet 1 includes a conductive thin film sheet 2 and a metallic piece 8. The conductive thin film sheet 2 is composed of a conductive layer 4 and an insulating layer 7. The metallic piece 8 is superposed on the insulating layer 7 and is partially bonded to the conductive layer 4 by ultrasonic welding. In this configuration, when the sheet is wound around an electric wire, noise can be surely dissipated. A shield harness using the conductive thin film is also disclosed.

21 Claims, 30 Drawing Sheets

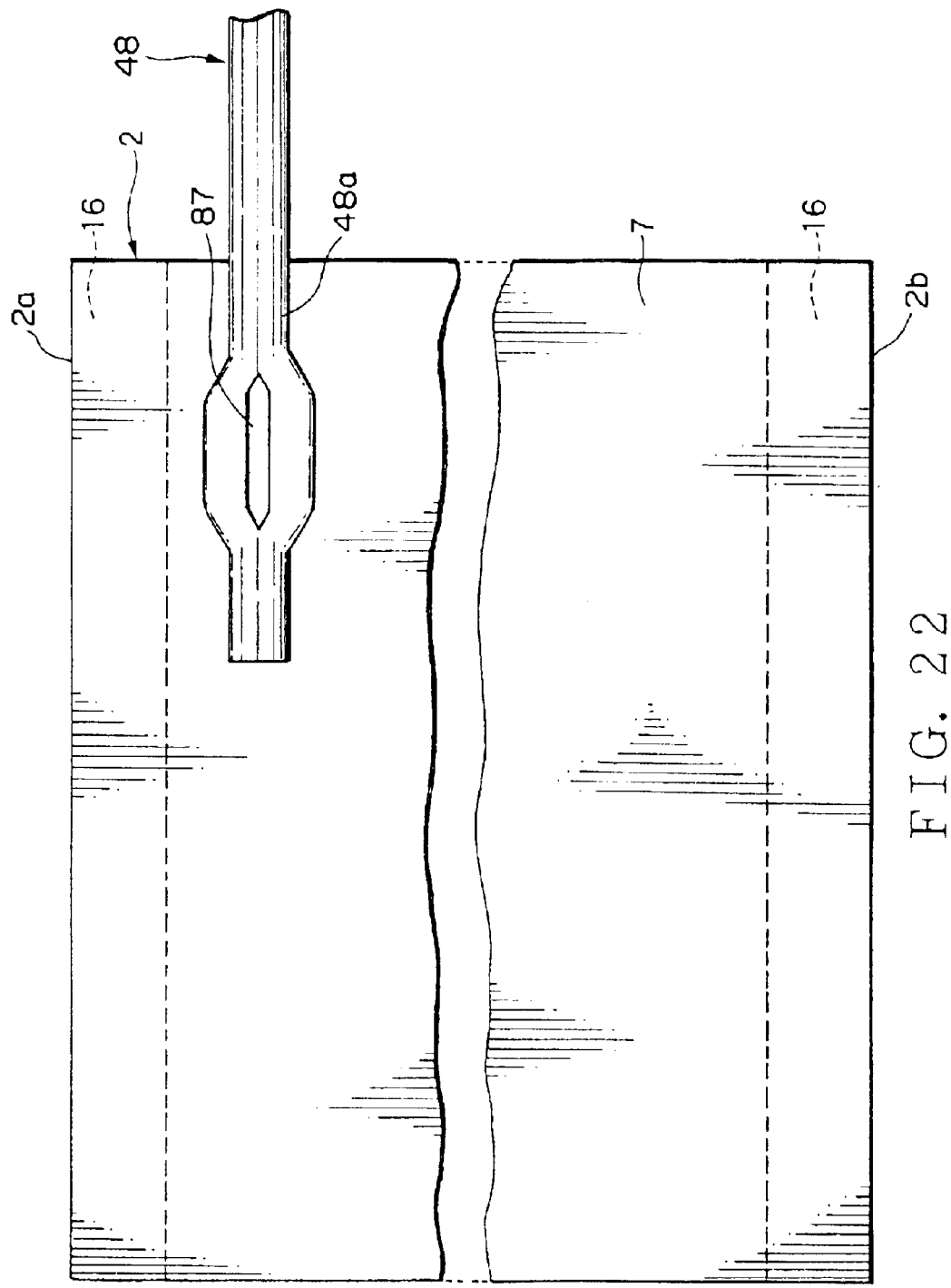

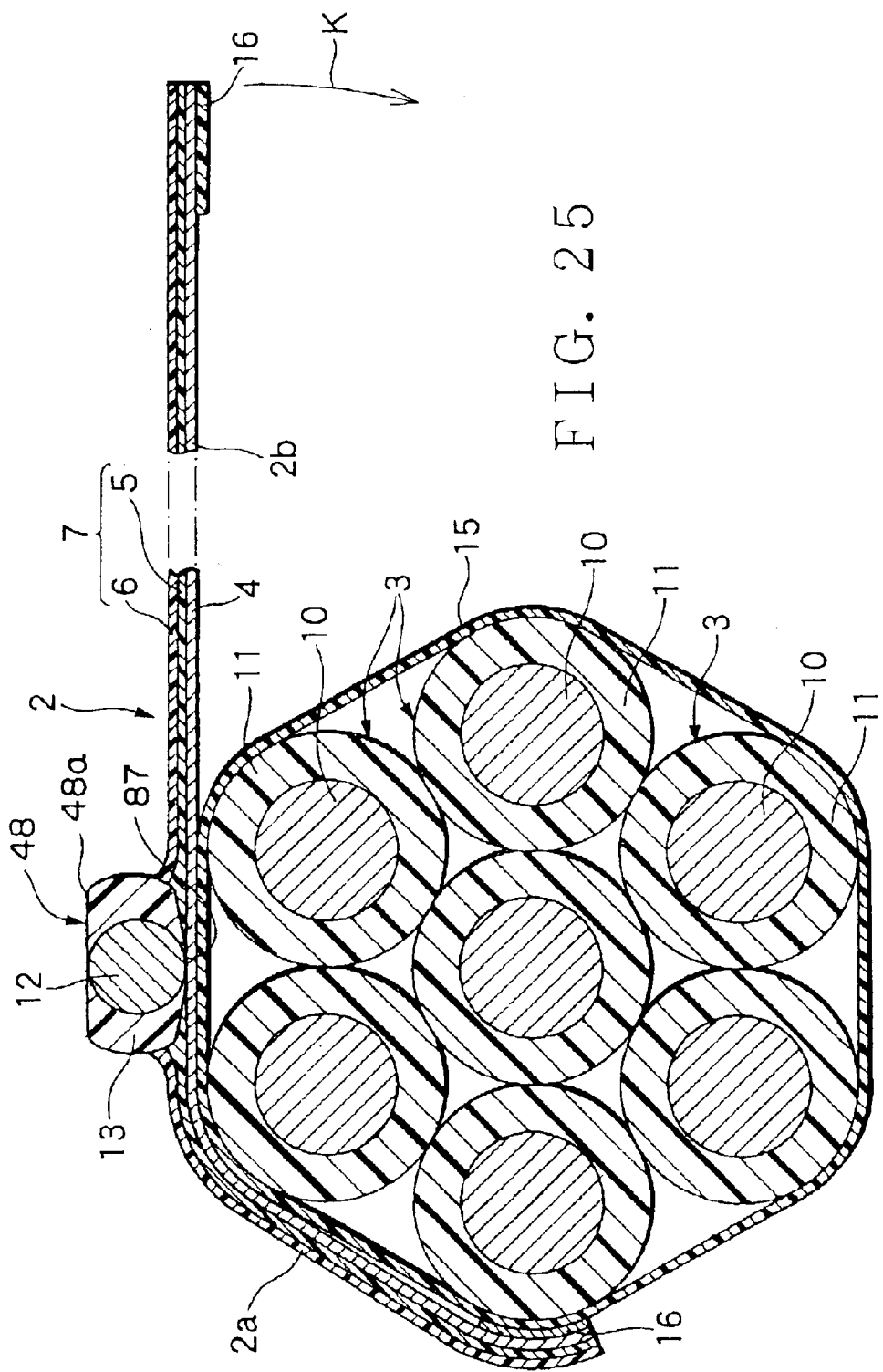

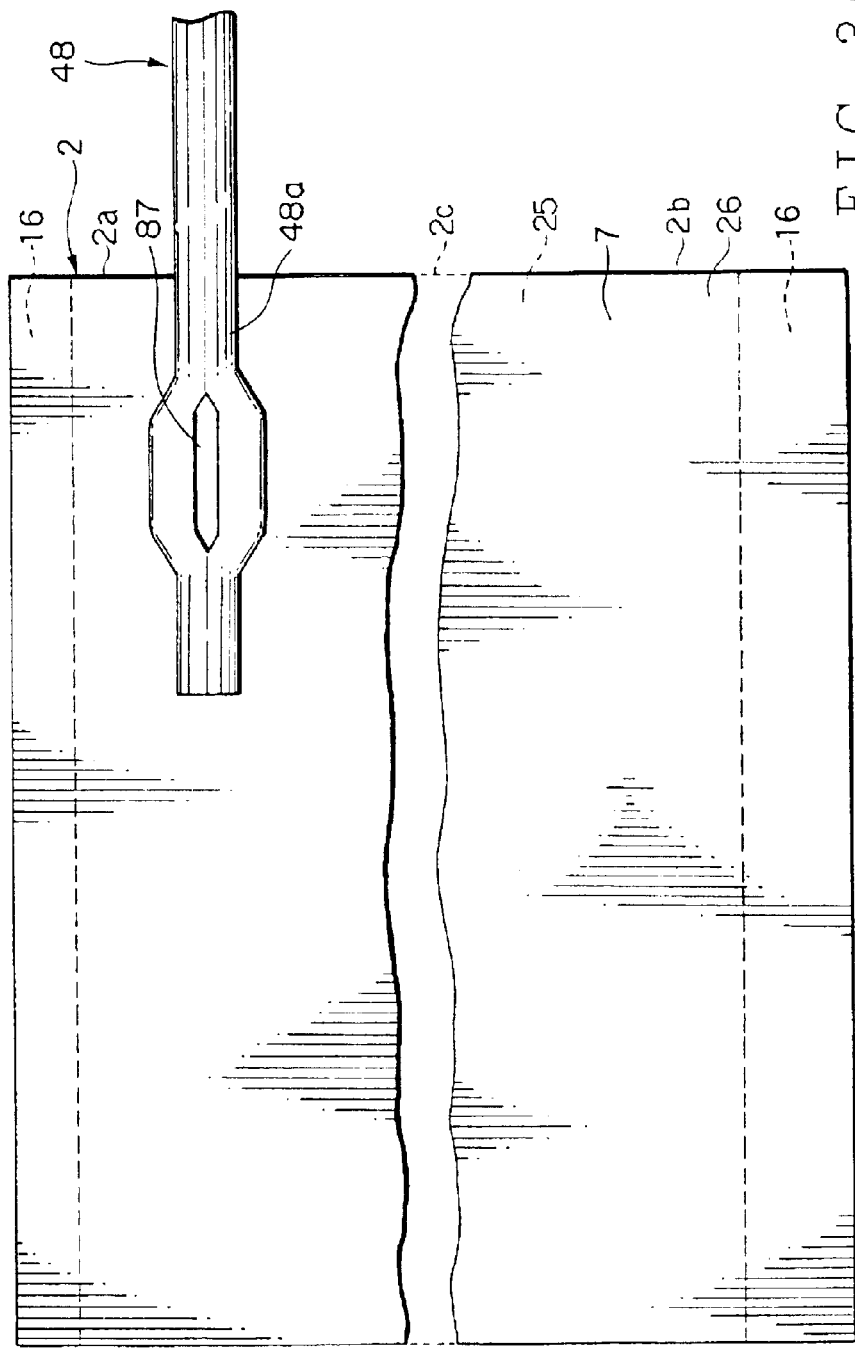

CONDUCTIVE THIN FILM SHEET, SHIELD HARNESS AND METHOD OF MANUFACTURING THE SAME

BACKGROUND OF THE INVENTION

1. Field of the Invention

This invention relates to a conductive thin film sheet, a shield harness and a method of manufacturing the same.

2. Description of the Related Art

A motor car that is a moving body includes a wire harness arranged to supply power from a power source such a battery to electronic appliances such as various lamps and various motors mounted in the motor car, and feed a control signal to these appliances from a control device. The wire harness is composed of a plurality of electric wires.

For example, a shield wire has been used as the electric wire in order to prevent noise from invading its core from the outside. The shield wire includes a shielding potion of braid having conductivity. This shielding portion prevents noise from invading the core.

In recent years, it has been demanded that the above wire harness is manufactured at a low cost.

A proposal therefor is to wind a conductive film sheet having a thin film conductive layer around the outer periphery of electric wires not including the shielding portion. Such a configuration contributes to implementation of low cost and prevention of noise invasion. Meanwhile, in such a configuration also, in order to take out the noise, the conductive layer must be provided with a grounding wire or terminal.

This can be realized in such a manner that a hole is made in the thin film sheet, the end of the grounding wire is passed through the hole and the grounding wire is fixed to the conductive thin film sheet using a washer, bolt, nut, etc. In this case, the conductive thin film sheet must be made thin so that it can be wound around the outer periphery of the electric wires. The conductive layer must be necessarily thin.

Further, equipment of the grounding wire, which requires the washer, bolt, nut, etc., increases the number of components, thus leading to an increase in cost.

In addition, when the bolt and nut are tightened severely, the conductive layer may be broken so that the grounding wire cannot surely connected to the conductive layer. Inversely, when they are tightened loosely, the grounding wire may be disconnected from the conductive layer so that the grounding wire cannot surely connected to the conductive layer. This make it difficult to dissipate noise which tends to invade the core of the electric wire to the outside.

The above proposal will be explained in more detail referring to the drawings.

A shield harness 101 as shown in FIG. 18 is configured so that electric wires 103 with no shielding portion are bunched, and a conductive thin film sheet 102 is wound around the outer periphery of the electric wires 103.

The conductive thin film sheet 102, as seen from FIGS. 19 and 20, is composed of an insulating layer 107, a conductive layer 104 stacked thereon and a double-faced tape 116 with adhesive faces on both sides. The insulating layer 107 is composed of a first insulating layer 105 superposed on the conductive layer 104 and a second insulating layer 106 superposed on the first insulating layer 105. A pair of double-faced tapes 116 are pasted on the surface of the conductive layer 104 at both ends 102a and 102b in the widthwise direction of the conductive thin film sheet 102.

With the one both-sided tape 116 pasted on the outer periphery of the electric wires 103, the conductive thin film sheet 116 is sequentially wound around the outer periphery of the electric wires 103 from the one end 102 with the one both-sided tape 116 pasted thereon toward the other end 102b with the other both-sided tape 116 pasted thereon. Thereafter, the above other both-sided tape 116 is pasted on the conductive thin film sheet 102. Thus, the conductive thin film sheet 102 will be wound around the outer periphery of the electric wires 103. In this configuration, the shield harness 101 realizes implementation of low cost and prevention of noise invasion.

However, the structure of the shield harness 101 as shown in FIG. 18 has the following defect. Namely, in this structure, since the both-sided tapes 116 are pasted on the conductive layer 104, when the conductive thin film sheet 102 is wound around the outer periphery of the electric wires 103, a gap 120 occurs between both ends 102a and 102b where the conductive thin film sheets overlap each other in the neighborhood of the both-sided tapes 116.

Therefore, when the shield harness 101 is wired in the motor vehicle, the conductive thin film sheet 102 may develop wrinkles due to the gap 120. Then, in the neighborhood of the gap 120 and winkles, it is difficult to make sufficient electric shield.

Further, owing to vibration while the vehicle runs, the conductive thin film sheet 102 suffers from repeated flexion in the neighborhood of the gap 120 or wrinkle, the conductive layer 104 may be broken. In such a case, it becomes further difficult to make sufficient electric shield.

SUMMARY OF THE INVENTION

Accordingly, a first object of this invention is to provide a conductive thin film sheet equipped with a conductive which can surely dissipate noise which tends to invade an electric wire when it is wound around the wire, and be manufactured at low cost, and a method of manufacturing the same.

A second object of this invention is to provide a conductive thin film sheet which can surely dissipate noise which tends to invade a wire when it is wound around the wire and be made at low cost.

A third object of this invention is to provide a shield harness using the conductive thin film sheet.

In accordance with the first aspect of this invention, there is provided a conductor-equipped conductive thin film sheet comprising:

a conductive thin film sheet including a conductive layer and an insulating layer stacked on thereon; and a conductive metallic piece bonded onto the conducive layer.

In this configuration, since the metallic piece is bonded to the conductive layer, an increase in the number of components can be prevented. Further, since the metallic piece is bonded to the conductive layer, when the conductive layer is wound around an electric wire, the noise which tends to invade the electric wire can be dissipated outwardly through the conductive layer and metallic layer.

In a preferred embodiment, the conductive thin film sheet is wound around an outer periphery of a plurality of electric wires; and the metallic piece is shaped like a belt and extended in a longitudinal direction circumferentially of of the plurality of electric wires when the conductive thin film sheet is wound around the outer periphery of the plurality of electric wires.

By plastically deforming the metallic piece like a ring, the conductive thin film sheet can be easily wound around the outer periphery of the plurality of electric wires. The conductive thin film sheet thus wound is supported by the metallic piece plastically deformed like the ring.

In a preferred embodiment, the metallic pieces are located at both ends of the conductive thin film sheet, respectively which are spaced apart from each other in the longitudinal direction of the plurality of electric wires when the conductive thin film sheet is wound around the outer periphery of the plurality of electric wires.

Therefore, the metallic piece, when previously deformed plastically like a ring, can be easily fixed to the auxiliary machines in such a manner that tubes are passed inside the metallic pieces. Further, by tightening the metallic piece using a metallic band from outside, the metallic pieces can be surely fixed to the tubes.

In a preferred embodiment, the conductive thin film sheet is wound around the outer periphery of the plurality of electric wires in such a fashion that the conductive layer is located outside and the insulating layer is located outside. This prevents the conductive layer from being exposed and prevents the metallic piece or conductive layer from being short-circuited with another electric wire or electric appliance.

In a preferred embodiment, the metallic piece is superposed on the insulating layer and also partially bonded to the conductive layer.

In this embodiment, as compared with the case where the metallic piece is directly bonded to the conductive layer breakage of the conductive layer can be prevented effectively.

In accordance with this invention, there is also provided a method of manufacturing a conductor-equipped conductive thin film, comprising the step of:

subjecting the insulating layer and the metallic piece superposed on each other to ultrasonic welding so that the conductive layer of the conductive thin film sheet and the metallic piece are bonded to each other.

This method makes it unnecessary to remove a part of the insulating layer when the metallic piece is attached to the conductive thin film sheet. Since the conductive layer and the metallic piece are bonded to each other by ultrasonic welding, when the conductive thin film sheet is wound around the plurality of electric wires, the noise which tends to invade them can be surely dissipated.

In accordance with the second aspect of this invention, there is provided a conductive thin film sheet wound around an electric wire for preventing noise from invading the electric wire, comprising:

an insulating layer;

a conductive adhesive formed on the one principal surface of the insulating layer and at the one end of the insulating layer in a widthwise direction;

a conductive layer stacked on the one principal surface of the insulating layer;

wherein it is wound around the outer periphery of electric wire with the one end covering the other end from outside and the adhesive pasted on the other principal surface of the insulating layer.

In this configuration, since both adhesive and conductive layer are attached to the one surface of the insulating layer, when the conductive sheet is wound around the electric wire, in the vicinity of the adhesive, a gap is difficult to occur at the portion where the conductive sheets overlap each other.

In a preferred embodiment, the conductive layer is extended from an edge of the adhesive on the side of other end in the widthwise direction to the other end of the insulating layer.

Therefore, the gap is difficult to occur between the adhesive and the conductive layer in the widthwise direction. When the conductive sheet is wound around the electric wire, the gap is more difficult to occur.

In a preferred embodiment, the conductive layer has a thickness equal to that of the adhesive. Therefore, the gap is more difficult to occur in the vicinity of the adhesive.

In accordance with the second aspect of this invention, there is also provided a shield harness comprising:

a plurality of electric wires arranged in parallel; and a conductive thin film sheet wound around the outer periphery of the plurality of electric wires to prevent noise from invading them, wherein the conductive thin film sheet includes an insulating layer;

a conductive adhesive formed on the one principal surface of the insulating layer and at the one end of the insulating layer in a widthwise direction;

a conductive layer stacked on the one principal surface of the insulating layer, wherein it is wound around the electric wire with the one end covering the other end from outside and the adhesive pasted on the other surface of the insulating layer.

In this configuration, since both adhesive and conductive layer are attached to the one surface of the insulating layer, when the conductive sheet is wound around the wire, in the vicinity of the adhesive, a gap is difficult to occur at the portion where the conductive sheets overlap each other.

In the above shield harness, preferably, the conductive layer is extended from an edge of the adhesive on the side of other end in the widthwise direction to the other end of the insulating layer.

Therefore, the gap is difficult to occur between the adhesive and the conductive layer in the widthwise direction. When the conductive sheet is wound around the plurality of electric wires, the gap is more difficult to occur.

In the above shield harness, preferably, the conductive layer has a thickness equal to that of the adhesive. Therefore, the gap is more difficult to occur in the vicinity of the adhesive.

In accordance with the third aspect of this invention, there is provided a shield harness comprising:

a plurality of first electric wires arranged in parallel;

a conductive thin film sheet having a conductive layer;

a second electric wire composed of a conductive core and a cladding which clads the core, wherein the plurality of first electric wires are bunched, the conductive layer at one end in the width direction of the conductive thin film sheet and the core of the second electric wire are bonded to each other, and with the one end of the conductive thin film sheet located inside and the other end thereof located outside and both ends superposed on each other, the conductive thin film sheet is wound on an outer periphery of the outer periphery of the plurality of first electric wires.

In this configuration, since the conductive layer of the conductive thin film sheet and core of the second electric wire are bonded to each other, the second electric wire can be used as a drain wire. In this way, since the core of the second electric wire which can be employed as the drain wire and the conductive layer of the conductive thin film sheet are bonded to each other, the core of the second electric wire can be surely electrically connected to the conductive layer.

Further, since the core of the second electric wire and the conductive layer of the conductive thin film sheet are bonded to each other, in order to attach the core of the second electric wire to the conductive thin film sheet, any component which is separate from the conductive thin film sheet and second electric wire is not required. This contribute to prevent the number of components from being increased.

With the one end equipped with the second electric wire being located inside and the other end located outside, both ends are superposed on each other. Therefore, the portion where the core of the second electric wire and the conductive layer are bonded to each other is covered with the above other end, and not exposed.

In a preferred embodiment of the shield harness, the other end is superposed on an outside of the second electric wire. Therefore, the portion where the core of the second electric wire and the conductive layer is not exposed more surely.

In a preferred embodiment of the shield harness, the conductive thin film sheet includes an insulating layer stacked on the conductive layer, and with the conductive layer located inside and insulating layer located outside, the conductive thin film sheet is wound on the outer periphery of the outer periphery of the plurality of first electric wires.

In this configuration, since with the insulating layer located outside, since the conductive thin film sheet is wound on the outer periphery of the outer periphery of the plurality of first electric wires, the conductive layer is prevented from being exposed. Any component such as a protector or tube is not required in order to prevent the conductive layer from being exposed. This contributes to suppress the corrosion of the conductive layer. Since the insulating layer is located outside, it is possible to prevent the core of the second electric wire which is employed as the drain wire from being short-circuited to the other electric wire and electronic appliance outside the shield harness.

In accordance with the third aspect of this invention, there is also provided a method of manufacturing a shield harness comprising the steps of:
  subjecting the insulating layer and the second electric wire superposed on each other to ultrasonic welding so that the conductive layer of the conductive thin film sheet and the core of the second electric wire are bonded to each other; and
  with the conductive layer of the conductive thin film sheet located inside and the insulating layer located outside, winding the thin film conductive sheet on the outer periphery of the outer periphery of the plurality of first electric wires continuously from the one end of the thin film conductive sheet to the other end thereof.

In this method, since the core of the second electric wire and the conductive layer of the conductive thin film sheet are bonded to each other by the ultrasonic welding, in order to attach the core of the second electric wire to the conductive thin film sheet, any component which is separate from the conductive thin film sheet and second electric wire is not required. This contribute to prevent the number of components from being increased.

Further, since the conductive layer and core are bonded to each other by the ultrasonic welding, they can be surely metallic-bonded, and hence surely electrically connected to each other.

The conductive thin film sheet is wound on the outer periphery of the outer periphery of the plurality of first electric wires continuously from the one end of the thin film conductive sheet to the other end thereof. Therefore, the portion where the core of the second electric wire and the conductive layer are bonded to each other is covered with the above other end, and not exposed.

With the insulating layer located outside, since the conductive thin film sheet is wound on the outer periphery of the outer periphery of the plurality of first electric wires, the conductive layer is prevented from being exposed. Any component such as a protector or tube is not required in order to prevent the conductive layer from being exposed. This contributes to suppress the corrosion of the conductive layer.

Since the ultrasonic welding is performed with the second electric wire superposed on the insulating layer, the insulating layer and the cladding are removed from between the conductive layer and the core, it is not necessary to partially remove the insulating layer of the conductive thin film sheet and cladding of the second electric wire.

In accordance with the forth aspect of this invention, there is provided a shield harness comprising:
  a plurality of first electric wires arranged in parallel;
  a conductive thin film sheet having a conductive layer;
  a second electric wire composed of a conductive core and
    a cladding which clads the core, wherein
    the plurality of first electric wires are bunched,
    the conductive thin film sheet is wound on an outer periphery of the outer periphery of the plurality of first electric wires, and
    the conductive layer of the conductive thin film sheet and the core of the second electric wire are bonded to each other.

In this configuration, the conductive thin film sheet is wound on the outer periphery of the plurality of first electric wires and the conductive layer of the conductive thin film sheet and the core of the second electric wire are bonded to each other. Therefore, the second electric wire can be employed as a drain wire. Thus, the second electric wire can be branched from any position. Further, since the conductive layer of the conductive thin film sheet and the core of the second electric wire are bonded to each other, they can be surely electrically connected to each other.

In a preferred embodiment of the shield harness, the conductive thin film sheet includes an insulating layer stacked on the conductive layer, and with the conductive layer located inside and insulating layer located outside, the conductive thin film sheet is wound on the outer periphery of the outer periphery of the plurality of first electric wires.

In this configuration, with the insulating layer located outside, the conductive thin film sheet is wound on the outer periphery of the outer periphery of the plurality of first electric wires. Therefore, the conductive thin film sheet and hence the core of the second electric wire can be prevented from being short-circuited to the other electric wire or electric appliance outside the shield harness.

In accordance with the fourth aspect of this invention, there is provided a method of manufacturing the shield harness, comprising the steps of:
  subjecting the insulating layer and the second electric wire superposed on each other to ultrasonic welding so that the conductive layer of the conductive thin film sheet and the core of the second electric wire are bonded to each other; and
  with the conductive layer of the conductive thin film sheet located inside and the insulating layer located outside, winding the thin film conductive sheet on the outer periphery of the outer periphery of the plurality of first electric wires.

In this method, since the ultrasonic welding is performed with the second electric wire superposed on the insulating layer, the conductive layer at any position of the conductive thin film sheet and the core at any position of the second electric wire can be surely bonded to each other.

Since the ultrasonic welding is performed with the second electric wire superposed on the insulating layer, the insulating layer and the cladding are removed from between the conductive layer and the core owing to heat generated during the ultrasonic welding. For this reason, it is not necessary to partially remove the insulating layer of the conductive thin film sheet and cladding of the second electric wire.

Since the, conductive layer and the core are bonded to each other by the ultrasonic welding, in order to attach the core of the second electric wire to the conductive thin film sheet, it is not necessary to employ any component which is separate from the conductive thin film sheet and the second electric wire. This contribute to prevent the number of components from being increased.

Further, since the conductive layer and core are bonded to each other by the ultrasonic welding, they can be surely metallic-bonded, and hence surely electrically connected to each other.

In accordance with the fifth aspect of this invention, there isprovided a method for assembling a shield harness by winding a conductive thin film sheet having a conductive layer on an outer periphery of a plurality of electric wires arranged in parallel, comprising the steps of:

holding the conductive thin film sheet and the plurality of electric wires by the holding portion so that the plurality of electric wires are superposed on the one surface of the thin film conductive sheet at a central portion in a width direction of the conductive thin film sheet, and a conductive wire is superposed on the other surface of the conductive thin film sheet at one end thereof in the width direction;

superposing the one end as well as the conductive wire on the plurality of electric wires and attaching the one end to the other end in the width direction of the conductive thin film sheet; and rolling the plurality of wires onto the other end so that the other end is attached on the other surface of the conductive thin film sheet.

In this method, the plurality of electric wires are superposed on the one surface of the thin film conductive sheet at a central portion in a width direction of the conductive thin film sheet, and a conductive wire is superposed on the other surface of the conductive thin film sheet at one end thereof in the width direction. After the one end as well as the conductive wire has been superposed on the plurality of first electric wires, the plurality of wires are rolled onto the other end. Therefore, the conductive wire is located between the one end of the conductive thin film sheet and the other end thereof. Thus, the conductive wire can be surely brought into contact with the conductive thin film sheet.

Therefore, by employing the second electric wire as the drain wire, the noise which tends to invade the core of each of the first electric wires can be dissipated surely through the conductive layer and the conductive wire.

In accordance with the sixth aspect of this invention, there is also provided a method for assembling a shield harness by winding a conductive thin film sheet having a conductive layer on an outer periphery of a plurality of electric wires arranged in parallel using a jig including a stand, a holding portion formed in a V-shape in section which is rotatably supported on the stand, and an urging means which urges the holding portion in a direction of leaving its opening from the stand and supports the holding portion in a state where the opening has left from the stand, comprising the steps:

holding the conductive thin film sheet and the plurality of electric wires so that the thin film conductive sheet is placed in the opening, the plurality of electric wires are superposed on the one surface of the thin film conductive sheet at a central portion in a width direction of the conductive thin film sheet, and a conductive wire is superposed on the other surface of the thin film conductive sheet at one end thereof in the width direction;

superposing the one end as well as the second wire on the plurality of electric wires and attaching the one end to the other end in the width direction of the conductive thin film sheet; and bringing the holding portion toward the stand by the urging means against elastic restoring force of the urging means and rolling the plurality of electric wires onto the other end so that the other end is attached on the other surface of the conductive thin film sheet.

In this method, the jig is employed which includes a holding portion formed in a V-shape in section, and an urging means which urges the holding portion in a direction of leaving its opening from the stand and supports the holding portion in a state where the opening has left from the stand. Therefore, with the plurality of electric wires superposed on the conductive thin film sheet, the plurality of electric wires and thin film sheet can be surely held on the jig.

The holding portion is brought down on to the stand against the elastic restoring force of the urging means. Therefore, the plurality of electric wires can be surely rolled on the other end. Hence, with the conductive wire located between the one end of the conductive thin film sheet and the other end thereof, the shield harness can be assembled. The conductive wire can be surely brought into contact with the conductive thin film sheet. Therefore, by employing the conductive wire as the drain wire, the noise which tends to invade the core of each of the plurality of electric wires can be dissipated surely through the conductive layer and the second electric wire.

In a preferred embodiment of the assembling method, the conductive layer and the conductive wire are bonded to each other.

Because of such a configuration, the second electric wire and the conductive layer can be surely electrically connected to each other. Hence, by employing the second electric wire as the drain wire, the noise which tends to invade the core of each of the electric wires can be dissipated surely through the conductive layer and the conductive wire.

In a preferred embodiment of the assembling method, the conductive thin film sheet has an insulating layer stacked on the conductive layer, the conductive wire is coated with a cladding, and with the conductive layer located on the one surface of the conductive thin film sheet and the insulating layer located on the other surface thereof, the insulating layer and the cladding are welded to each other at a position where the conductive layer and the cladding are bonded.

In this method, with the plurality of electric wires located on the conductive layer of the conductive thin film sheet, the conductive thin film sheet is wound on the outer periphery of the plurality of electric wires. Therefore, with the insulating layer located outside, the conductive thin film sheet of the shield harness. Thus, the conductive wire which can be employed as the drain wire can be prevented from being short-circuited to the other electric wire or electronic appliance outside the shield harness.

Further, the insulating layer and cladding are welded to each other at the bonding portion where the conductive layer and core are bonded. Therefore, the mechanical strength of the bonding portion can be improved. The conductive layer and the core of the conductive wire can be surely electrically connected to each other. Therefore, by employing the conductive wire as the drain wire, the noise which tends to invade the core of each of the plurality of electric wires can be dissipated surely through the conductive layer and the conductive wire.

The above and other objects and features of the invention will be more apparent from the following description taken in conjunction with the accompanying drawings.

BRIEF DESCRIPTION OF THE DRAWINGS

FIG. 22 is a plan view of an ALS in the shield harness shown in FIG. 21;

FIG. 25 is a sectional view of the state where the one end of the ALS of the shield harness according to the third embodiment has attached has been attached to the outer periphery of a plurality of first electric wires;

FIG. 35 is a plan view of an ALS with the core of a second electric wire bonded to a conductive layer in the shield harness assembled according to the fifth embodiment of this invention;

DESCRIPTION OF THE PREFERRED EMBODIMENTS

Figure 1:
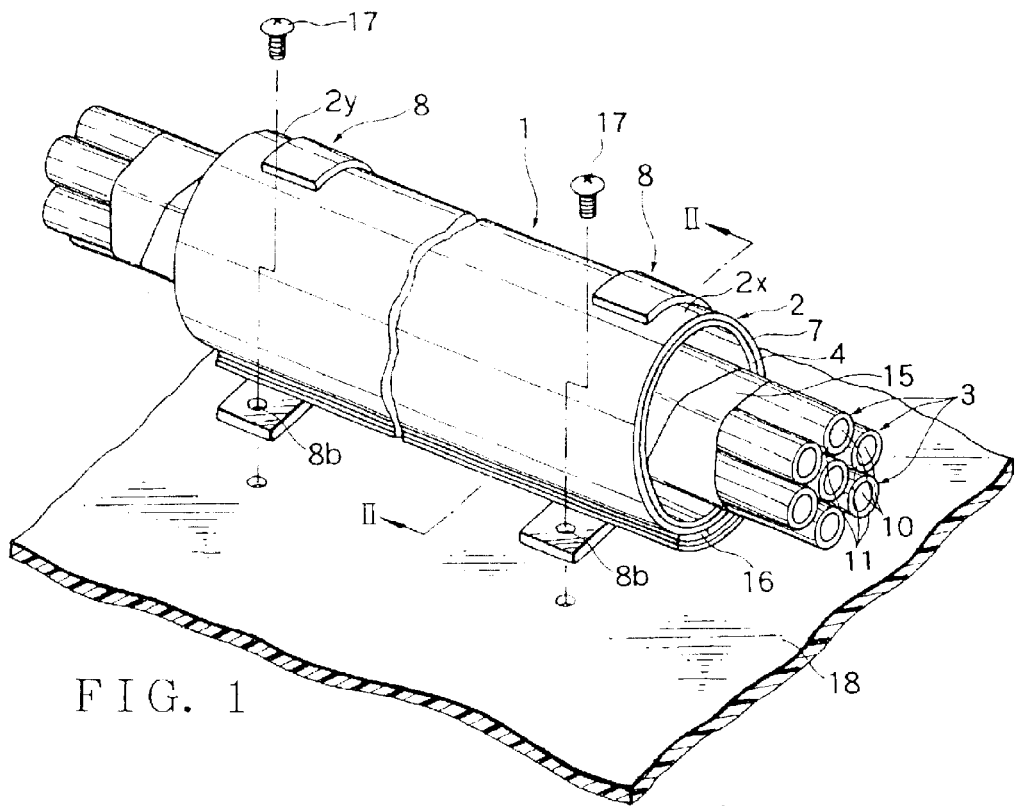
FIG. 1 is a perspective view of the state where a conductor-equipped conductive thin film sheet according to the first embodiment of this invention is wound around wires.

Now referring to the drawings, an explanation will be given of various embodiments of this invention. Through all the drawings, it should be noted that like reference numerals refer to like or corresponding parts.

Embodiment 1

Referring to FIGS. 1 to 5, an explanation will be given of a conductor-equipped conductive film sheet according to the first embodiment of this invention. As seen from FIGS. 1 and 2, a conductor-equipped conductive thin film sheet 1 is composed of a aluminum laminate sheet (hereinafter referred to as ALS) 2 which serves as a conductive thin film sheet and a metallic piece 8 which serves as a conductor.

The ALS 2 is a thin sheet composed of a thin conductive layer 4 and a thin insulating layer 7. The conductive layer 4 is a conductive metallic layer. The conductive layer 4 has flexibility. The conductive layer 4 has a prescribed thickness. The conductive layer 4 contains at least aluminum or aluminum alloy. The insulating layer 7 is composed of a first insulating layer 5 and a second insulating layer 6.

The first insulating layer 5 is made of insulating synthetic resin and stacked on the conductive layer 4. The first insulating layer 5 has flexibility and is made of e.g. polyethyleneterephthalate (PET). The second insulating layer 6 is made of insulating synthetic resin and stacked on the first insulating film 5. The second insulating film 6 has flexibility and is made of e.g. polyvinylchloride (PVC). The ALS 2 having such a structure is equipped with the metallic piece. The ALS 2 is wound around the outer periphery of the electric wires 3.

In this embodiment, two metallic pieces 8 are provided. Each metallic piece 8 is made of conductive metal. The metallic piece 8 is shaped like a belt having a prescribed thickness. When the ALS 2 is wound around the outer periphery of the electric wires 3, the metallic pieces 8 are attached to both ends 2x and 2y of the ALS 2 which are apart from each other in the longitudinal direction of the electric wires 3.

When the metallic piece 8 is wound around the outer periphery of the electric wires 3, metallic pieces 8 are attached to the ALS 2 circumferentially of the outer periphery of the electric wires 3. As seen from FIG. 3, the metallic pieces 8 are attached to the ALS 2 so that their one ends protrude outwardly from the one edge in the widthwise direction of the ALS 2. It should be now noted that the widthwise direction of the ALS 2 refers to the diametrical direction of the wires 3. The metallic piece 8 is superposed on the insulating layer 7, and also bonded to the conductive layer 4 at some positions 8a (see FIGS. 2 and 3). The metallic piece 8 has a through-hole 8b made at the one end protruded from the one edge in the widthwise direction of the ALS 2.

Each of the electric wires 3 around which the ALS 2 is wound is round-shape in section. The electric wire 3 is composed of a core 10 having a round sectional shape and a cladding 11 which clads the core 10. The core 10 is a single conductive line or is composed of a plurality of twisted conductive lines. The conductive line is made of metal. The core 10 has flexibility. The cladding is made of synthetic resin having insulating property and flexibility.

Figure 2:
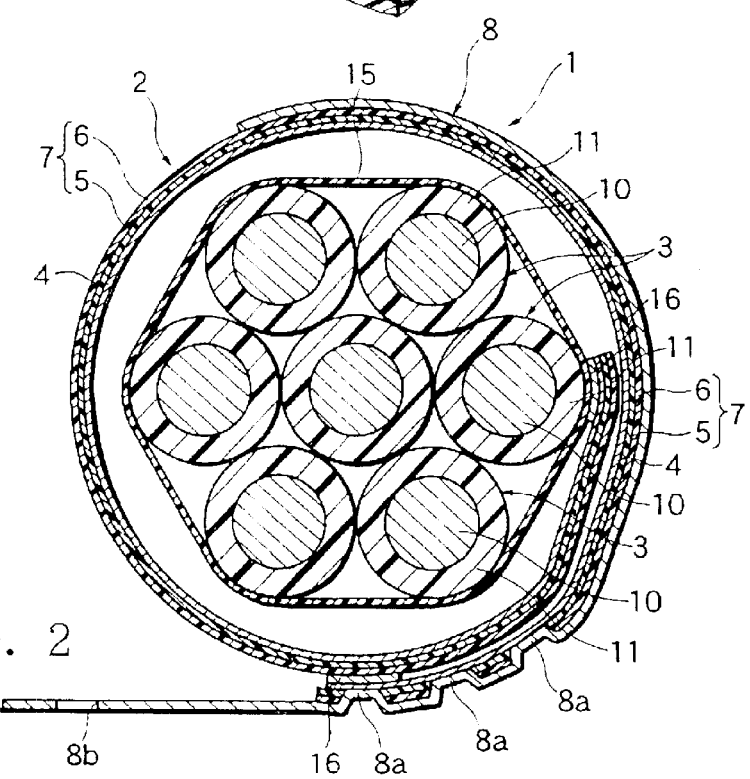
FIG. 2 is a sectional view taken in line II—II in FIG. 1.
Figure 3:
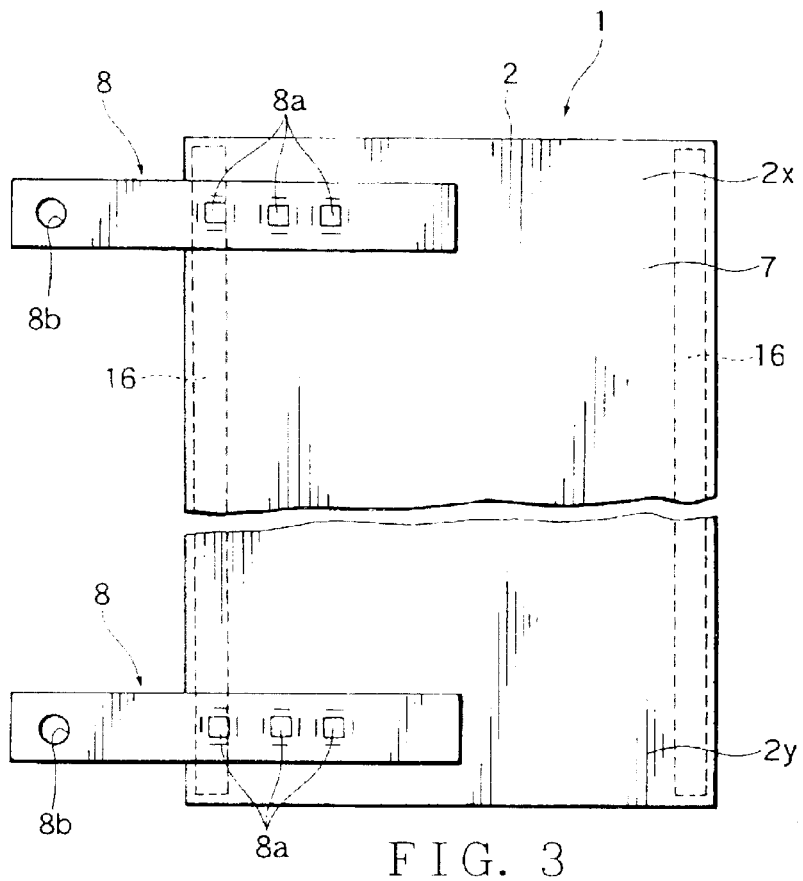
FIG. 3 is a plan view of the conductor-equipped conductive thin film sheet shown in FIG. 1.

After a tape 15 has been wound around the outer periphery of the electric wires 3, as seen from FIGS. 1 and 2, the conductor-equipped conductive film sheet 1 is wound around the outer periphery of the electric wires 3. When these electric wires 3 are arranged in e.g. a motor vehicle, they connect auxiliary machines loaded in the motor vehicle to each other.

The metallic pieces 8 of the conductor-equipped conductive thin film sheet 1 are attached to both ends of the ALS 2 in the longitudinal direction of the electric wires 3. The metallic pieces 8 are superposed on the insulating layer 7 and bonded to the conductive layer 4 at some spots 8a.

The some spots 8a of the metallic piece 8 and the conductive layer 4 of the ALS 2 are fixed to each other by an ultrasonic welding machine. The spots 8a are bonding positions between the metallic piece 8 and conductive layer 4. In this embodiment, as seen from FIG. 3, three spots are provided for each of the metallic pieces. In short, the metallic piece 8 is subjected to the ultrasonic welding at three positions and attached to the ALS 2.

It should be noted that the bonding spots 8a of the metallic piece 8 to the conductive layer 4 can be optionally located according to the mechanical strength enough to fix the metallic piece 8 to the ALS 2. Namely, a single or plural bonding spots 8a may be provided for each of the metallic pieces 8.

Figure 4:
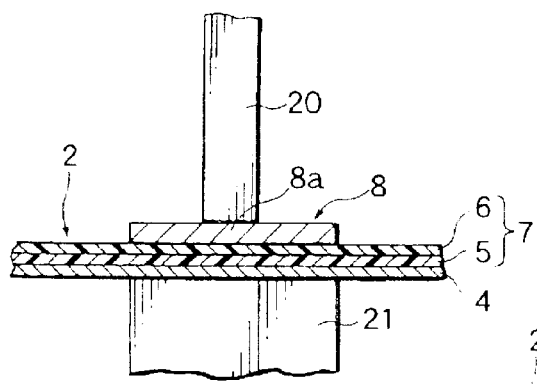
FIG. 4 is a sectional view of the state before a metallic piece and the conductive thin film sheet are fixed to each other in this embodiment.
Figure 5:
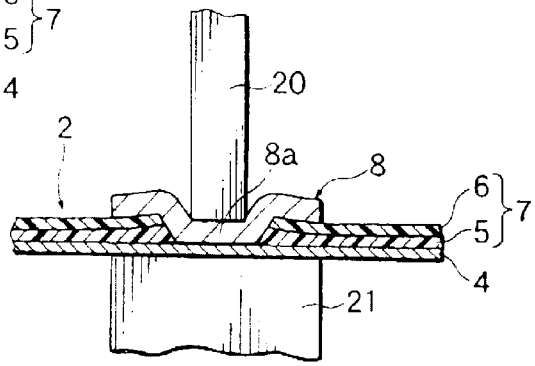
FIG. 5 is a sectional view of the state after before a metallic piece and the conductive thin film sheet have been fixed to each other in this embodiment.

As seen from FIGS. 4 and 5, the ultrasonic welding machine includes a tip (tool horn) 20, an anvil 21 corresponding to the chip 20, an oscillating machine (not shown), an oscillator, horn (not shown), etc. With an object to melt sandwiched between the chip 20 and anvil 21 pressurized in a direction of causing the chip 20 and anvil 21 to approach each other, the ultrasonic welding machine oscillates the oscillator by the oscillating machine and gives the oscillation to the chip 20 via the cone and horn. Thus, the ultrasonic welding machine melts the object.

In manufacturing the conductor-equipped thin film sheet 1, i.e. where the ALS 2 and the metallic piece 8 are fixed to each other, as shown in FIG. 4, the ALS 2 and the spot 8a of the metallic piece 8 are sandwiched between the chip 20 and anvil 21. At this time, the ALS 2 is superposed on the anvil 21, and the chip 20 is brought into contact with the metallic piece 8. The conductive layer 4 is superposed on the anvil 21, and the metallic piece 8 is superposed on the insulating layer 7.

With the ALS 2 and the spot 8a of the metallic piece 8 sandwiched by the chip 20 and anvil 21 pressurized in the direction of causing them to approach, the oscillation of the oscillator is given to the chip 20 via the horn. This state is continued for a while. The above oscillation is generated between the conductive thin film sheet 2 and metallic piece 8 so that the first insulating layer 5 and second insulating layer 6 at the spot 8*a* are molten.

Owing to pressurizing in the direction of causing the chip 20 and the anvil 21 to approach, when the first and second insulating layers 5 and 6 are molten, they are removed from between the spot 8*a* of the metallic piece 8 and conductive layer 4. As a result, the conductive layer 4 and the spot 8*a* of the metallic piece 8 are brought into contact with each other. Accordingly, as seen from FIG. 5, the conductive layer 4 and the spot 8*a* of the metallic piece 8 are metallic-bonded in a solid state while they are not molten.

In short, the conductive layer 4 and metallic piece 8 are ultrasonic-welded to each other. Thereafter, the oscillation of the above oscillator is stopped to separate the chip 20 and anvil 21 from each other. As occasion demands, the metallic piece 8 and conductive layer 4 are ultra-sonic welded to each other in the same manner as described above. Thus, a conductor-equipped thin film sheet 1 is obtained in which the metallic piece 8 is superposed on the insulating layer 7 and is contact with the conductive layer 4 at the spot(s) 8*a*.

The conductor-equipped conductive thin film sheet 1 thus obtained is wound around the outer periphery of the plurality of the electric wires 3 in such a fashion that the conductive layer 4 is located inside and the insulating layer 7 is located outside. Since these electric wires 3 are bunched by e.g. winding a tape 15 around them, the metallic piece 8 is located outside the ALS 2.

In winding the ALS 2 around the outer periphery of the electric wires 3, the metallic pieces 8 are preferably plastically deformed like a ring. This permits the ALS 2 to be wound along the metallic piece 8. Thus, by plastically deforming the metallic pieces 8 like a ring, the ALS 2 can be easily wound around the outer periphery of the electric wires 3. The ALS 2 thus wound is supported by the metallic pieces 8.

In order to fix the electric wires 3 and also to fix the ALSs 2 overlapping each other, both-sided tape 16 are pasted on the conductive layer 4. The both-sided tapes 16 are provided at both ends in the widthwise direction of the ALS 2. Incidentally, the both-sided tape has both adhesive faces.

The first both sided tape 16 is pasted on the outer periphery of the tape-wound electric wires 3, whereas the second both sided tape 16 is partially pasted on the respective ALSs 2 overlapping each other. Incidentally, in this invention, in place of the both-sided tape 16, adhesive or tape with a single adhesive face may be employed.

The conductor-equipped thin film sheet 1 thus configured electrically shields the electric wires 3 in such a manner that the ALS 2 is wound around the outer periphery of the electric wires 3. As seen from FIG. 1, the conductor-equipped thin film sheet 1 is attached to a known printed wiring board 18 with the aid of screws 17 passing through the through-holes 8*b*. Thus, the metallic pieces 8 can be electrically connected to a desired grounding circuit via the screws 17 and a conductive pattern (not shown) of the printed wiring board 18.

In accordance with this embodiment, since the conductive layer 4 and metallic piece 8 are bonded to each other by ultrasonic welding, the number of components required to attach the metallic piece 8 to the ALS 2 can be limited. This contributes to manufacture the conductor-equipped thin film sheet 1 at a low cost.

When the ultrasonic welding is carried out with the metallic piece 8 superposed on the insulating layer 7, the insulating layer 7 is removed from between the spot 8*a* of the metallic piece 8 and the conductive layer 4. For this reason, in order to attach the metallic piece 8 to the ALS 2, it is not necessary to remove a part of the insulating layer 7. Therefore, the number of man-hours needed to attach the metallic piece 8 to the ALS 2 can be reduced. This further contributes to manufacture the conductor-equipped thin film sheet 1 at low cost.

The metallic piece 8 is bonded to the conductive layer 4. Therefore, where the ALS 2 is wound around the outer periphery of the electric wires 3, by attaching the metallic piece 8 to the printed wiring board 18 through the screws 17, the noise which tends to invade the electric wires 3 can be dissipated outwardly through the conductive pattern of the printed wiring board 18. Thus, the conductor-equipped conductive thin film sheet 1, when it is wound around the outer periphery of the electric wires 3, prevents noise from invading the electric wires 3.

In this embodiment, with the metallic piece 8 superposed on the insulating layer 7, its spot(s) 8 is bonded to the conductive layer 4. For this reason, as compared with the case where the metallic piece 8 is directly bonded to the conductive layer 4, breakage of the conductive layer 4 can be prevented effectively. Thus, the conductor-equipped conductive thin film sheet 1 when is wound around the electric wires 3, surely prevents noise from invading the electric wires 3.

Further, in this embodiment, the longitudinal direction of the metallic pieces 8 accords with the circumferential direction of the electric wires 3. Therefore, by plastically deforming the metallic piece 8 like a ring, the ALS 2 can be wound along the metallic pieces 8. Thus, the ALS 2 can be easily wound around the outer periphery of the electric wires 3. In addition, since the wound ALS 2 is supported by the metallic pieces 8, misalignment of the ALS 2 can be prevented.

Further, in this embodiment, the ALS 2 is wound around the electric wires 3 in a state where the conductive layer 4 is located inside and the insulating layer 7 is located outside. This prevents the conductive layer 4 from being short-circuited with another electric wire or electric appliance different from the above electric wires 3.

Now referring to FIGS. 6 to 11, an explanation will be given of a conductor-equipped thin film sheet according to a modification of the first embodiment of this invention. In this figures, like reference numerals refer to like parts in the first embodiment.

Figure 6:
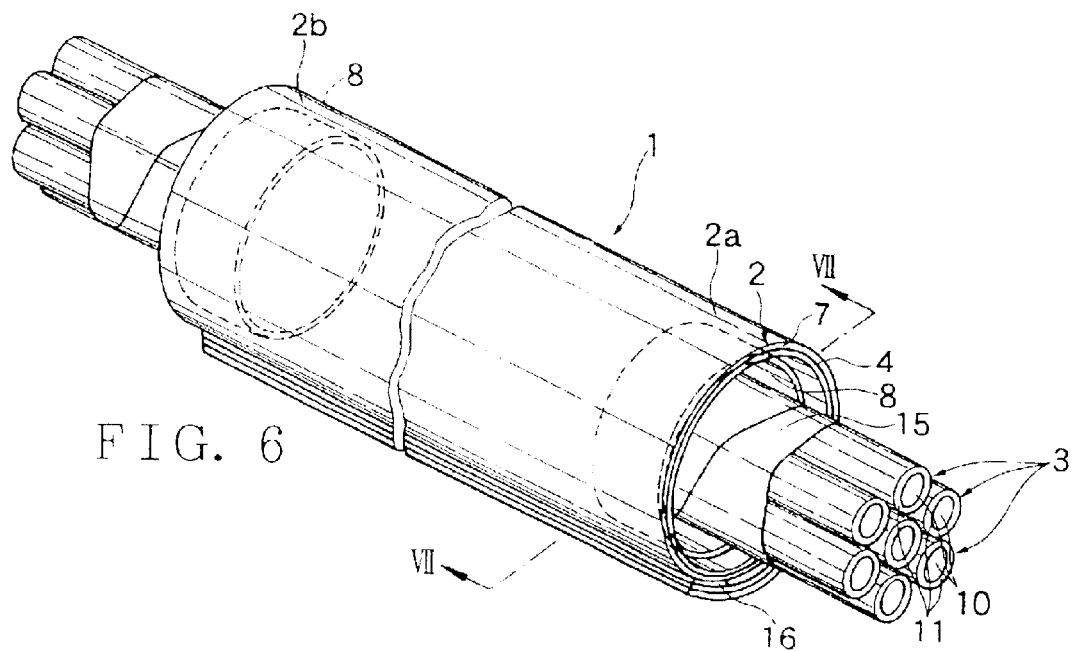
FIG. 6 is a perspective view of the state where a conductor-equipped conductive thin film sheet according to a modification of the first embodiment of this invention is wound around wires.
Figure 7:
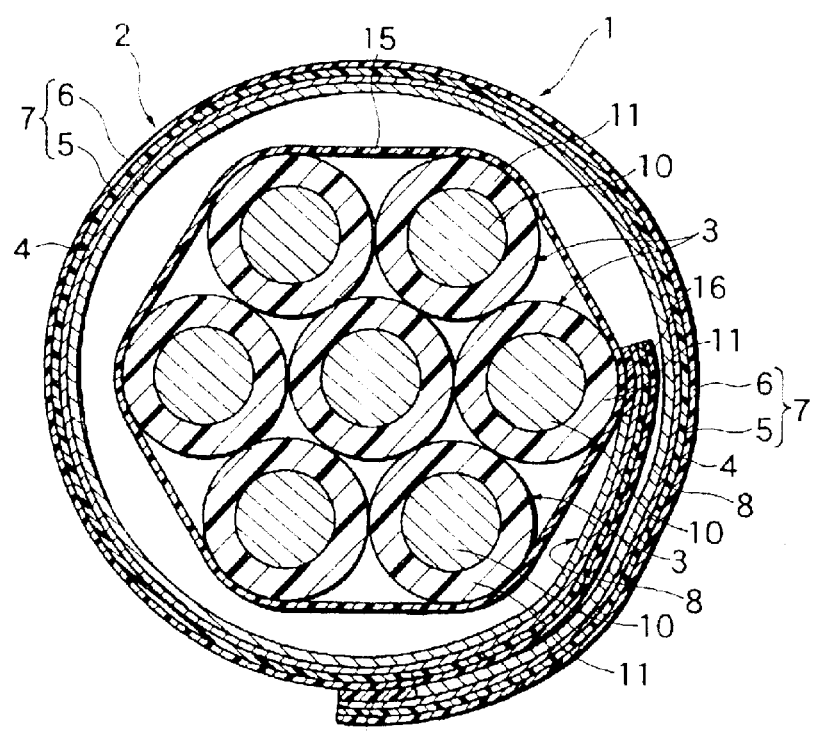
FIG. 7 is a sectional view taken in line VII—VII in FIG. 6.
Figure 8:
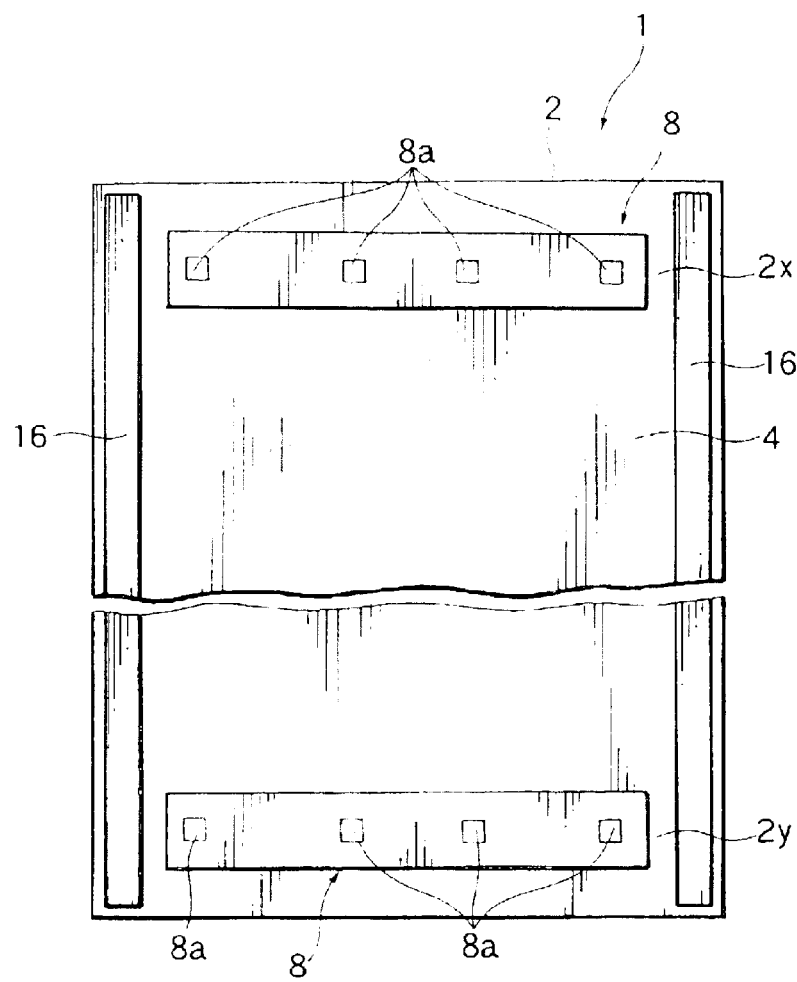
FIG. 8 is a plan view of the conductor-equipped conductive thin film sheet shown in FIG. 6.
Figure 10:
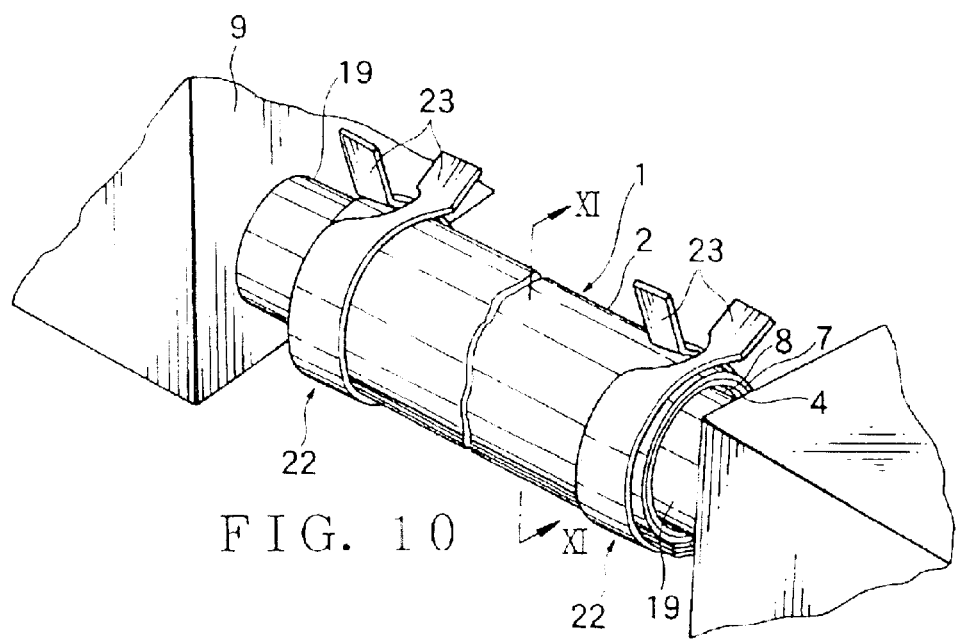
FIGS. 9 and 10 are perspective views of the state where the conductor-equipped conductive thin film sheet has been fixed to an auxiliary machine according to the above modification of this invention.
Figure 9:
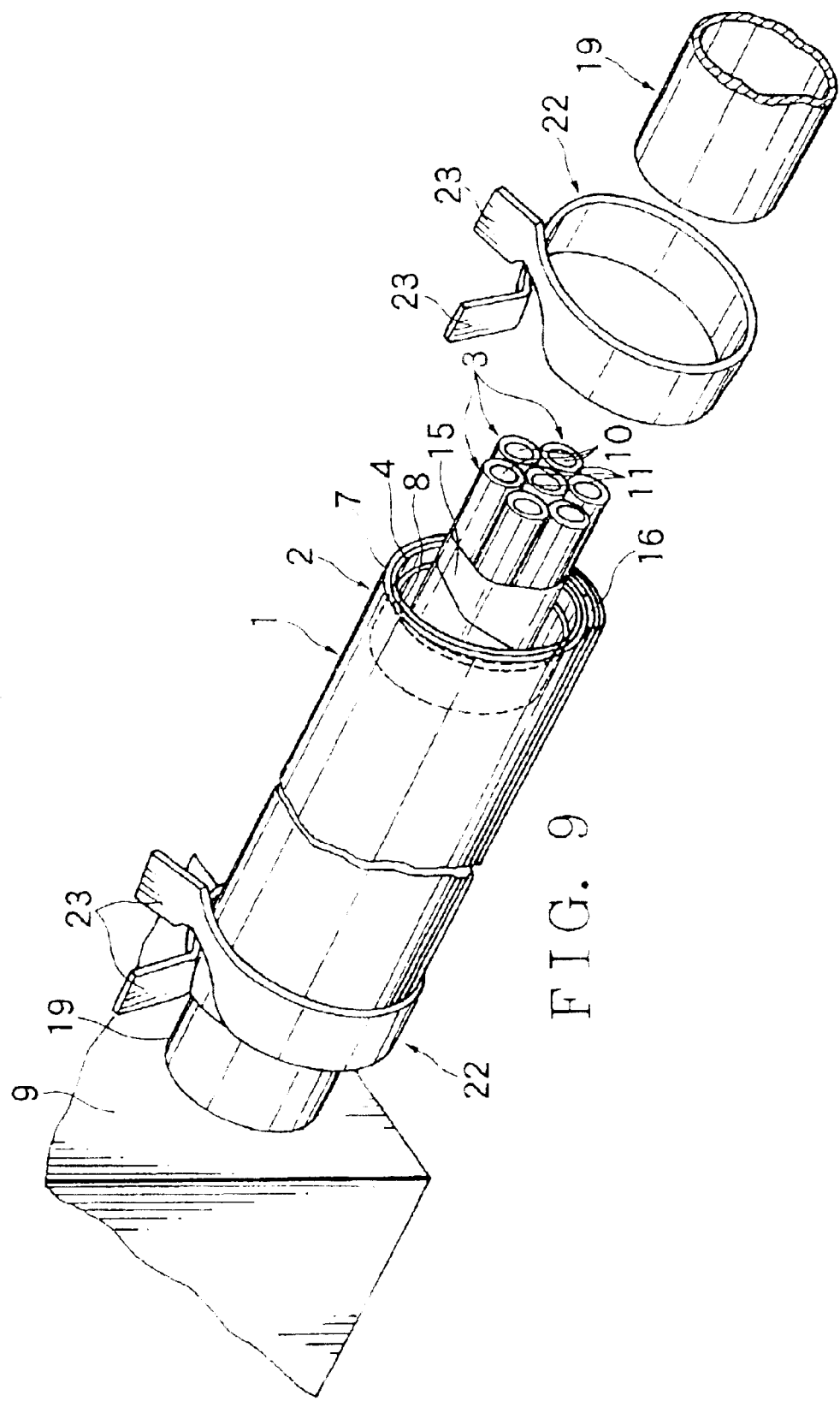

In the conductor-equipped conductive thin film sheet 1 according to this modification, as seen from FIGS. 6 to 8, metallic pieces 8 are superposed on the conductive layer 4 so be directly bonded to the conductive layer 4. In this embodiment also, when the ALS 2 is wound around the plurality of the electric wires 3, the metallic pieces 8 are attached to both ends 2*x* and 2*y* of the ALS 2 which are apart from each other in the longitudinal direction of the electric wires 3. The longitudinal direction of the metallic pieces 8 accords with the circumferential direction of the electric wires 3, i.e. the widthwise direction of the ALS 2. As seen from FIG. 8, the metallic pieces 8 extend between the one edge of the ALS 2 and the other edge thereof in the widthwise direction thereof. The metallic pieces 8 do not protrude from the edge of the ALS 2 in their one ends.

In assembling the conductor-equipped thin film sheet 1, as in the first embodiment, the ALS 2 and the spot 8*a* of the metallic piece 8 are sandwiched between the chip 20 and anvil 21. Incidentally, in this modification, at this time, the ALS 2 is superposed on the anvil 21, and the chip 20 is brought into contact with the metallic piece 8. The insulating layer 7 is superposed and the metallic piece 8 is superposed on the conductive layer 4.

With the ALS 2 and the spot 8a of the metallic piece 8 sandwiched by the chip 20 and anvil 21 pressurized in the direction of causing them to approach, the oscillation of the oscillator is given to the chip 20 via the horn. Accordingly, the conductive layer 4 and the spot 8a of the metallic piece 8 are metallic-bonded in a solid state while they are not molten. In short, the conductive layer 4 and metallic piece 8 are ultrasonic-welded to each other. Thus, a conductor-equipped thin film sheet 1 is obtained in which the metallic piece 8 is superposed on the insulating layer 7 and is contact with the conductive layer 4 at the spot(s) 8a.

As seen from FIGS. 6 and 7, the conductor-equipped conductive thin film sheet 1 thus obtained is wound around the outer periphery of the electric wires 3 in such a fashion that the conductive layer 4 is located inside and the insulating layer 7 is located outside. Therefore, the above metallic pieces 8 are located inside the ALS 2.

In winding the ALS 2 around the outer periphery of the electric wires 3, as in the first embodiment, the metallic pieces 8 are preferably plastically deformed like a ring. This permits the ALS 2 to be wound along the metallic piece 8. Thus, by plastically deforming the metallic pieces 8 like a ring, the ALS 2 can be easily wound around the outer periphery of the electric wires 3.

In order to fix the ALS 2 on the outer periphery of the electric wires 3 and to fix the ALSs 2 overlapping each other partially, as in the first embodiment, both-sided tapes 16 are pasted on the conductive layer 4. The both-sided tapes 16 are provided at both ends in the widthwise direction of the ALS 2.

The conductor-equipped thin film sheet 1 thus configured electrically shields the electric wires 3 in such a manner that the ALS 2 is wound around the outer periphery of the electric wires 3. Where the electric wires 3 connect a plurality of auxiliary machines 9 to each other, as seen from FIGS. 9 and 10, they are passed through a tube 19 of each auxiliary machine 9. The tube 19 is made of conductive metal and shaped in a ring.

Where the electric wires 3 are passed through the tubes 19 of the plurality of auxiliary machines 9, with the tube 19 passed inside the metallic pieces 8 plastically deformed like the ring, the conductor-equipped conductive thin film sheet 1 is attached to the tube 19, i.e. auxiliary machines 9 by e.g. conductive metallic bands 22. The metallic bands 22 are shaped as a circular ring of conductive metal.

Each of the metallic bands 22 is equipped with a pair of operating pallets 23 which protrude outwardly. The inner/outer diameter of the metallic band 22 can be freely changed by increasing or decreasing the interval between the pair of pallets 23. The metallic band 22 can be deformed elastically so that its inner/outer diameter changes. With the inner/outer diameter extended by reducing the interval between the pallets 23, the conductor-equipped thin film sheet 1 is passed through the insides of the metallic bands 22.

In this state, since the metallic band 22 generates elastic restoring force so that the interval between the pallets 23 returns to the initial state to reduce the inner/outer diameter, the metallic pieces 8 of the conductor-equipped conductive thin film sheet 1 is pressed on the outer surface of the tube 19. Thus, the conductor-equipped conductive thin film sheet 1 is fixed to the tubes 19, i.e. auxiliary machines.

Figure 11:
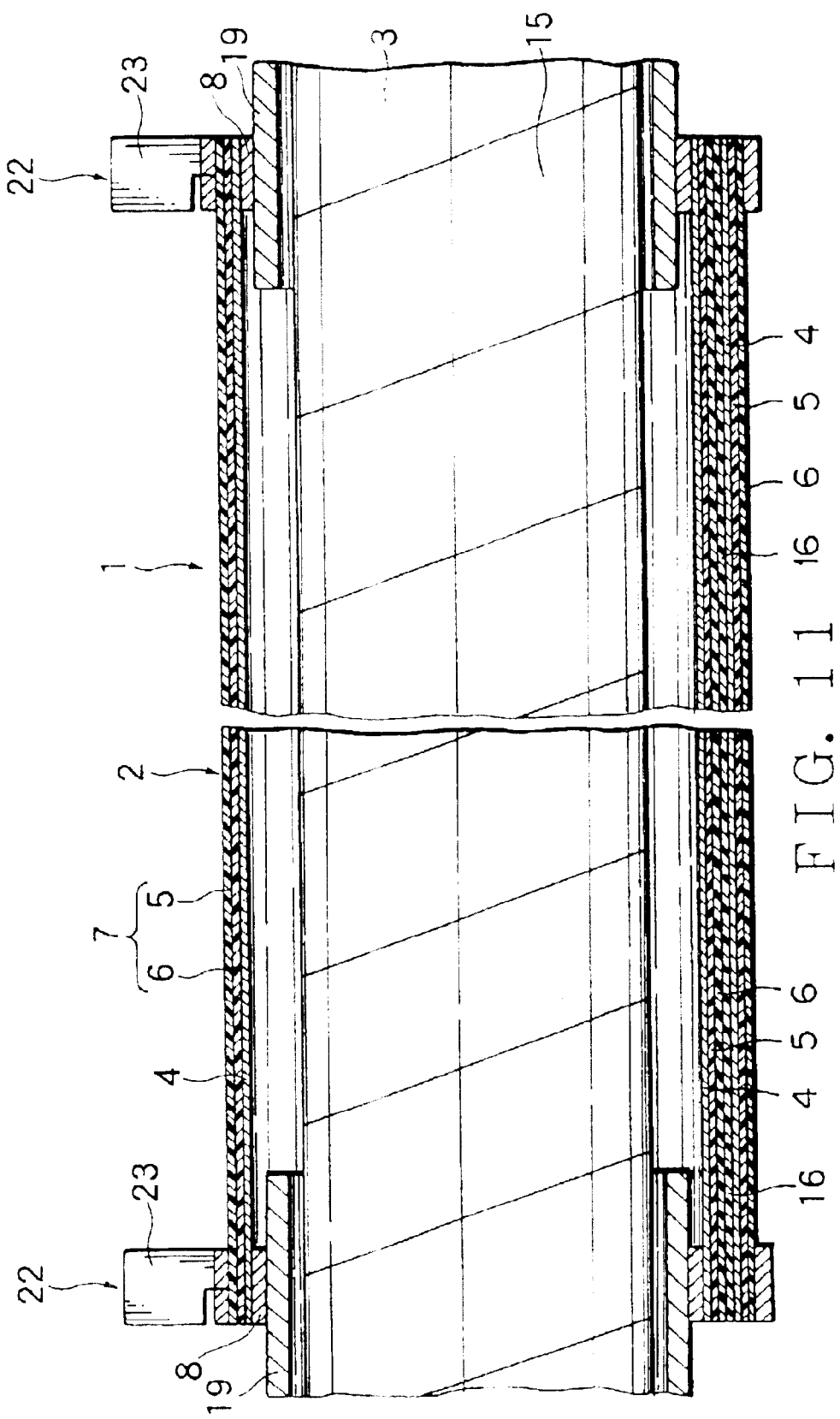
FIG. 11 is a sectional view taken in line XI—XI in FIG. 10.

When the conductor-equipped conductive thin film sheet 1 is fixed to the tubes 19 by the metallic bands 22, as seen from FIG. 11, the metallic pieces are brought into intimate contact with the outer surface of the tubes 19. Thus, the metallic pieces 8 are electrically connected to the tubes 19.

In accordance with this modification, as in the first embodiment, since the conductive layer 4 and metallic piece 8 are bonded to each other by ultrasonic welding, the number of components required to attach the metallic piece 8 to the ALS 2 can be limited. This contributes to manufacture the conductor-equipped thin film sheet 1 at a low cost.

Further, in this modification, the longitudinal direction of the metallic pieces 8 accords with the circumferential direction of the electric wires 3. Therefore, by plastically deforming the metallic piece 8 like a ring, the ALS 2 can be wound along the metallic pieces 8. Thus, the ALS 2 can be easily wound around the outer periphery of electric wires 3. In addition, since the wound ALS 2 is supported by the metallic pieces 8, misalignment of the ALS 2 can be prevented.

The metallic pieces 8 are attached to both ends 2a, 2b of the ALS 2 which are apart from each other in the longitudinal direction of the electric wires 3. Therefore, the metallic piece 8, when previously deformed plastically like a ring the auxiliary machines 9, can be easily fixed to the auxiliary machines in such a manner that the tubes 19 are passed inside the metallic pieces. Further, by tightening the metallic pieces 8 using the metallic band 22 from outside, the metallic pieces 8 can be surely fixed to the tubes 19. Therefore, the noise which tends to invade the electric wires 3 can be surely dissipated through the metallic pieces 8 and tubes 19. Accordingly, the conductor-equipped conductive thin film sheet 1, when it is wound around the outer periphery of the electric wires 3, surely prevents noise from invading the electric wires 3.

Further, in this modification, as in the first embodiment, the ALS 2 is wound around the outer periphery of the electric wires 3 in a state where the conductive layer 4 is located inside and the insulating layer 7 is located outside. This prevents the conductive layer 4 from being short-circuited with another electric wire or electric appliance different from the above electric wires 3.

Embodiment 2

Now referring to FIGS. 12 to 17, an explanation will be given of a conductive thin film sheet and a shield harness equipped it according to the second embodiment of this invention. In this embodiment, the shield harness corresponds to the conductor-equipped conductive thin film sheet in the first embodiment and its modification. A shield harness 1 is composed of a plurality of electric wires 3, an aluminum laminate sheet (hereinafter referred to as ALS) 2 which serves as a conductive thin film sheet and a second electric wire 48.

Each of the electric wires 3 around which the ALS 2 is wound is round in the sectional shape. The electric wire 3 is composed of a core 10 having a round sectional shape and a cladding 11 which clads the core 10. The core 10 is a single conductive line or is composed of a plurality of twisted conductive lines. The conductive line is made of metal. The core 10 has flexibility. The cladding is made of synthetic resin having insulating property and flexibility.

Figure 13:
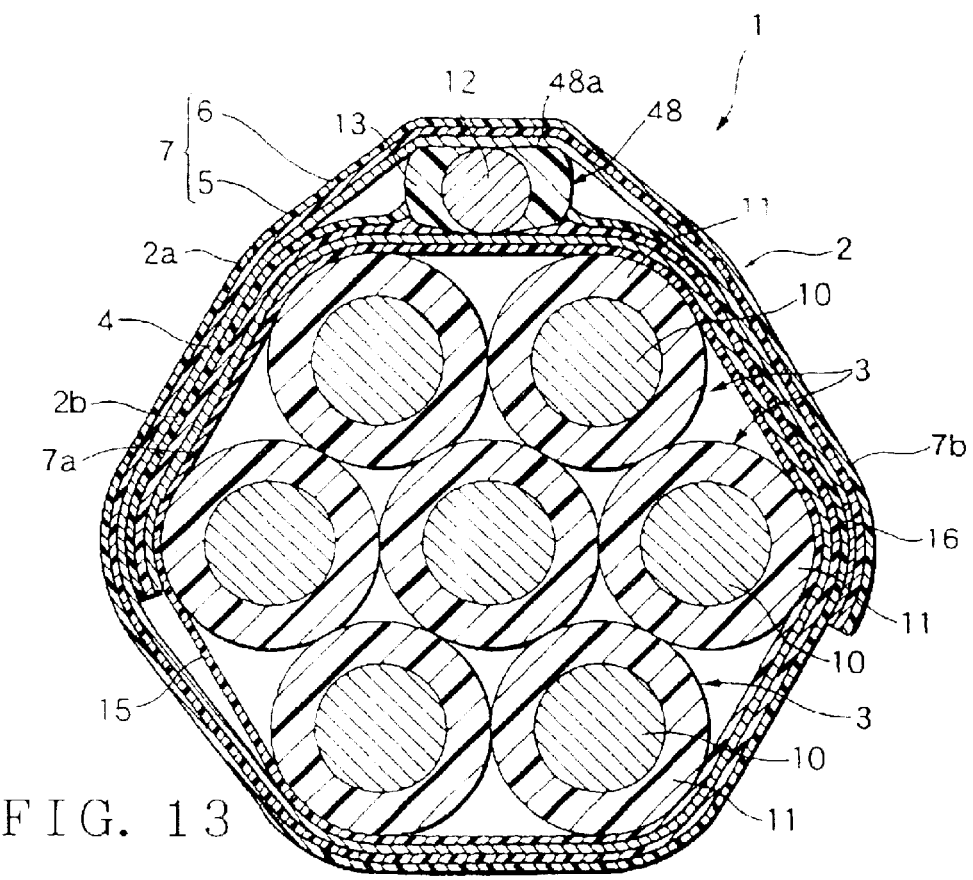
FIG. 13 is a section view taken in line XIII—XIII in FIG. 12.
Figure 15:
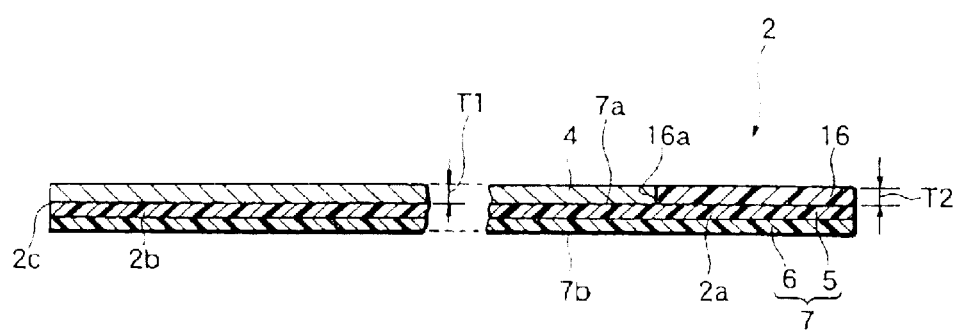
FIG. 15 is a sectional view taken in line XV—XV in FIG. 14.

As seen from FIGS. 13 and 15, the ALS 2 is a thin sheet composed of a thin insulating layer 7, a thin conductive layer 4 stacked on the one surface 7a of the insulating layer 7 and a both-sided tape which is an adhesive body pasted on the surface 7a of the insulating layer 7. The ALS 2 is formed in a square shape in plan as seen from FIG. 14.

As seen from FIGS. 13 and 15, the insulating layer 7 is composed of a first insulating layer 5 and a second insulating layer 6.

The first insulating layer 5 is made of insulating synthetic resin and stacked on the conductive layer 4. The first insulating layer 5 has flexibility and is made of e.g. polyethyleneterephthalate (PET). The second insulating layer 6 is made of insulating synthetic resin and stacked on the first insulating film 5. The second insulating film 6 has flexibility and is made of e.g. polyvinylchloride (PVC). The ALS 2 having such a structure is equipped with the metallic piece.

When the ALS 2 is wound around the outer periphery of the electric wires 3, the both-sided tape 16 is provided at the one end 2a in the widthwise direction of the ALS 2. Specifically, the both-sided tape 16 is pasted on the one surface 7 of the insulating layer 7, i.e. the first insulating layer 5 at the one end 2a of the ALS 2.

Incidentally, the both-sided tape has both adhesive faces. When the both-sided tape 16 is wound around the outer periphery of the electric wires 3, the both sided tape is shaped in a band extending in the longitudinal direction of the electric wires 3. Incidentally, the adhesive material refers to a material having adhesive force such as adhesive or an adhesive tape. Therefore, in this embodiment, in place of the both-sided tape, known adhesive or a known adhesive tape may be used.

Figure 14:
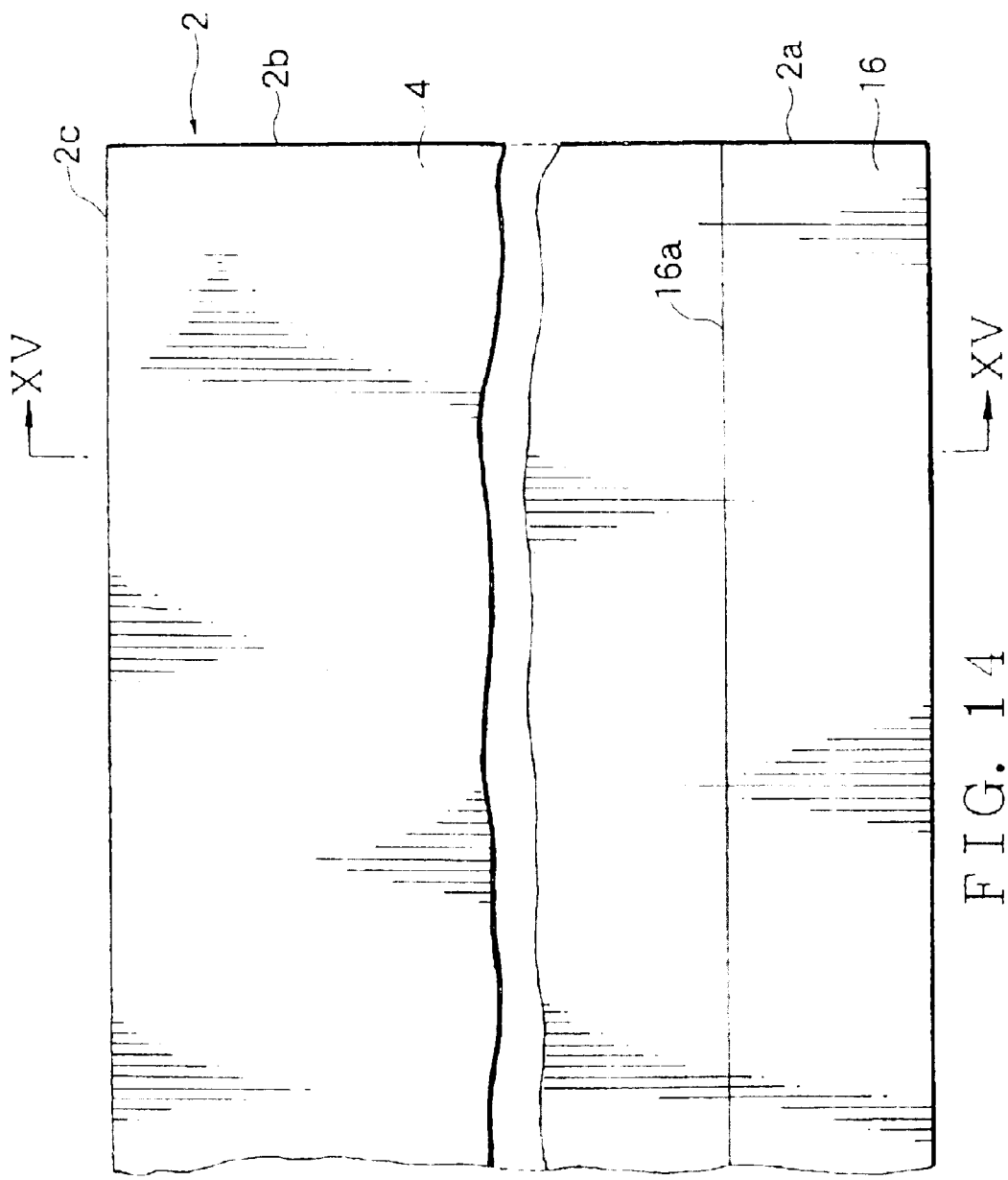
FIG. 14 is a plan view of an ALS in the shield harness shown in FIG. 12.

As seen from FIGS. 14 and 15, the conductive layer 4 is stacked on the one face 7a of the insulating layer 7 between the edge 16a on the side of the other end 2b of the both-sided tape 16 (which is located inside in the widthwise direction of the ALS 2) and the other end 2b of the ALS 2. Namely, there is a small gap or no gap between the conductive layer 4 and the both-sided tape 16. The conductive layer 4 is preferably stacked on the one face 7a from the edge 16a to the edge 2c of the ALS 2 located at the other end 2b. Incidentally, in claims, the one end 2a is defined as the one end of an insulating layer, whereas the other end 2b is defined as the other end of the insulating layer.

The conductive layer 4 is made of conductive metal. The conductive layer has flexibility. The conductive layer 4 contains at least aluminum or aluminum alloy. Further, as seen from FIG. 15, it should be noted that the thickness T1 of the conductive layer 4 in the direction toward the one face 7a of the insulating layer 7 is substantially equal or equal to the thickness T2 of the both-sided tape 16 in the same direction.

The second electric wire 48 is composed of a core 12 having a round sectional shape and a cladding 13 which clads the core. The core 12 is a single conductive line or is composed of a plurality of twisted conductive lines. The conductive line is made of metal. The core 12 has flexibility. The cladding 13 is made of synthetic resin having insulating property and flexibility.

A tape 15 is wound around the outer periphery of the electric wires 3 which are bunched. The core 12 of the second electric wire 48 is bonded onto the conductive layer 4 located at the other end 2b (FIG. 14) in the widthwise direction of the ALS 2. The other end 2b of the ALS 2 is attached to the outer periphery of the tape 15, i.e. that of the electric wires 3.

With the conductive layer 4 located inside and the insulating layer 7 located outside, the ALS 2 is wound around the outer periphery of electric wires 3 from the outside of the tape 15. The shield harness 1 is configured so that the both-sided tape 16 located at the one end 2a is passed on the other face 7b of the insulating layer 7.

The second electric wire 48 is superposed on the insulating layer 7 of the ALS 2, and the cladding 13 of the second electric wire 8 is welded to the insulating layer 7. In the illustrated example, the core 12 at the one end 8a of the second electric wire 48 and the core 12 at the other end 2b of the ALS 2 are bonded to each other. Namely, the core 12 of the second electric wire 48 is electrically connected the conductive layer 4.

After the other end 2b of the ALS 2 has been attached to the outside of the tape 15, the ALS 2 is wound around the outer periphery of electric wires 3 continuously toward the one end 2a in the widthwise direction. The one end 2a will be superposed on the other end 2b. Therefore, the other end 2b is located inside whereas the one end 2a is located outside. In this case, the one end 2a of the ALS 2 is superposed on the outside of the second electric wire 48 so as to overlie it.

The shield harness 1 is acquired by fixing the conductive layer 4 of the ALS 2 and the core 12 of the second electric wire 8 to each other by means of a well known welding technique such as ultrasonic welding using a known ultrasonic machine.

The ultrasonic welding machine includes a tip (tool horn), an anvil corresponding to the tip, an oscillating machine (not shown), an oscillator, horn (not shown), etc. With an object to melt sandwiched between the tip and anvil pressurized in a direction of causing the tip 20 and anvil to approach each other, the ultrasonic welding machine oscillates the oscillator by the oscillating machine and gives the oscillation to the tip 20 via the cone and horn. Thus, the ultrasonic welding machine melts the object.

In manufacturing the shield harness 1, first, the other end of the ALS 2 is superposed on eh anvil, the second electric wire 48 is superposed on the ALS 2, and the tip is brought into contact with the second wire 48. At this time, the conductive layer 4 is brought into contact with the anvil and the second electric wire 48 is superposed on the insulating layer 7. Thus, the above other end 2b of the ALS 2 and one end 8a of the second electric wire 48 are sandwiched between the tip and anvil.

With the tip and anvil pressurized in the direction of causing them to approach each other, the oscillation of the oscillator is given to the tip via the horn. This state is continued for a while. The above oscillation is generated between the ALS 2 and second electric wire 48 so that the conductive layer 4 and core 12 are bonded to each other, and the insulating layer 7 and cladding 14 are welded to each other.

Thus, the conductive layer 4 at the other end 2b of the ALS 2 and the core 12 at the one end 8a of the second electric wire 48 are bonded to each other by "ultrasonic welding".

Thereafter, the ALS 2 and second wire 48 are removed from between the tip and anvil. The tape is wound around the outer periphery of electric wires 3. Further, as shown in FIG. 16, with the conductive layer 4 located inside and the insulating layer 7 located outside, the other end 2b of the ALS 2 is attached to the outside of the tape 15, i.e. the outer periphery of the electric wires 3.

Figure 16:
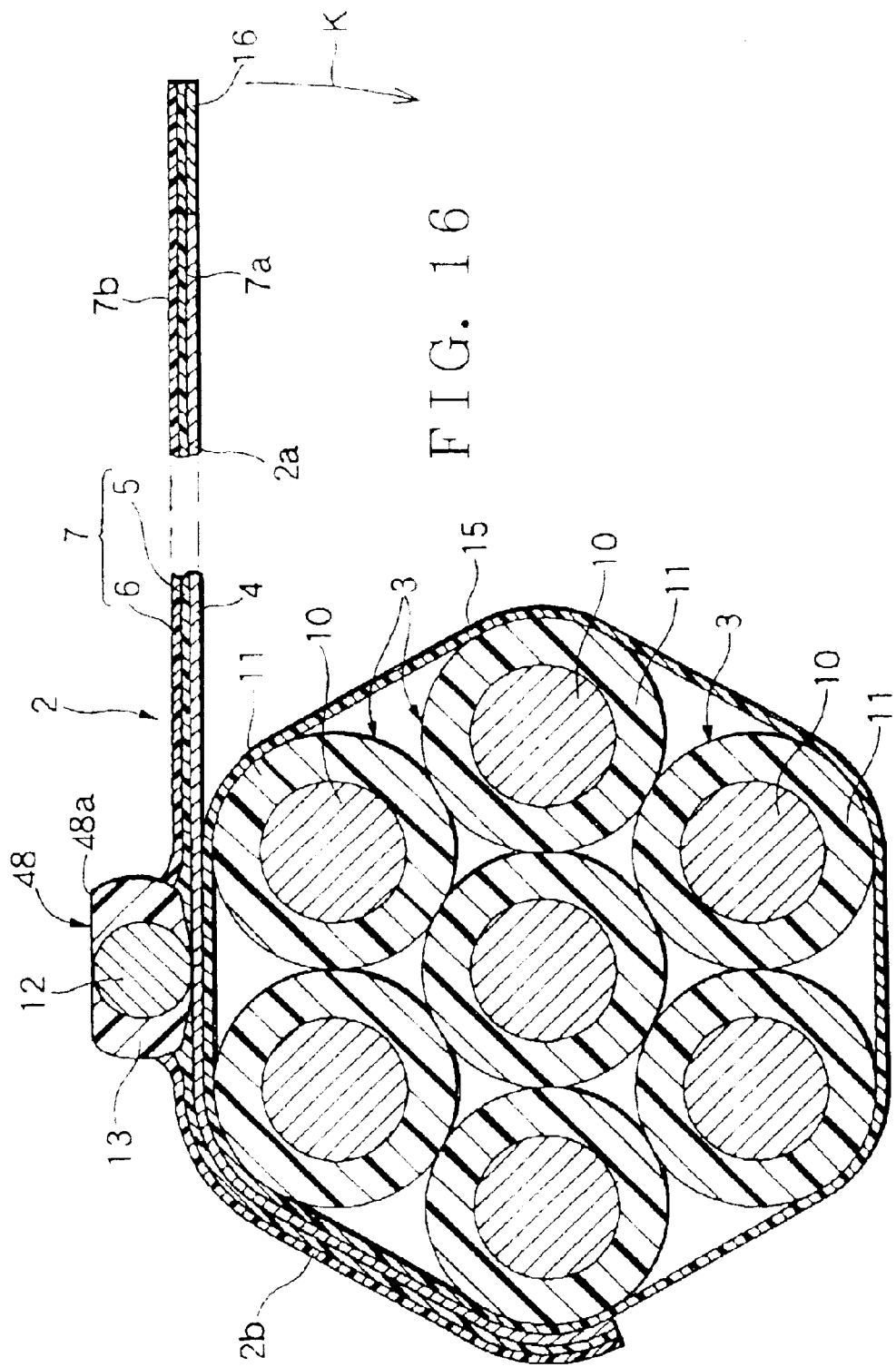
FIG. 16 is a sectional view of the state where the second end of ALS of the shield harness according to the second embodiment of this invention has been attached to the outer periphery of a plurality of wires.
Figure 17:
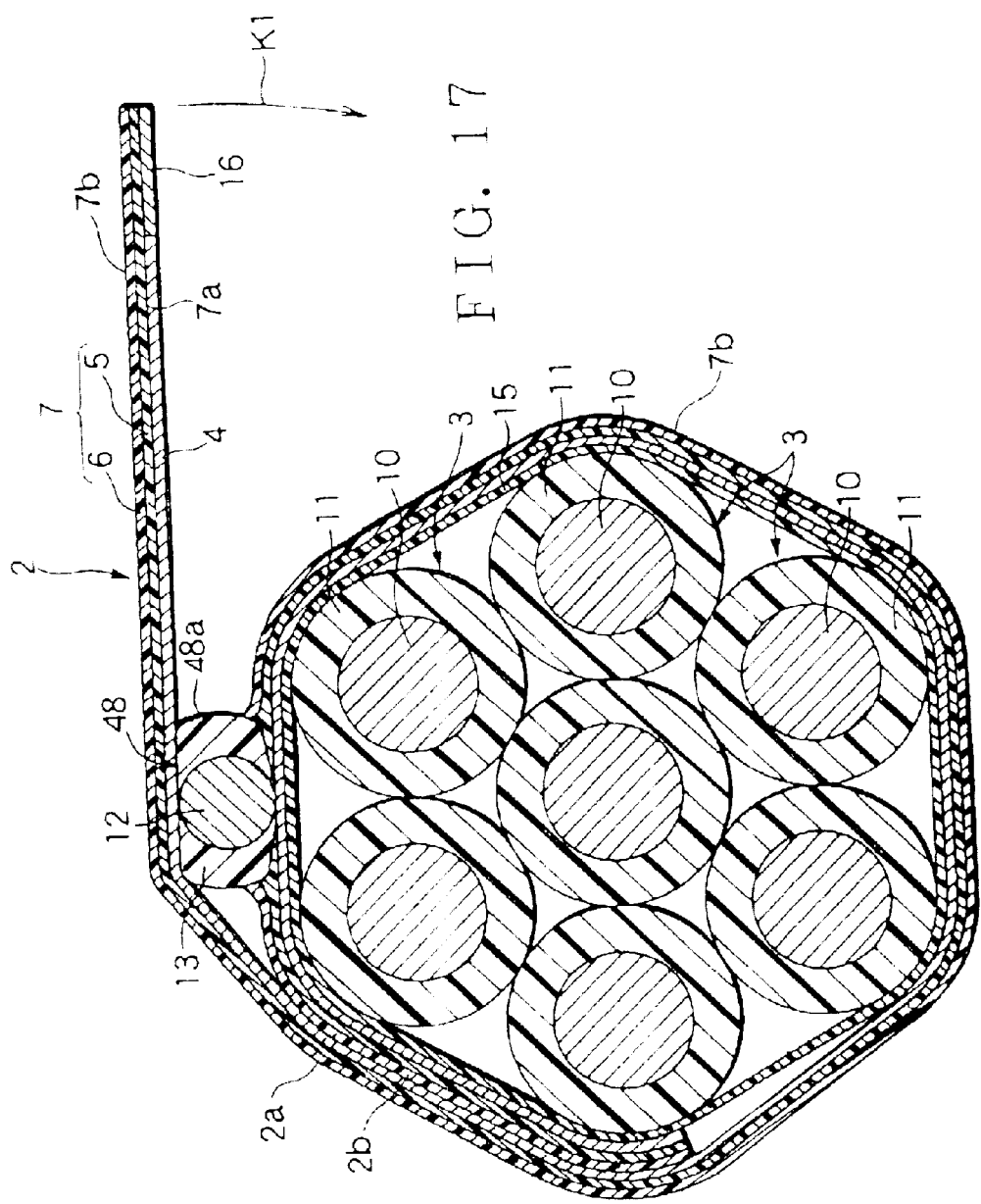
FIG. 17 is a sectional view of the state where the first end of ALS of the shield harness according to the third embodiment of this invention has been superposed on a second wire.
Figure 18:
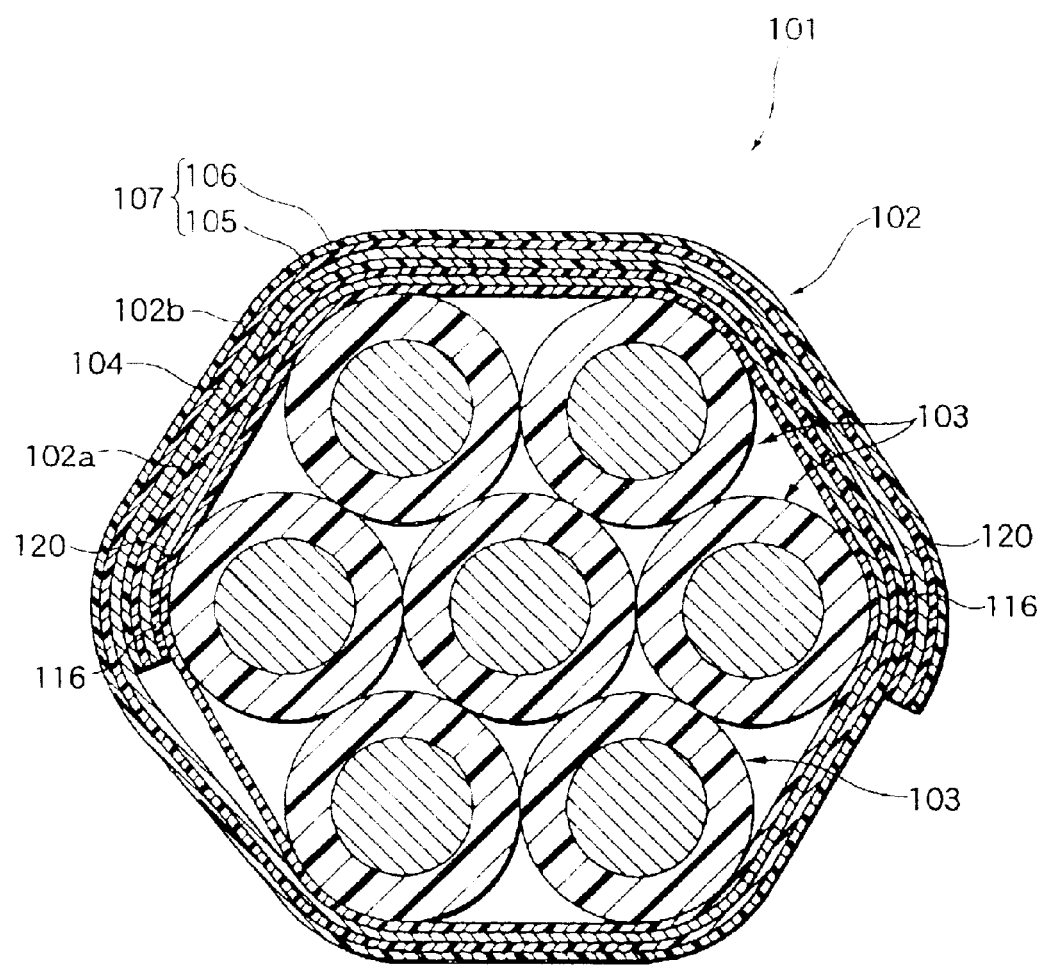
FIG. 18 is a sectional view of a conventional shield harness.
Figure 19:
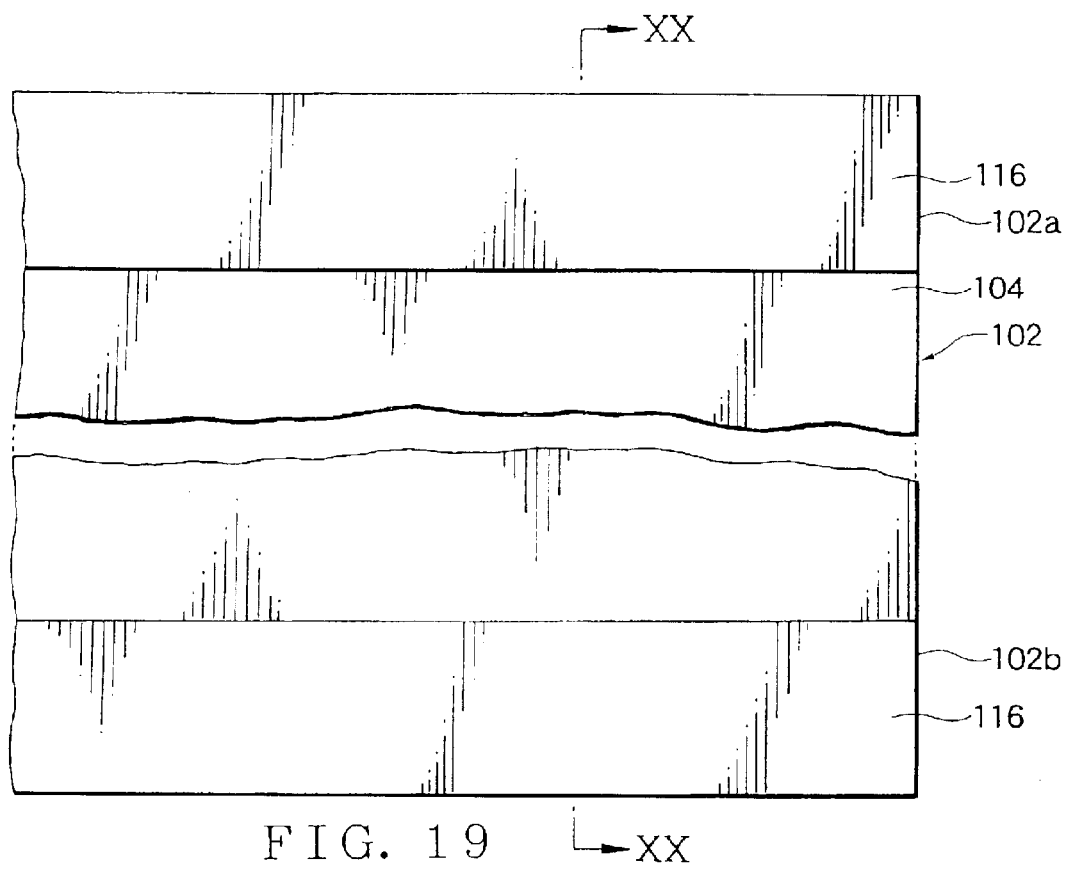
FIG. 19 is a plan view of a conductive thin film sheet of the shield harness shown in FIG. 18.
Figure 20:
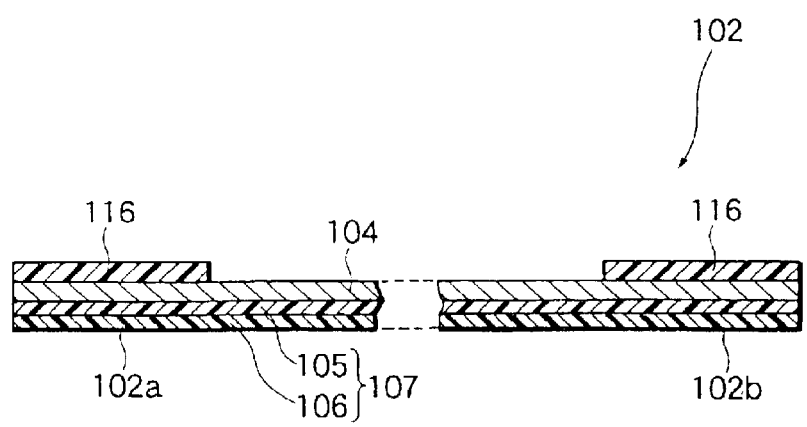
FIG. 20 is a sectional view taken in line XX—XX.

The one end 2a of the ALS 2 is wound around the outside of the other end 2b and second electric wire 48 as illustrated in FIG. 17 along arrow K in FIG. 16. Further, the one end 2a is wound around the outer periphery of the electric wires 3 along arrow K1 in FIG. 17 so that the both-sided tape 16 located at the one end 2a is pasted on the insulating layer 7 of the ALS 2.

In this way, the ALS 2 is wound continuously around the outer periphery of the electric wires 3 from the other end 2b toward the one end 2a. The one end 2a is superposed on both other end 2b and second electric wire 48. Namely, both ends 2a and 2b are superposed on each other. Thus, the shield harness 1 is acquired in which the conductive layer 4 and the ALS 2 and core 12 of the second electric wire 8 are bonded to each other and the one end 2a is superposed on both outsides of the other end 2b and second electric wire 8.

A plurality of shield harnesses 1 each thus acquired are combined with one another. The second electric wire 8 bonded to said conductive layer 4 is connected to a desired grounding circuit and others. The shield harness 1 dissipates the noise, which tends to invade the cores 10 of the electric wires, outwardly from the grounding circuit or shield harness 1 through the conductive layer 4 of the ALS 2 and the core 12 of the second electric wire 8 connected thereto. Accordingly, the ALS 2 of the shield harness electrically shields the plurality of electric wires 3.

In accordance with this embodiment, the both-sided tape 16 and the conductive layer 4 are attached to the one surface 7a of the insulating layer. For this reason, as seen from FIG. 13, a gap is difficult to occur between both ends 2a and 2b where the ALSs 2 overlap each other. Hence, the ALS 2 is difficult to develop wrinkles. Thus, in the shield harness 1, the ALS 2 wound around the outer periphery of the electric wires 3 can surely prevent noise from invading the electric wires 3.

Since the gap is difficult to occur between both ends 2a and 2b where the ALSs 2 overlap each other, when the shield harness 1 is attached to the motor vehicle, the conductive layer 4 is prevented from being flexed and broken owing to the vibration while the vehicle runs. Thus, in the shield harness 1, the ALS 2 wound around the outer periphery of electric wires 3 can surely prevent noise from invading the electric wires 3.

The conductive layer 4 extends between the edge 16a on the side of the other end 2b of the both-sided tape 16 and the other end 2b of the ALS 2. For this reason, the gap becomes difficult to occur between the both-sided tape 16 and the conductive layer 4. It should be noted that the widthwise direction accords with the diametrical direction of the electric wire 3.

Therefore, when the ALS 2 is wound around the outer periphery of electric wires 3, as seen from FIG. 13, the gap becomes difficult to occur between both ends 2a and 2b where the ALSs 2 overlap each other. Thus, in the shield harness 1, the ALS 2 wound around the periphery of the plurality of electric wires 3 can surely prevent noise from invading the electric wires 3.

Further, in this embodiment, since the thickness T1 of the conductive layer 4 is equal to the thickness T2 of the both-sided tape 16, when the ALS 2 is wound around the outer periphery of the electric wires 3, in the vicinity of the both-sided tape 16, the gap becomes further difficult to occur. Thus, in the shield harness 1, the ALS 2 wound around the periphery of the plurality of electric wires 3 can surely prevent noise from invading the electric wires 3.

In this embodiment, The ALS 2 is wound around the outer periphery of the electric wires 3. In this case, the second electric wire 8 can be used as a drain wire. Since the core 12 of the second electric wire 8 and the conductive layer 4 of the ALS are bonded to each other by ultrasonic welding, no other component is required for bonding. This prevents an increase in the number of the components.

In this way, since the number of components in the shield harness is prevented from being increased, the production cost in the wire harness assembled using the shield harness 1 can be suppressed.

Further, in this embodiment, since the core 12 of the second electric wire 48 and the conductive layer 4 of the ALS 2 are bonded by ultrasonic welding, they can be surely metallic-bonded, and hence surely electrically bonded to occur. Thus, the noise which tends to invade the cores 10 of the plurality of electric wires 3 can be surely dissipated externally through the conductive layer 4 of the ALS 2 and the core 12 of the second electric wire 8.

Since the conductive layer 4 and core 12 of the second electric wire 8 are bonded to each other by ultrasonic welding, the insulating layer 7 and cladding 13 at the other end 2b of the ALS 2 and the one end 8a of the second electric wire 8 are molten so that they are removed from between the conductive layer 4 and core 12. Therefore, any specific step of removing them is not required. This prevents the number of man-hours in assembling the shield harness from being increased. The production cost of the shield harness 1 and the wire harness equipped with it can be further suppressed.

Since the ALS 2 is wound around the plurality of electric wires 3 sequentially from the other end 2b, the bonding portion where the conductive layer 4 and core 12 are bonded to each other and the other end 2b are covered with the one end 2a of the ALS 2. Therefore, the bonding portion is not exposed. Further, since the ALS 2 is wound around the plurality of electric wires 3 with the conductive layer 4 located inside and insulating layer 7 located outside, the conductive layer 4 is not exposed.

For this reason, it is not necessary to use the protector and tube so that the bonding portion and conductive layer 4 are not exposed. This suppresses the increase of the number of components and hence the production cost of the wire harness assembled using the shield wire 1.

Since the bonding portion and the conductive layer 4 are not exposed, corrosion of the conductive layer 4 can be surely suppressed. This contributes to prevent the noise from invading the plurality of electric wires from outside.

Since the ALS 2 is wound around the outer periphery of the electric wires 3 with the conductive layer 4 located inside and insulating layer 7 located outside, the ALS 2 and the second electric wire 8 serving as the drain wire are prevented from being short-circuited with the other electric wire or electric appliance.

Further, since the core 12 of the second electric wire 48 is round-shaped in section, the force which causes the tip and anvil to approach each other is concentrated at the portion where the ALS 2 and the second electric wire 8 are in contact with each other. Therefore, the insulating layer 4 and core 12 which have molten are swiftly removed from between the conductive layer 4 and the core 12. Thus, the conductive layer 4 and the core 12 can be bonded to each other surely. Accordingly, the noise which tends to invade the electric wires 3 can be dissipated outwardly from the shield harness 1 through the second electric wire 8.

In this embodiment, the ALS 2 made of aluminum or aluminum alloy was used as the conductive thin film sheet. However, in place of the ALS, the conductive thin film sheet made of copper or copper alloy other than aluminum or aluminum alloy may be adopted.

In this embodiment, the plurality of electric wires 3 each round-shaped in section are bunched. However, a flat cable, such as a flexible flat cable (FFC) in which conductors each square-shaped in section are arranged or a flexible printed circuit (EPC), may be adopted.

In this embodiment, the core 12 and conductive layer 4 were bonded at a single point. However, in order to enhance the mechanical strength for fixing the core 12 and the conductive layer 4, the core 12 and the conductive layer 4 may be bonded at plural points.

In the embodiment, the both-sided tape 16 was pasted on the one end 2a of the ALS 2. However, two both-sided tapes 16 may be pasted on both ends 2a and 2b, respectively.

Embodiment 3

Now referring to FIGS. 12 and 21 to 26, an explanation will be given of a shield harness according to the third embodiment of this invention.

The configuration of the shield harness according to this embodiment is basically similar to that according to the second embodiment. Specifically, as seen from FIGS. 12 and 21, a shield harness 1 is composed of a plurality of electric wires 3, a aluminum laminate sheet (hereinafter referred to as ALS) 2 which serves as a conductive thin film sheet and a second electric wire 48.

Figure 12:
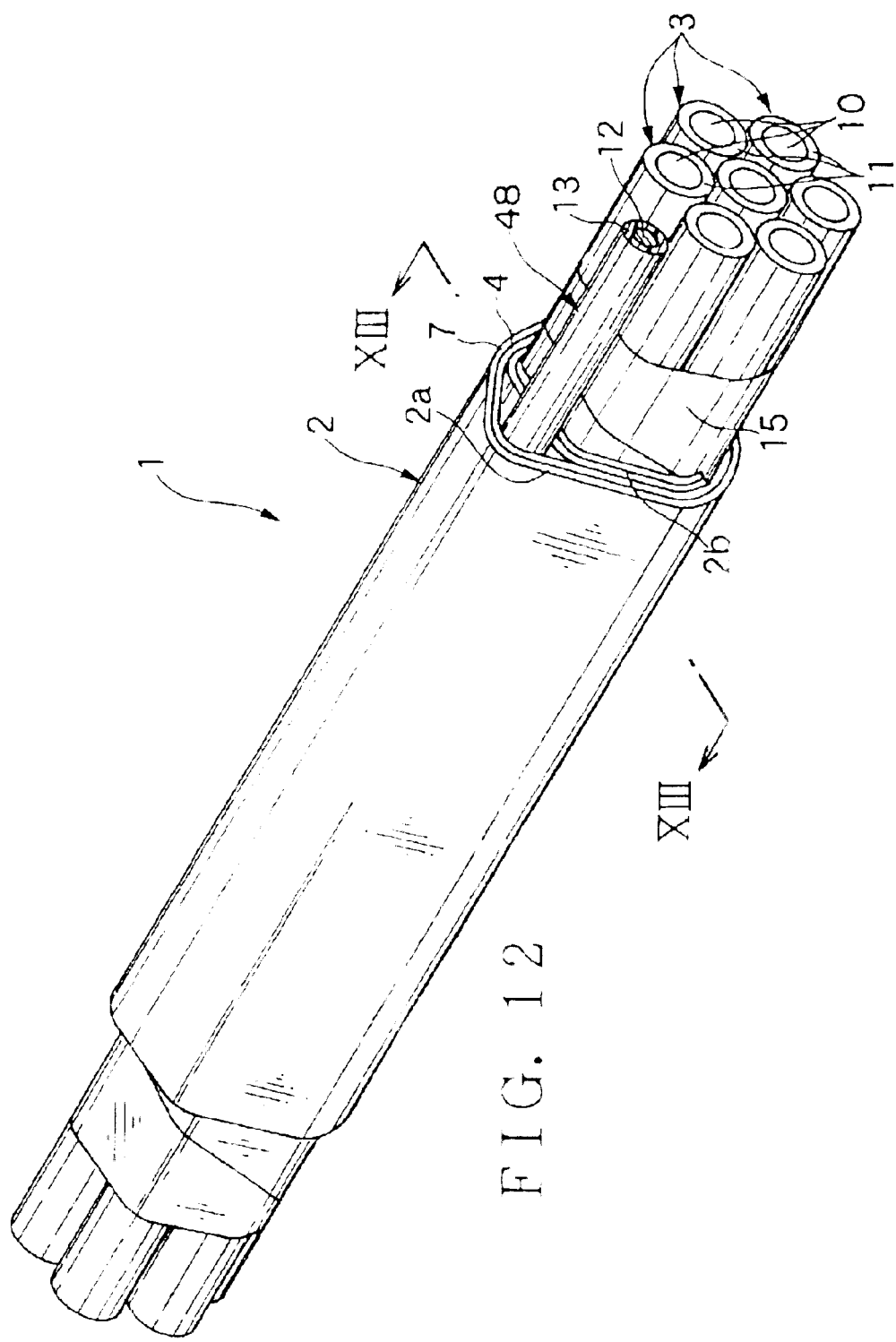
FIG. 12 is a perspective view, of a shield harness according to the third embodiment of this invention.

As seen from FIG. 12, each of the electric wires 3 around which the ALS 2 is wound is round in the sectional shape. The electric wire 3 is composed of a core 10 having a round sectional shape and a cladding 11 which clads the core 10. The core 10 is a single conductive line or is composed of a plurality of twisted conductive lines. The conductive line is made of metal. The core 10 has flexibility. The cladding is made of synthetic resin having insulating property and flexibility.

Figure 21:
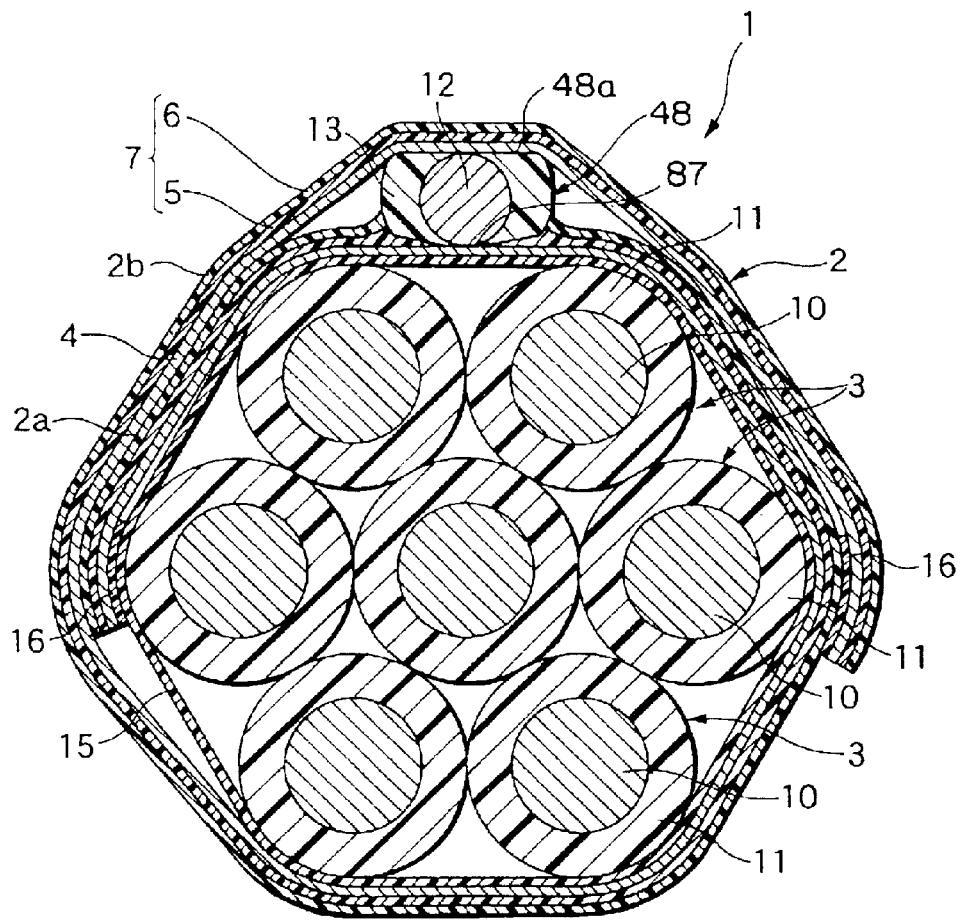
FIG. 21 is a section view taken in line XIII—XIII in FIG. 12 according to the fourth embodiment of this invention.

As seen from FIG. 21, the ALS 2 is formed as a relatively thin sheet composed of a thin conductive layer 4 and a thin insulating layer 7 stacked thereon. The ALS 2 is formed in a square shape in plan. The conductive layer 4 is made of a conductive metal. The conductive layer 4 has flexibility. The conductive layer 4 contains aluminum or aluminum alloy. The insulating layer 7 is composed of a first insulating layer 5 and a second insulating layer 6.

The first insulating layer 5 is made of insulating synthetic resin and stacked on the conductive layer 4. The first insulating layer 5 has flexibility and is made of e.g. polyethyleneterephthalate (PET). The second insulating layer 6 is made of insulating synthetic resin and stacked on the first insulating film 5. The second insulating film 6 has flexibility and is made of e.g. polyvinylchloride (PVC).

The second electric wire 48 is composed of a core 12 and a cladding 13 which clads the core. The core 12 is a single conductive line or is composed of a plurality of twisted conductive lines, and has a round shape in section. The conductive line is made of metal. The core 12 has flexibility. The cladding 13 is made of synthetic resin having insulating property and flexibility.

A tape 15 is wound around the outer periphery of the electric wires 3 which are bunched. The core 12 of the second electric wire 48 is bonded onto the conductive layer 4 located at the one end 2a (FIG. 21) in the widthwise direction of the ALS 2. The shield harness 1 is constructed so that with the conductive layer 4 located inside and the insulating layer 7 located outside, the ALS 2 is wound around the outer periphery of the electric wires 3 from the outside of the tape 15.

The second electric wire 48 is superposed on the insulating layer 7 of the ALS 2, and the cladding 13 of the second electric wire 48 is welded to the insulating layer 7. In the illustrated example, the core 12 at the one end 48a of the second electric wire 48 and conductive layer 4 at the one end 2a of the ALS 2 are bonded to each other. Namely, the core 12 of the second electric wire 48 is electrically connected the conductive layer 4.

After the one end 2a of the ALS 2 has been attached to the outside of the tape 15, the ALS 2 is wound around the outer periphery of the electric wires 3 continuously toward the other end 2b in the widthwise direction. The other end 2b will be superposed on the one end 2a. Therefore, the one end 2a is located inside whereas the other end 2b is located outside.

In this case, the other end 2a of the ALS 2 is superposed on the outside of the second electric wire 48 so as to overlie it. Known adhesive or both-sided tapes are pasted on both ends 2a and 2b of the ALS. The other end 2b is apart from the second electric wire 48.

The above adhesive or both-sided tape is pasted on the outside of the tape 15 or the insulating layer 7 at the one end 2a so that the ALS 2 is fixed on the outer periphery of the plurality of electric wires 3. To this end, the adhesive or both-sides tape is pasted on the surface of the conductive layer 4 at both ends 2a and 2b. In the illustrated example, both-sided tapes 16 (FIG. 21) are pasted on the surface of the conductive layer 4 at both ends 2a and 2b.

The shield harness 1 is acquired by fixing the conductive layer 4 of the ALS 2 and the core 12 of the second electric wire 48 to each other by means of a well known welding technique such as ultrasonic welding using a known ultrasonic machine. The conductive layer 4 of the ALS 2 and the core 12 of the second electric wire 48 are bonded to each other at a bonding position 87.

Figure 23:
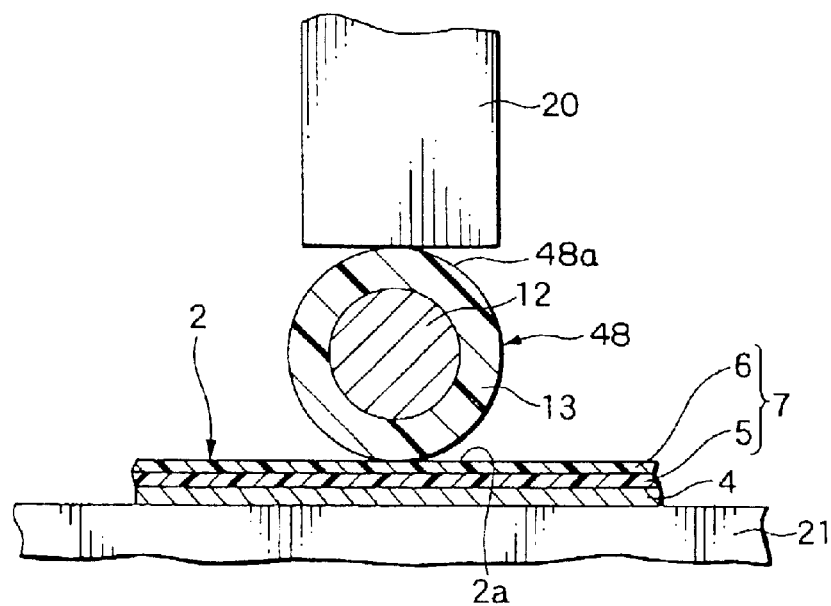
FIG. 23 is a sectional view of the state before the core of the second electric wire of the shield harness according to the third embodiment is bonded to the conductive layer of the ALS.
Figure 24:
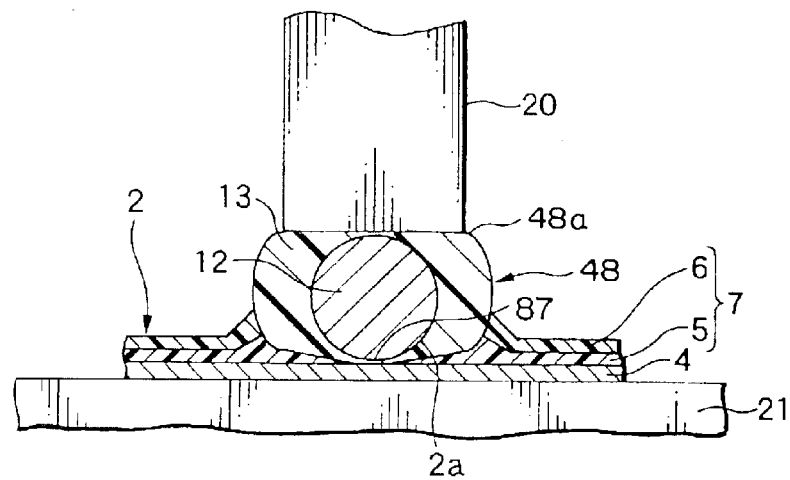
FIG. 24 is a sectional view of the state after the first end of ALS of the shield harness according to the third embodiment of this invention has been superposed on a second wire.

As seen from FIGS. 23 and 24, the ultrasonic welding machine includes a tip (tool horn) 20, an anvil 21 opposite to the tip, an oscillating machine (not shown), an oscillator, horn (not shown), etc. With an object to melt sandwiched between the tip 20 and anvil 21 pressurized in a direction of causing the tip 20 and anvil 21 to approach each other, the ultrasonic welding machine oscillates the oscillator by the oscillating machine and gives the oscillation to the tip 20 via the cone and horn. Thus, the ultrasonic welding machine melts the object.

In manufacturing the shield harness 1, first, the one end of the ALS 2 is superposed on the anvil 21, the second electric wire 48 is superposed on the ALS 2, and the tip is brought into contact with the second wire 48. At this time, the conductive layer 4 is brought into contact with the anvil 21 and the second electric wire 48 is superposed on the insulating layer 7. Thus, as seen from FIG. 23, the above one end 2a of the ALS 2 and one end 48a of the second electric wire 48 are sandwiched between the tip 20 and anvil 21.

With the tip 20 and anvil 21 pressurized in the direction of causing them to approach each other, the oscillation of the oscillator is given to the tip via the horn. This state is continued for a while. The above oscillation is generated between the ALS 2 and second electric wire 48 so that the insulating layer 7 and cladding 13 are first molten.

Since the tip 20 and anvil 21 have been pressurized in the direction of causing them to approach each other, when the insulating layer 7 and the cladding 13 are molten, they are removed from between the conductive layer 4 and core 12 so that the conductive layer 4 and core 12 are brought into contact with each other. At this time, as seen from FIG. 24, the conductive layer 4 and core 12 are metal-bonded to each other in their solid phase in a non-molten state. Then, the oscillation of the oscillator is stopped.

Since the insulating layer 7 and cladding 13 have been once molten, they are welded to each other. Thus, the conductive layer 4 of the ALS 2 and the core 12 of the second electric wire 48 are bonded to each other by "ultrasonic welding".

Thereafter, the ALS 2 and second electric wire 48 are removed from between the tip 20 and anvil 21. The tape is wound around the outer periphery of the electric wires 3. Further, as seen from FIG. 25, with the conductive layer 4 located inside and the insulating layer 7 located outside, the one end of the ALS 2 is wound is put on the outer surface of the tape 15 by the both-sided tape 16.

Figure 26:
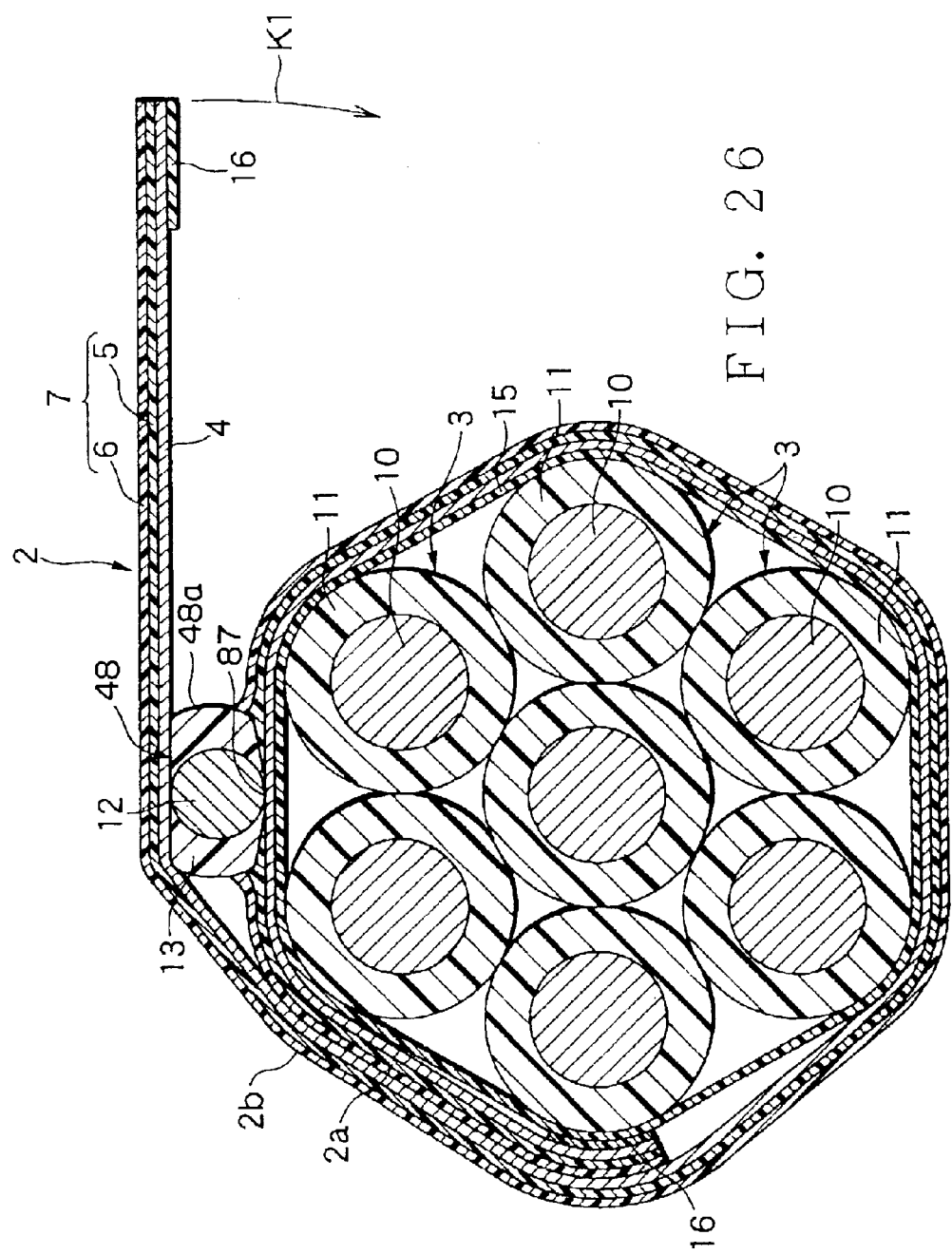
FIG. 26 is a sectional view of the state where the other end of the ALS of the shield harness according to the third embodiment has been superposed on the second electric wire.

The other end 2b of the ALS 2 is wound around the outside of the other end 2a and second electric wire 48 along arrow K in FIG. 25 in the manner illustrated in FIG. 26. Further, the other end 2b is wound around the outer periphery of the electric wires 3 along arrow K1 in FIG. 26 so that the other end 2b is attached to the insulating layer 7 by the both-sided tape 16.

In this way, the ALS 2 is wound continuously around the outer periphery of the electric wires 3 from the one end 2a toward the other end 2b. The other end 2b is superposed on both one end 2a and second electric wire 48. Namely, both ends 2a and 2b are superposed on each other. Thus, the shield harness 1 is acquired in which the conductive layer 4 of the ALS 2 and core 12 of the second electric wire 48 are bonded to each other and the other end 2b is superposed on both outsides of the one end 2a and second electric wire 48.

A plurality of shield harnesses 1 each thus acquired are combined with one another. The second electric wire 48 bonded to said conductive layer 4 is connected to a desired grounding circuit and others. The shield harness 1 dissipates the noise, which tends to invade the cores 10 of the electric wires, outwardly from the grounding circuit or shield harness 1 through the conductive layer 4 of the ALS 2 and the core 12 of the second electric wire 48 connected thereto. Accordingly, the ALS 2 of the shield harness 1 electrically shields the plurality of electric wires 3.

In accordance with this embodiment, with the core 12 of the second electric wire 48 and conductive layer 4 of the conductive layer 4 bonded to each other by ultrasonic welding, the ALS 2 is wound around the outer periphery of the electric wires 3. In this case, the second electric wire 48 can be used as a drain wire.

Since the core 12 of the second electric wire 48 and the conductive layer 4 of the ALS are bonded to each other by ultrasonic welding, no other component is required for bonding. This prevents an increase in the number of the components.

In this way, since the number of components in the shield harness is prevented from being increased, the production cost in the wire harness assembled using the shield harness 1 can be suppressed.

Further, in this embodiment, since the core 12 of the second electric wire 48 and the conductive layer 4 of the ALS 2 are bonded by ultrasonic welding, they can be surely metallic-bonded, and hence surely electrically bonded to occur. Thus, the noise which tends to invade the cores 10 of the plurality of electric wires 3 can be surely dissipated externally through the conductive layer 4 of the ALS 2 and the core 12 of the second electric wire 48.

Since the conductive layer 4 and core 12 of the second electric wire 48 are bonded to each other by ultrasonic welding, the insulating layer 7 and cladding 13 at the other end 2b of the ALS 2 and the one end 48a of the second electric wire 48 are molten so that they are removed from between the conductive layer 4 and core 12. Therefore, any specific step of removing them is not required. This prevents the number of man-hours in assembling the shield harness from being increased. The production cost of the shield harness 1 and the wire harness equipped with it can be further suppressed.

Since the ALS 2 is wound around the outer periphery of the electric wires 3 sequentially from the one end 2a, the bonding portion where the conductive layer 4 and core 12 are bonded to each other and the one end 2a are covered with the one end 2a of the ALS 2. Therefore, the bonding portion is not exposed. Further, since the ALS 2 is wound around the outer periphery of the electric wires 3 with the conductive layer 4 located inside and insulating layer 7 located outside, the conductive layer 4 is not exposed.

For this reason, it is not necessary to use the protector and tube so that the bonding portion and conductive layer 4 are not exposed. This suppresses the increase of the number of components and hence the production cost of the wire harness assembled using the shield wire 1.

Since the bonding portion and the conductive layer 4 are not exposed, corrosion of the conductive layer 4 can be surely suppressed. This contributes to prevent the noise from invading the plurality of electric wires from outside.

Since the ALS 2 is wound around the outer periphery of the electric wires 3 with the conductive layer 4 located inside and insulating layer 7 located outside, the ALS 2 and the second electric wire 48 serving as the drain wire are prevented from being short-circuited with the other electric wire or electric appliance.

Further, since the core 12 of the second electric wire 48 is round-shaped in section, the force which causes the tip and anvil to approach each other is concentrated at the portion where the ALS 2 and the second electric wire 48 are in contact with each other. Therefore, the insulating layer 4 and core 12 which have molten are swiftly removed from between the conductive layer 4 and the core 12. Thus, the conductive layer 4 and the core 12 can be bonded to each other surely. Accordingly, the noise which tends to invade the electric wires 3 can be dissipated outwardly from the shield harness 1 through the second electric wire 48.

In this embodiment, the ALS 2 made of aluminum or aluminum alloy was used as the conductive thin film sheet. However, in place of the ALS, the conductive thin film sheet made of copper or copper alloy other than aluminum or aluminum alloy may be adopted.

In this embodiment, the plurality of electric wires 3 each round-shaped in section are bunched. However, a flat cable, such as a flexible flat cable (FFC) in which conductors each square-shaped in section are arranged or a flexible printed circuit (EPC), may be adopted.

In this embodiment, the core 12 and conductive layer 4 were bonded at a single point. However, in order to enhance the mechanical strength for fixing the core 12 and the conductive layer 4, the core 12 and the conductive layer 4 may be bonded at plural points.

Embodiment 4

Referring to FIGS. 27 to 30, an explanation will be given of the shield harness according to the fourth embodiment of this invention.

The configuration of the shield harness according to this embodiment is basically similar to that according to the third embodiment. Specifically, as seen from FIGS. 27 and 28, a shield harness 1 is composed of a plurality of electric wires 3, an aluminum laminate sheet (hereinafter referred to as ALS) 2 which serves as a conductive thin film sheet and a second electric wire 48.

Each of the electric wires 3 around which the ALS 2 is wound is round in the sectional shape. The electric wire 3 is composed of a core 10 having a round sectional shape and a cladding 11 which clads the core 10. The core 10 is a single conductive line or is composed of a plurality of twisted conductive lines. The conductive line is made of metal. The core 10 has flexibility. The cladding 11 is made of synthetic resin having insulating property and flexibility.

Figure 28:
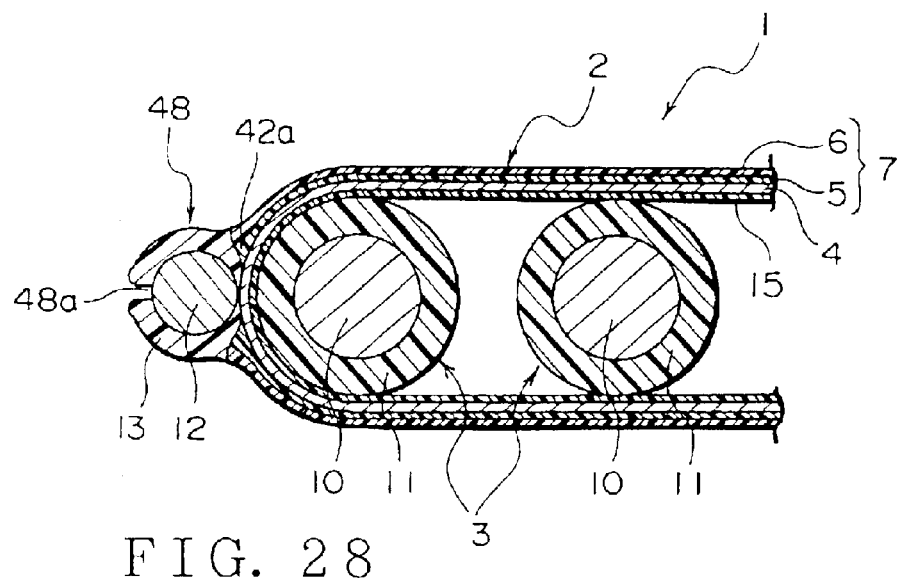
FIG. 28 is a sectional view taken along line II—II in FIG. 27.

As seen from FIG. 28, the ALS 2 is formed as a relatively thin sheet composed of a thin conductive layer 4 and a thin insulating layer 7 stacked thereon. The conductive layer 4 is made of a conductive metal. The conductive layer 4 has flexibility. The conductive layer 4 contains aluminum or aluminum alloy. The insulating layer 7 is composed of a first insulating layer 5 and a second insulating layer 6. As seen from FIG. 28, the insulating layer 7 is composed of a first insulating layer 5 and a second insulating layer 6.

The first insulating layer 5 is made of insulating synthetic resin and stacked on the conductive layer 4. The first insulating layer 5 has flexibility and is made of e.g. polyethyleneterephthalate (PET). The second insulating layer 6 is made of insulating synthetic resin and stacked on the first insulating film 5. The second insulating film 6 has flexibility and is made of e.g. polyvinylchloride (PVC). The ALS 2 having such a structure is equipped with the metallic piece.

The second electric wire 48 is composed of a core 12 and a cladding 13 which clads the core 12. The core 12 is a single conductive line or is composed of a plurality of twisted conductive lines, and has a round shape in section. The conductive line is made of metal. The core 12 has flexibility. The cladding 13 is made of synthetic resin having insulating property and flexibility.

A tape 15 is wound around the outer periphery of the electric wires 3 which are bunched. The core 12 of the second electric wire 48 is bonded onto the conductive layer 4. The shield harness 1 is constructed so that with the conductive layer 4 located inside and the insulating layer 7 located outside, the ALS 2 is wound around the outer periphery of the plurality of electric wires 3 from the outside of the tape 15.

As seen from FIG. 28, the cladding 13 of the second electric wire 48 is welded to the insulating layer 7 of the ALS 2. In the illustrated example, the core 12 at the one end 48*a* of the second electric wire 48 and the conductive layer 4 at the central portion 42*a* of the ALS 2 are bonded to each other. The central portion 42*a* is located centrally in the longitudinal direction of the electric wire 3. As seen from FIG. 27, the other end 48*b* of the second electric wire 48 is equipped with a terminal metal fitting 14 to which a grounding circuit is to be connected.

The core 12 of the second electric wire 48 is electrically connected to the conductor layer 4. The shield harness 1 is acquired by fixing the conductive layer 4 of the ALS 2 and the core 12 of the second electric wire 48 to each other by means of a well known welding technique such as ultrasonic welding using a known ultrasonic machine. The above central portion 42*a* and one end 48*a* represent the bonding portions between the conductive layer 4 of the ALS 2 and the core 12 of the second electric wire 48. The ultrasonic welding is performed by a known ultrasonic welding machine.

Figures 29, 30:
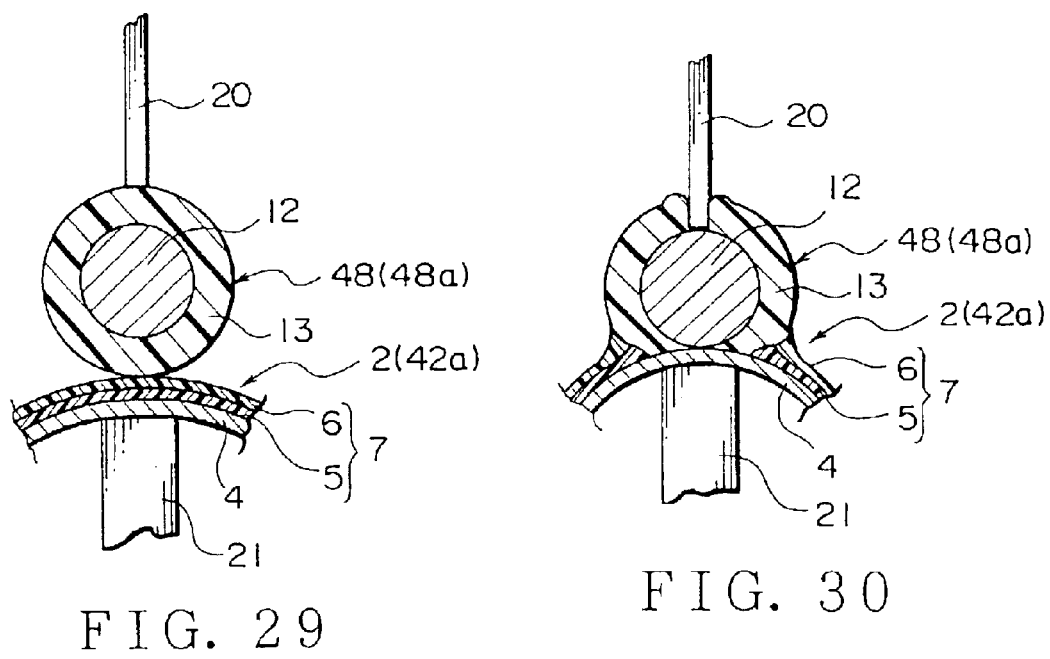
FIG. 29 is a sectional view showing the state before the core of the second electric wire and conductive layer of a conductive thin film sheet are bonded to each other in the shield harness according to the fourth embodiment of this invention.
FIG. 30 is a sectional view showing the state after the core of the second electric wire and conductive layer of a conductive thin film sheet have been bonded to each other in the shield harness according to the fourth embodiment of this invention.

As seen from FIGS. 29 and 30, the ultrasonic welding machine includes a tip (tool horn) 20, an anvil 21 opposite to the tip, an oscillating machine (not shown), an oscillator, horn (not shown), etc. With an object to melt sandwiched between the tip 20 and anvil 21 pressurized in a direction of causing the tip 20 and anvil 21 to approach each other, the ultrasonic welding machine oscillates the oscillator by the oscillating machine and gives the oscillation to the tip 20 via the cone and horn. Thus, the ultrasonic welding machine melts the object.

In manufacturing the shield harness 1, first, the conductor layer 4 is superposed on the anvil 21, the second electric wire 48 is superposed on the insulating layer 7, and the tip is brought into contact with the second wire 48. Thus, as seen from FIG. 29, the above central portion 42*a* of the ALS 2 and one end 48*a* of the second electric wire 48 are sandwiched between the tip 20 and anvil 21.

With the tip 20 and anvil 21 pressurized in the direction of causing them to approach each other, the oscillation of the oscillator is given to the tip via the horn. This state is continued for a while. The above oscillation is generated between the ALS 2 and second electric wire 48 so that the insulating layer 7 and cladding 13 are first molten.

Figure 31:
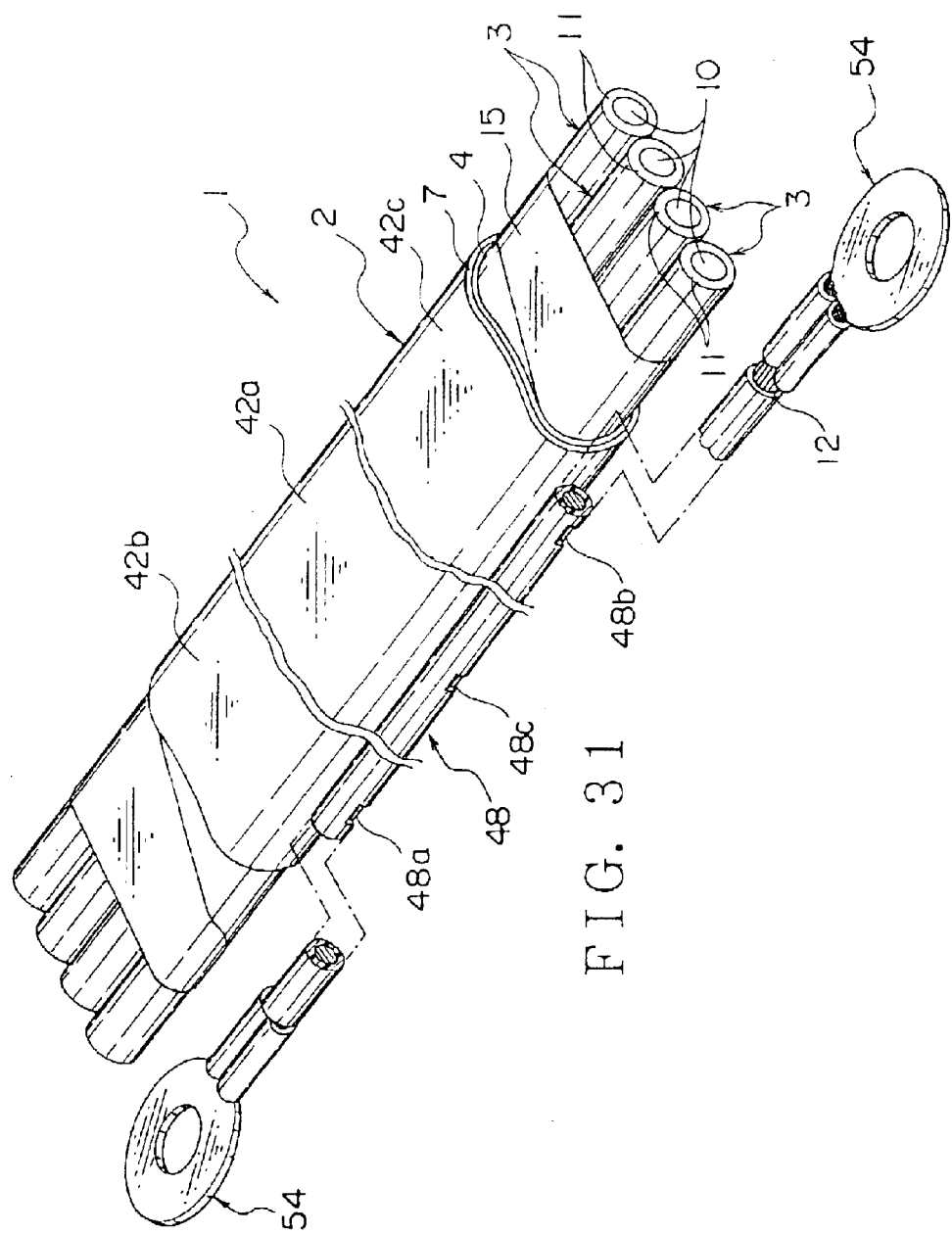
FIG. 31 is a perspective view of a modification of the shield harness according to the fourth embodiment of this invention.

Since the tip 20 and anvil 21 have been pressurized in the direction of causing them to approach each other, when the insulating layer 7 and the cladding 13 are molten, they are removed from between the conductive layer 4 and core 12 so that the conductive layer 4 and core 12 are brought into contact with each other. At this time, as seen from FIG. 31, the conductive layer 4 and core 12 are metal-bonded to each other in their solid phase in a non-molten state. Then, the oscillation of the oscillator is stopped.

Since the insulating layer 7 and cladding 13 have been once molten, they are welded to each other. Thus, the conductive layer 4 of the ALS 2 and the core 12 of the second electric wire 48 are bonded to each other by "ultrasonic welding".

Thereafter, the ALS 2 and second electric wire 48 are removed from between the tip 20 and anvil 21. The tape is wound around the outer periphery of the electric wires 3. Thus, with the conductive layer 4 located inside and the insulating layer 7 located outside, the ALS 2 is wound around the outer periphery of the electric wires 3. Both ends (not shown) of the ALS 2 are superposed on each other.

Using known adhesive, a both-sided tape with adhesive surfaces on both sides or a tape with an adhesive surface on the one side, both ends of the ALS 2 are fixed to each other. Thus, the shield harness 1 having the configuration described above is acquired with the conductive layer 4 of the ALS 2 and the core 12 of the second electric wire 48 being bonded to each other.

A plurality of shield harnesses 1 each thus acquired are combined with one another. The above metal fitting 54 is connected to a body panel of a motor vehicle and others. The shield harness 1 dissipates the noise, which tends to invade the cores 10 of the electric wires 3, outwardly from the body panel or shield harness 1 through the conductive layer 4 of the ALS 2 and the core 12 of the second electric wire 48 connected thereto. Accordingly, the ALS 2 of the shield harness electrically shields the plurality of electric wires 3.

In the embodiment described above, the one end 48*a* of the second electric wire 48 is fixed to the central portion 42*a* of the ALS 2. However, in this invention, as seen from FIG. 31, the one end 48*a*, center 48*c* and the other end 48*b* of the second electric wire 48 may be fixed to the one end 42*b*, central portion 42*a* and the other end 42*c* of the ALS 2 in the longitudinal direction of the electric wires 3, respectively.

In short, in this invention, the conductive layer 4 of the ALS 2 and the core 12 of the second electric wire 48 may be bonded to each other at any position. Incidentally, in the embodiment shown in FIG. 31, terminal metal fittings 14 are attached to both ends 48*a* and 48*b* of the second electric wire 48, respectively.

In accordance with this embodiment, with the core 12 of the second electric wire 48 and conductive layer 4 of the conductive layer 4 bonded to each other by ultrasonic welding, the ALS 2 is wound around the outer periphery of the electric wires 3. In this case, the second electric wire 48 can be used as a drain wire. Since the core 12 of the second electric wire 48 and the conductive layer 4 of the ALS are bonded to each other by ultrasonic welding, the second electric wire 48 and ALS 2 can be surely bonded to each other at any position. Therefore, the second electric wire 48 which can be used as the drain wire can be branched from any position of the ALS 2 such as both ends or central portion in the longitudinal direction of the plurality of wires 3.

In this way, when the wire harness is assembled using the shield harness, the man-hours in the assembling can be prevented from being increased. Thus, the production cost of the wire harness assembling the shield harness can be suppressed.

Further, in this embodiment, since the core 12 of the second electric wire 48 and the conductive layer 4 of the ALS 2 are bonded by ultrasonic welding, they can be surely electrically connected to each other. Thus, the noise which tends to invade the cores 10 of the electric wires 3 can be surely dissipated externally through the conductive layer 4 of the ALS 2 and the core 12 of the second electric wire 48.

Since the conductive layer 4 and core 12 of the second electric wire 48 are bonded to each other by ultrasonic welding, the insulating layer 7 at the central portion 42a of the ALS 2 and cladding 13 at the one end 48a of the second electric wire 48 are molten so that they are removed from between the conductive layer 4 and core 12. Therefore, any specific step of removing them is not required. This prevents the number of man-hours in assembling the shield harness from being increased. The production cost of the shield harness 1 and the wire harness equipped with it can be further suppressed.

Since the conductive layer 4 and core 12 are bonded to each other by ultrasonic welding, any other specific component than the ALS 2 and second electric wire 8 is not required to bond the conductive layer 4 and core 12. Thus, since an increase in the number of components of the shield harness can be suppressed, an increase in the production cost of the shield harness 1 and wire harness equipped with the shield harness 1 can be further suppressed.

Since the ALS 2 is wound around the outer periphery of the electric wires 3 with the conductive layer 4 located inside and insulating layer 7 located outside, the ALS 2 and the second electric wire 48 serving as the drain wire are prevented from being short-circuited with the other electric wire or electric appliance.

Further, since the core 12 of the second electric wire 48 is round-shaped in section, the force which causes the tip and anvil to approach each other is concentrated at the portion where the ALS 2 and the second electric wire 48 are in contact with each other. Therefore, the insulating layer 4 and core 12 which have molten are swiftly removed from between the conductive layer 4 and the core 12. Thus, the conductive layer 4 and the core 12 can be bonded to each other surely. Accordingly, the noise which tends to invade the electric wires 3 can be dissipated outwardly from the shield harness 1 through the second electric wire 48.

In this embodiment, the ALS 2 made of aluminum or aluminum alloy was used as the conductive thin film sheet. However, in place of the ALS, the conductive thin film sheet made of copper or copper alloy other than aluminum or aluminum alloy may be adopted.

In this embodiment, the plurality of electric wires 3 each round-shaped in section are bunched. However, a flat cable, such as a flexible flat cable (FFC) in which conductors each square-shaped in section are arranged or a flexible printed circuit (EPC), may be adopted.

Figure 27:
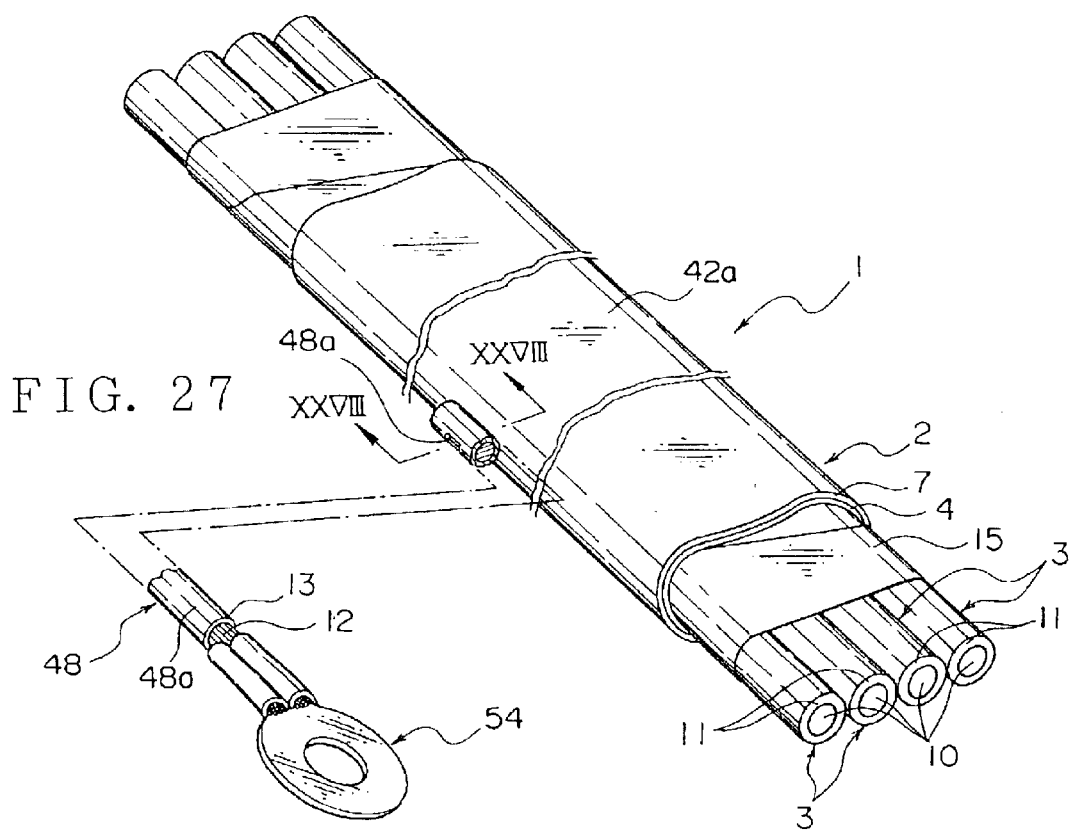
FIG. 27 is a perspective view of the shield harness according to the fourth embodiment of this invention.

In this embodiment shown in FIG. 27, the core 12 and conductive layer 4 were bonded at a single point. However, in order to enhance the mechanical strength for fixing the core 12 and the conductive layer 4, the core 12 and the conductive layer 4 may be bonded at plural points.

Figure 32:
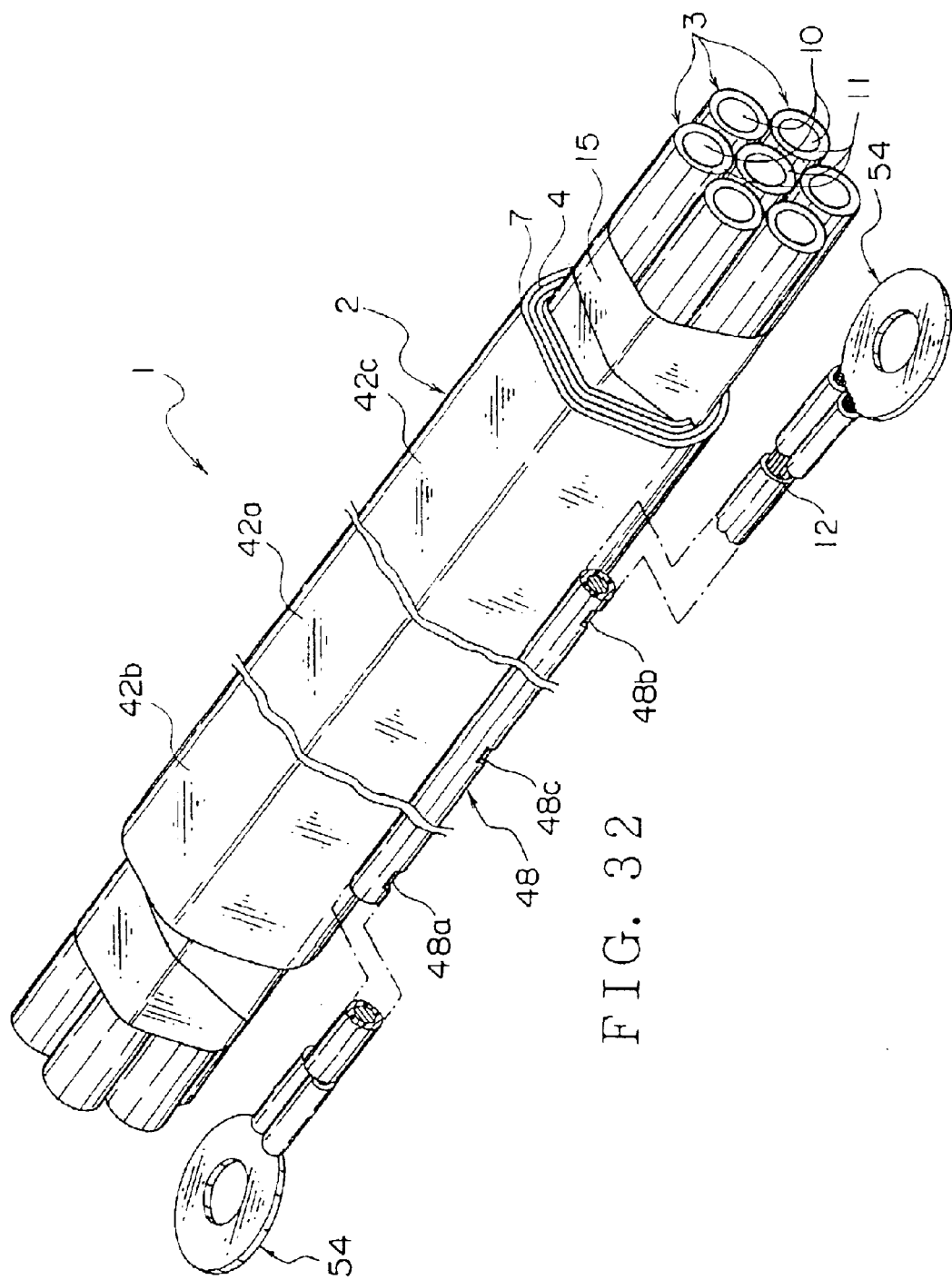
FIG. 32 is a perspective view of another modification of the shield harness according to the fifth embodiment of this invention.

In the embodiments described above, the plurality of electric wires 3 are bunched in their parallel state. However, in this invention, as shown in FIG. 32, they may be bunched in the state where they are stacked on one another. In this case, as seen from FIG. 32, the one end 48a, center 48c and the other end 48b of the second electric wire 48 may be fixed to the one end 42b, central portion 42a and the other end 42c of the ALS 2 in the longitudinal direction of the electric wires 3, respectively.

In the case of FIG. 32 also, the conductive layer 4 of the ALS 2 and the core 12 of the second electric wire 48 may be bonded to each other at any position. Incidentally, in the embodiment shown in FIG. 32, terminal metal fittings 14 are attached to both ends 48a and 48b of the second electric wire 48, respectively.

Embodiment 5

Prior to explaining the shield harness according to the fifth embodiment of this invention, an explanation will be given of the related art to this embodiment.

A motor car that is a moving body includes a wire harness arranged to supply power from a power source such a battery to electronic appliances such as various lamps and various motors mounted in the motor car, and feed a control signal to these appliances from a control device. The wire harness is composed of a plurality of electric wires 211 (FIG. 45) which are combined with one another.

Figure 45:
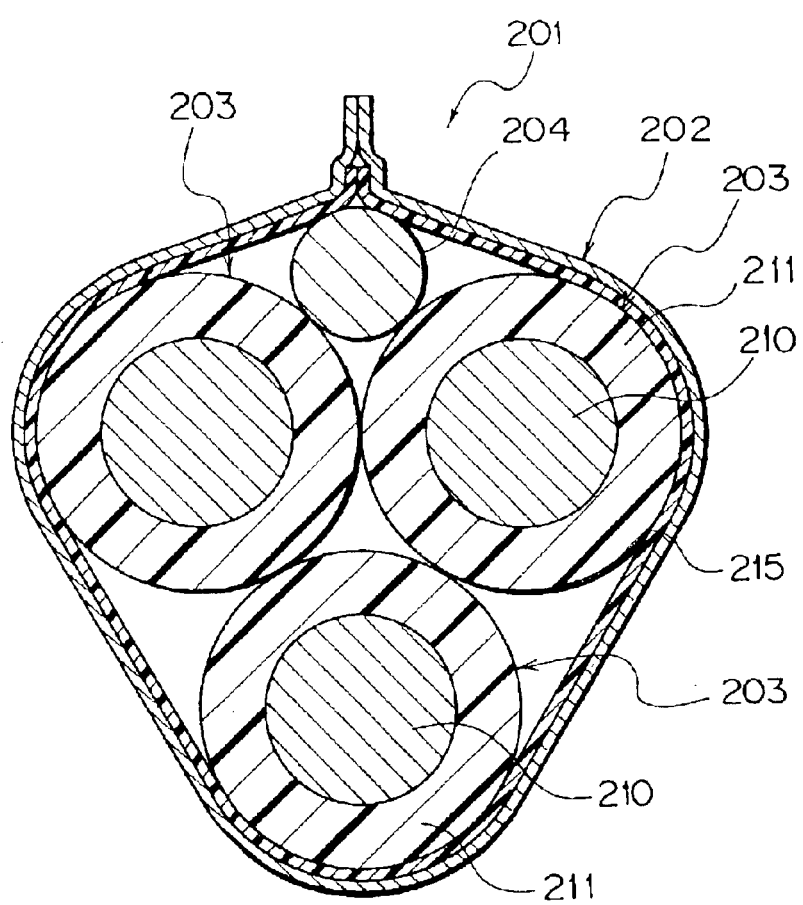
FIG. 45 is a sectional view showing a shield harness assembled according to a related art.

A shield harness 201 as shown in FIG. 45 is composed of a plurality of electric wires 203, a metallic foil 202, and a drain wire 204. Each electric wire 203 is a coated wire including a conductive core 210 and a cladding 211 which clads the core 210.

The drain wire 204 is a naked wire made of a conductive core. The drain wire 204 and the plurality of electric wires 203 are wound with a tape 215 in a state where they are in parallel. Thus, the drain wire 204 and plurality of electric wires 203 are bunched.

The metallic foil 202 is made of conductive metal such as copper and copper alloy, and is formed as a thin film. The metallic foil 202 is wound around the outer periphery of the electric wires 203 and drain wire 204 from the outside of the tape 215. The metallic foil 202 covers all the electric wires 203 and drain wire 204. Although not shown, the metallic foil 202 is in contact with the drain wire 204 at any position of the shield harness 201.

In the shield harness 201, when external noise tends to invade the core 210 of each electric wire 203, it is conducted to the metallic foil 202. The noise is dissipated externally from the shield harness 201 through the drain wire 204. Thus, the metallic wire 202 of the shield harness 201 prevents external noise from invading the core 210 of each electric wire 203.

For example, JP-A-11-39969 discloses a method of assembling the above shield harness 201. In this method, first, the metallic foil 202 and tape 215 are stacked in a groove which is square in section. Further, the plurality of electric wires 203 and the drain wire 104 are superposed on the tape 215.

In this case, the central portion of the metallic foil 202 is located on the groove and the plurality of electric wires 203 and the drain wire 204 are located on the central portion of the metallic foil 202. The plurality of electric wires 203 and drain wire 204 are pressed into the groove as well as the metallic foil 202 and the tape 215. Both ends of the metallic foil 202 are caused to approach each other and fixed to each other. Thus, the shield harness 201 having the configuration is assembled.

In the above method of assembling the shield harness 201, the plurality of electric wires 203 and drain wire 204, which are stacked on the metallic foil 202, are pressed in the groove. Therefore, the drain wire 204 is only in contact with the metallic foil 202.

When the shield harness is arranged in a motor vehicle, owing to vibration while the vehicle runs, the drain wire 204 and the metallic foil 202 may be connected to or disconnected from each other. In such a case, it is difficult to connect the drain wire 204 and the metallic foil 202 to each other consistently. This makes it difficult to dissipate the noise which tends to invade the core 210 of each electric wire 203 surely externally form the shield harness 201.

In order to keep the drain wire 204 and metallic foil 202 in consistent contact with each other, the tape 215 and metallic foil 202 must be tightly wound around the outer periphery of the electric wires 203 and the drain wire 204. Further, when the electric wires 203 and drain wire 204 are pressed in the groove, the drain wire 204 may be embedded among the plurality of electric wires 203 so that it is not in contact with the metallic foil 202.

Therefore, this fifth embodiment intends to provide a method of assembling a shield harness which can dissipate noise which tends to invade the core of an electric wire surely externally from the shield harness.

Now referring to FIGS. 33 to 44, an explanation will be given of an shield harness assembled by a method of assembling according to this embodiment.

The configuration of the shield harness according to this embodiment is basically similar to that according to the previous fourth embodiment. Specifically, as seen from FIGS. 33 and 34, a shield harness 1 is composed of a plurality of electric wires 3, a aluminum laminate sheet (hereinafter referred to as ALS) 2 which serves as a conductive thin film sheet and a second electric wire 48.

Figures 33, 36:
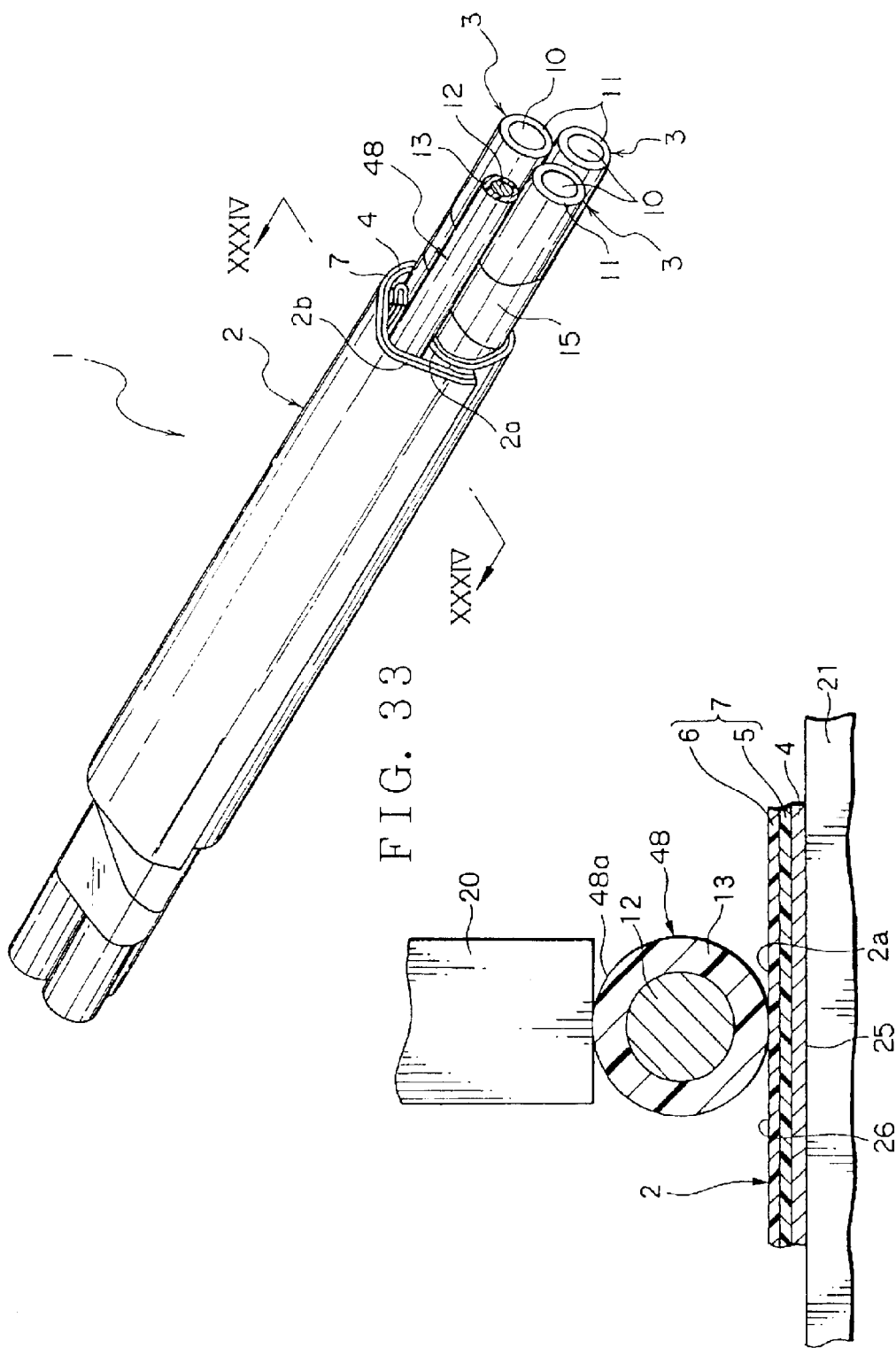
FIG. 33 is a perspective view of the shield harness assembled according to a fifth embodiment of this invention.
FIG. 36 is a sectional view showing the state before the core of the second electric wire and conductive layer of an ALS are bonded to each other in the shield harness assembled according to the fifth embodiment of this invention.
Figure 34:
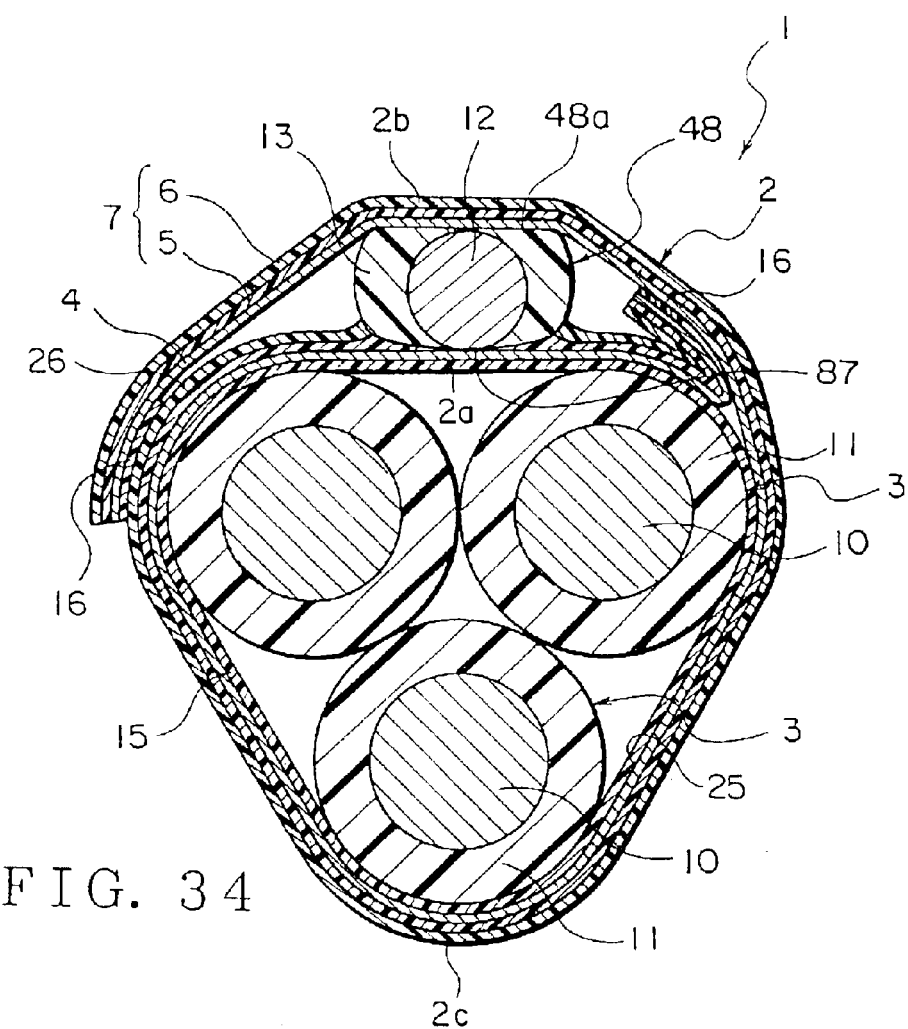
FIG. 34 is a sectional view taken along line II—II in FIG. 1.

The electric wires 3, as seen from FIGS. 33 and 34, bunched in parallel to each other. Each electric wire 3 is a coated wire composed of a core 10 and a cladding which clads the core.

The core 10 is a single conductive line or is composed of a plurality of twisted conductive lines, and round in section. The conductive line is made of metal. The core 10 has flexibility. The cladding is made of synthetic resin having insulating property and flexibility.

As seen from FIG. 35, the ALS 2 is formed as a relatively thin sheet composed of a thin conductive layer 4 and a thin insulating layer 7 stacked thereon. The ALS 2 is formed in a square shape in plan. The conductive layer 4 is made of a conductive metal. The conductive layer 4 has flexibility. The conductive layer 4 contains aluminum or aluminum alloy. The insulating layer 7 is composed of a first insulating layer 5 and a second insulating layer 6. The insulating layer 7 is composed of a first insulating layer 5 and a second insulating layer 6.

The first insulating layer 5 is made of insulating synthetic resin and stacked on the conductive layer 4. The first insulating layer 5 has flexibility and is made of e.g. polyethyleneterephthalate (PET). The second insulating layer 6 is made of insulating synthetic resin and stacked on the first insulating film 5. The second insulating film 6 has flexibility and is made of e.g. polyvinylchloride (PVC). The ALS 2 having such a structure is equipped with the metallic piece.

Both-sided tapes 16 on both sides of which adhesive is applied are pasted on both ends 2a and 2b of the ALS 2 in the width direction thereof. The both-sided tapes 16 are pasted on the one surface 25 of the ALS 2 which is the surface of the conductive layer 4. Namely, the both-sided tape 16 is pasted on the conductive layer. The conductive layer 4 is located on the side of the one surface 25 of the ALS 2 while the insulating layer 7 is located on the side of the other surface 26 thereof. Incidentally, in this embodiment, known adhesive may be pasted on the one surface 25 at both ends 2a and 2b of the ALS 2.

The second electric wire 48 is composed of a core 12 and a cladding 13 which clads the core. The core 12 is a single conductive line or is composed of a plurality of twisted conductive lines, and has a round shape in section. The conductive line is made of metal. The core 12 has flexibility. The cladding 13 is made of synthetic resin having insulating property and flexibility.

A tape 15 is wound around the outer periphery of the electric wires 3 which are bunched. The core 12 of the second electric wire 48 is bonded onto the conductive layer 4 at the one end 2a of the ALS 2 in the width direction (FIG. 35). The shield harness 1 is constructed so that with the conductive layer 4 located inside and the insulating layer 7 located outside, the ALS 2 is wound around the outer periphery of the electric wires 3 from the outside of the tape 15.

The second electric wire 48 is superposed on the other surface 26 of the ALS 2 which is the surface of the insulating layer 7. Namely, the second electric wire 48 is superposed on the insulating layer 7. In the illustrated example, the core 12 of the second electric wire 48 at the one end 48a and the conductive layer 4 of the ALS 2 at the one end 2a in the width direction are bonded to each other. The position where the conductive layer 4 and the ALS 2 and the core 12 of the second electric wire 48 are bonded is referred to as "bonding position 87".

Therefore, the core 12 of the second electric wire 48 is electrically connected to the conductive layer 4. At the position, the insulating layer 7 and the cladding 13 are welded to each other.

The conductive layer 4 of the ALS 2 and the core 12 of the second electric wire 48 are welded to each other by means of a well known welding technique such as ultrasonic welding using a known ultrasonic machine. The ultrasonic welding is performed by a known ultrasonic welding machine.

Figure 37:
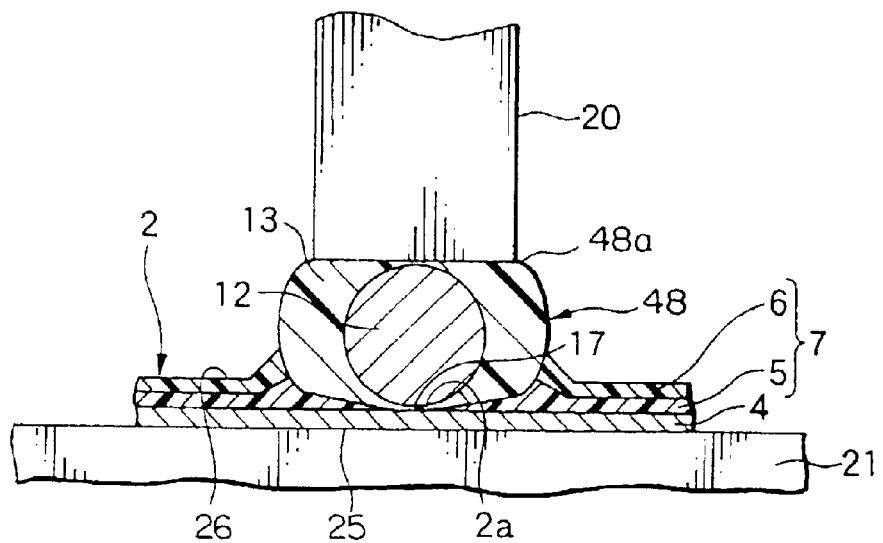
FIG. 37 is a sectional view showing the state after the core of the second electric wire and conductive layer of the ALS have been bonded to each other in the shield harness assembled according to the fifth embodiment of this invention.

As seen from FIGS. 36 and 37, the ultrasonic welding machine includes a tip (tool horn) 20, an anvil 21 opposite to the tip, an oscillating machine (not shown), an oscillator, horn (not shown), etc. With an object to melt sandwiched between the tip 20 and anvil 21 pressurized in a direction of causing the tip 20 and anvil 21 to approach each other, the ultrasonic welding machine oscillates the oscillator by the oscillating machine and gives the oscillation to the tip 20 via the cone and horn. Thus, the ultrasonic welding machine melts the object.

In order to fix the ALS 2 and the second electric wire 48, first, the one end 2a of the ALS 2 is superposed on the anvil 21, the second electric wire 48 is superposed on the ALS 2 and the tip 20 is brought into contact with the second wire 48. Incidentally, at this time, the conductor layer 4, i.e. one surface 25 is brought into contact with the anvil 21 and the second electric wire 48 is superposed on the insulating layer 7, i.e. the other surface 26. Thus, as seen from FIG. 36, the above one end 2a of the ALS 2 and one end 48a of the second electric wire 48 are sandwiched between the tip 20 and anvil 21.

With the tip 20 and anvil 21 pressurized in the direction of causing them to approach each other, the oscillation of the oscillator is given to the tip via the horn. This state is continued for a while. The above oscillation is generated between the ALS 2 and second electric wire 48 so that the insulating layer 7 and cladding 13 are first molten.

Since the tip 20 and anvil 21 have been pressurized in the direction of causing them to approach each other, when the insulating layer 7 and the cladding 13 are molten, they are removed from between the conductive layer 4 and core 12 so that the conductive layer 4 and core 12 are brought into contact with each other. At this time, as seen from FIG. 37, the conductive layer 4 and core 12 are metal-bonded to each other in their solid phase in a non-molten state. Then, the oscillation of the oscillator is stopped.

Since the insulating layer 7 and cladding 13 have been once molten, they are welded to each other. Thus, the conductive layer 4 of the ALS 2 and the core 12 of the second electric wire 48 are bonded to each other by "ultrasonic welding".

Figure 38:
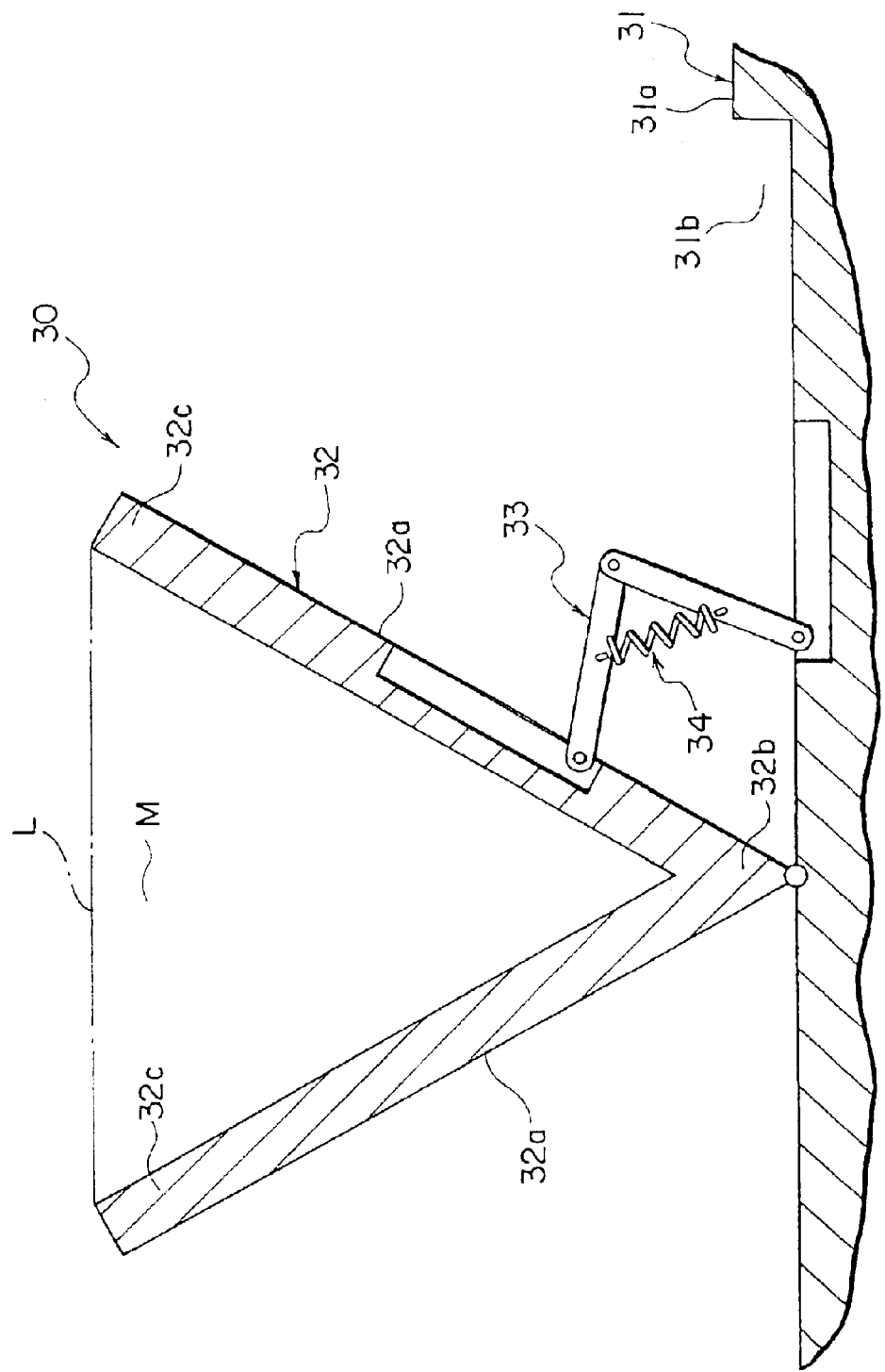
FIG. 38 is a view showing a jig employed to assemble the shield harness according to the fifth embodiment of this invention.

In order to wind the ALS 2 equipped with the second electric wire 48 around the outer periphery of the electric wires 48, a jig 30 as shown in FIG. 38 is employed. As seen from FIG. 38, the jig 30 includes a stand 31, a holding member 32, a link 33 and coil spring 34 serving as an urging means.

The stand 31 is attached to the floor of a factory or an assembling device for assembling the shield harness 1. The stand 31 has a flat upper surface 31a. The stand 31 has a recess 31b recessed from the upper surface 31a. The holding member 32 is attached to the recess 31b.

The holding member 32 is formed in a V-shape in section in such a fashion that the ends of two plates are bonded to each other. The holding member 32 is attached to the recess 31b so that it is rotatable around the apex 32b where the plates 32a intersect each other. When the plate 32a overlies the bottom of the recess 31b, the holding member 32 becomes substantially flush with the upper surface 31a. As the portion of the holding member 32 is further from the apex 32b, the interval between the plates 32a gradually increases. An opening or space M between the ends 32c of the plates 32a is far from the apex 32b of the plates 32a.

Figure 39:
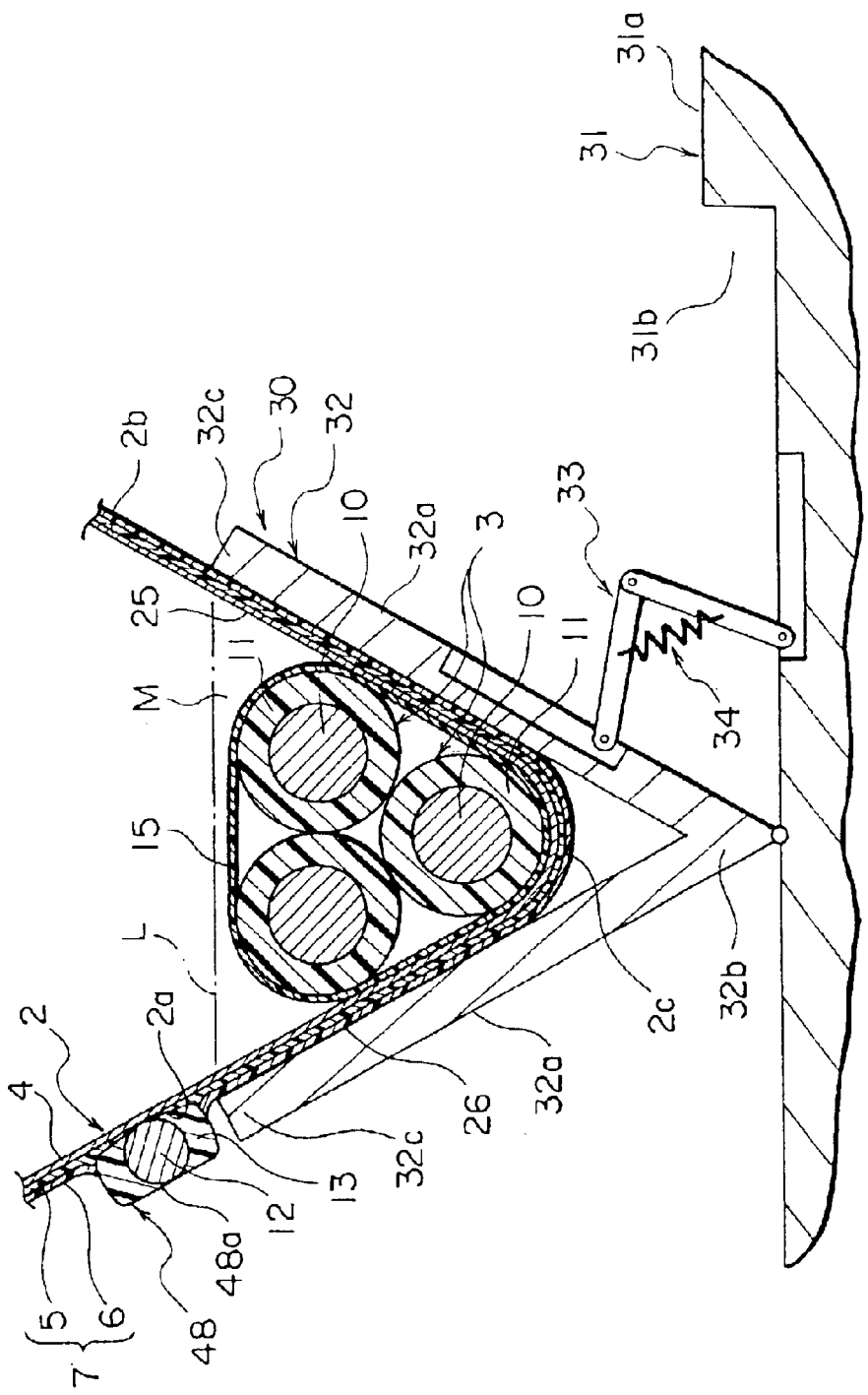
FIG. 39 is a view showing the state where the ALS and a plurality of electric wires are held by the jig shown in FIG. 38.

A link 33 movably supports the holding member 32 between the location where the opening M is far from the stand 31 as shown in FIGS. 38 and 39 and the location where the one plate 32b overlies the bottom of the recess 31b. In the location illustrated in FIGS. 6 and 7, the segment L (indicated by one-dot chain line) connecting the ends 32c of the plate 32a is in parallel to the upper surface 31a. This state is referred to as a state where the opening is far from the stand.

Figure 41:
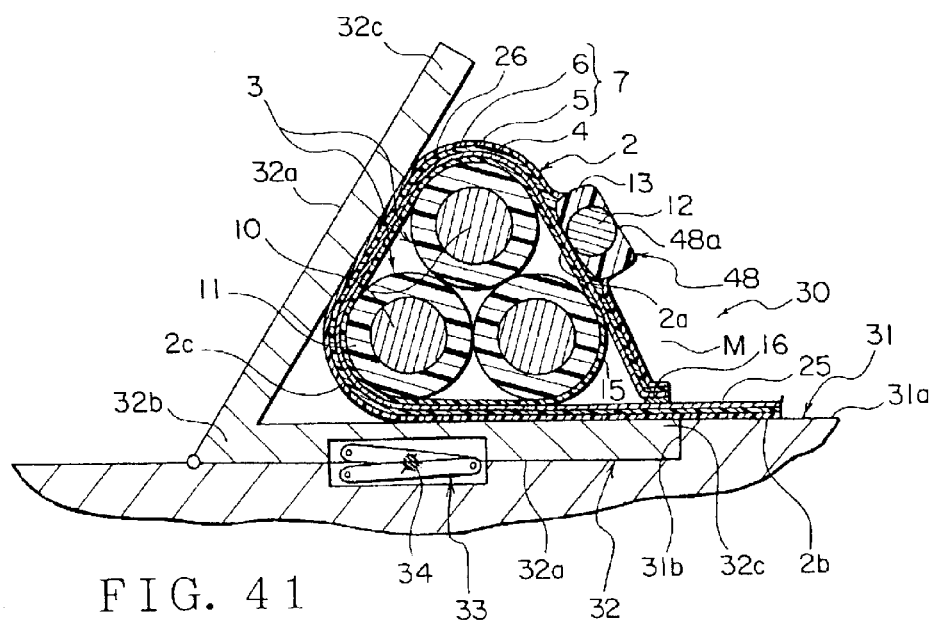
FIG. 41 is a view showing the state where the jig shown in FIG. 40 is brought down on the upper surface of a stand.

The coil spring 34 urges the link 33 from the location of FIGS. 6 and 7 toward the location of FIG. 41. The coil spring 34 holds the link 33 and hence the holding member 32 in a state of FIGS. 38 and 39 by elastic restoring force. Namely, the coil spring 34 holds the holding member 32 in the state where the opening M is far from the stand 31.

In assembling the shield harness 1 having the above configuration, first, the second electric wire 48 is attached to the ALS 2. The plurality of electric wires 3 are bunched in parallel and a tape is wound around the outer periphery of the electric wires 3 thus bunched. Thereafter, using the jig 30, the ALS 2 equipped with the second electric wire 8 will be wound around the outer periphery of the plurality of electric wires 3.

Specifically, the central portion 2c in the width direction of the ALS 2 is placed on the opening M in the jig 30 held at the location using the elastic restoring force of the coil spring 34. In this case, the other surface 26 of the ALS 2 which is the surface of the insulating layer 7 is placed on the jig 30. Since the second electric wire 48 has been attached to the ALS 2, the second electric wire 48 is superposed on the other surface 26 of the ALS 2 at the one end 2a.

Next, the electric wires 48 wound with the tape 15 are superposed on the one surface 25 of the ALS 2 at the center position 2c and inserted between the plates 32a. Thus, the plurality of electric wires 3 and ALS 2 are held by the holding member 32.

Figure 40:
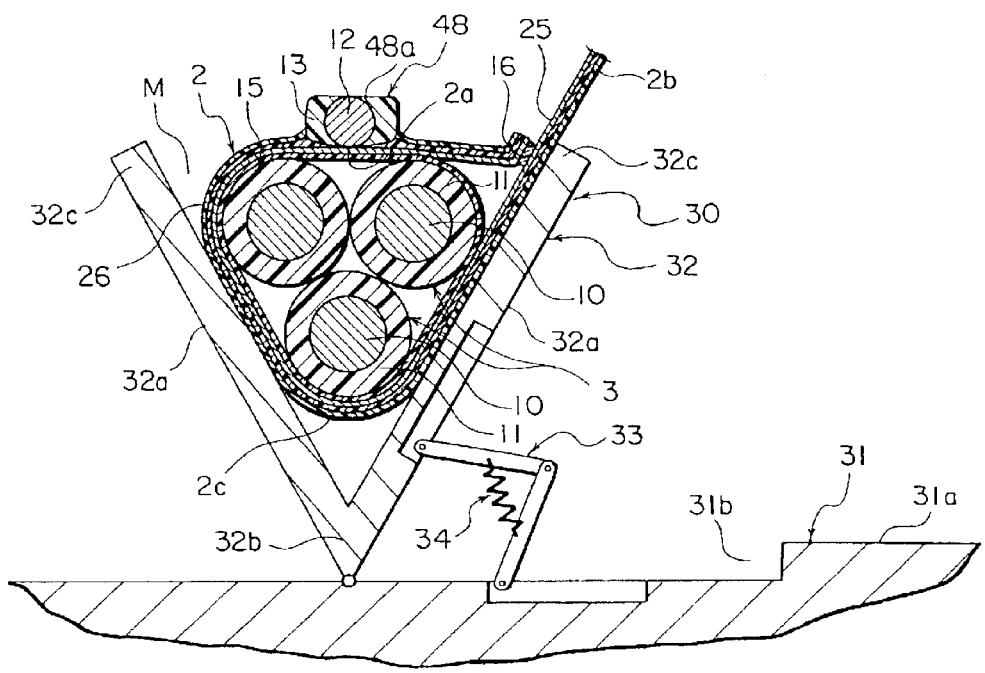
FIG. 40 is a view showing the state where the one end of the ALS held by the jig shown in FIG. 39 is pasted on the other end of the ALS.

Thereafter, as seen from FIG. 40, the one end 2a as well as the second electric wire 48 is superposed on the outer periphery of the electric wires 3, and the both-sided tape 16 pasted on the one end 2a is pasted on the one surface 25 of the ALS 2 at the other end 2b. Thus, the one end 2a superposed on the electric wires 3 is attached to the other end 2b. In this state, as seen from FIG. 41, in order that the one plate 32a is flush with the upper surface 31a of the stand 31, the holding member 32 is brought down toward the upper surface of the stand 31 against the elastic restoring force of the coil spring 34.

Figure 42:
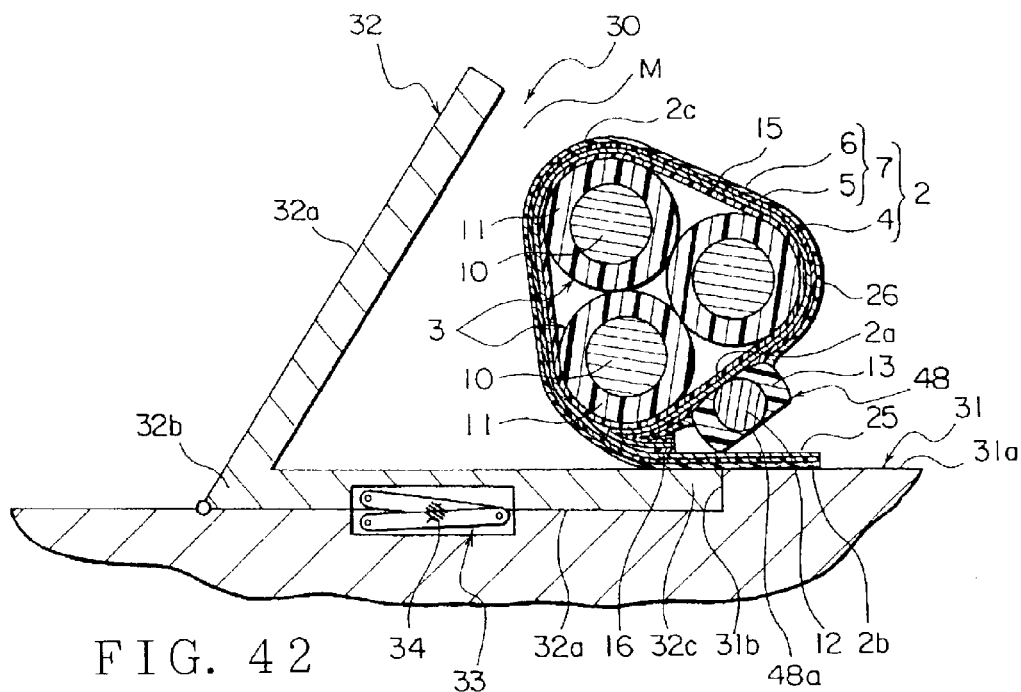
FIG. 42 is a view showing the state where the plurality of electric wires shown in FIG. 41 are rolled onto the other end of the ALS.
Figure 43:
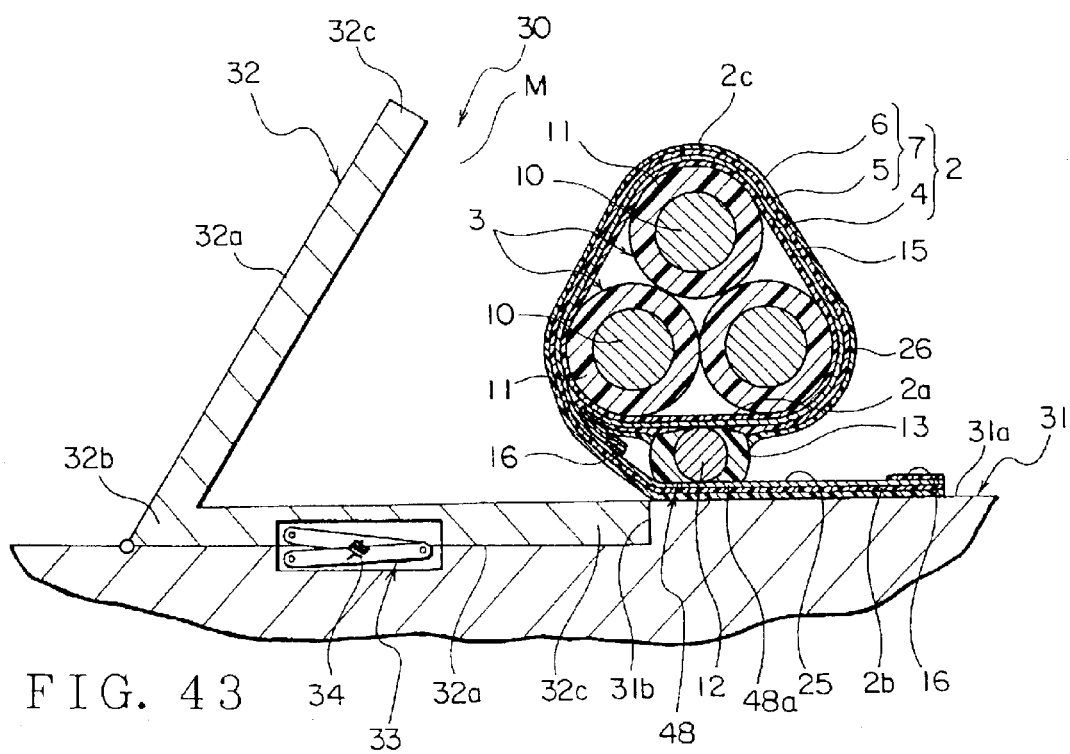
FIG. 43 is a view showing the state where the plurality of electric wires shown in FIG. 42 are further rolled onto the other end of the ALS.
Figure 44:
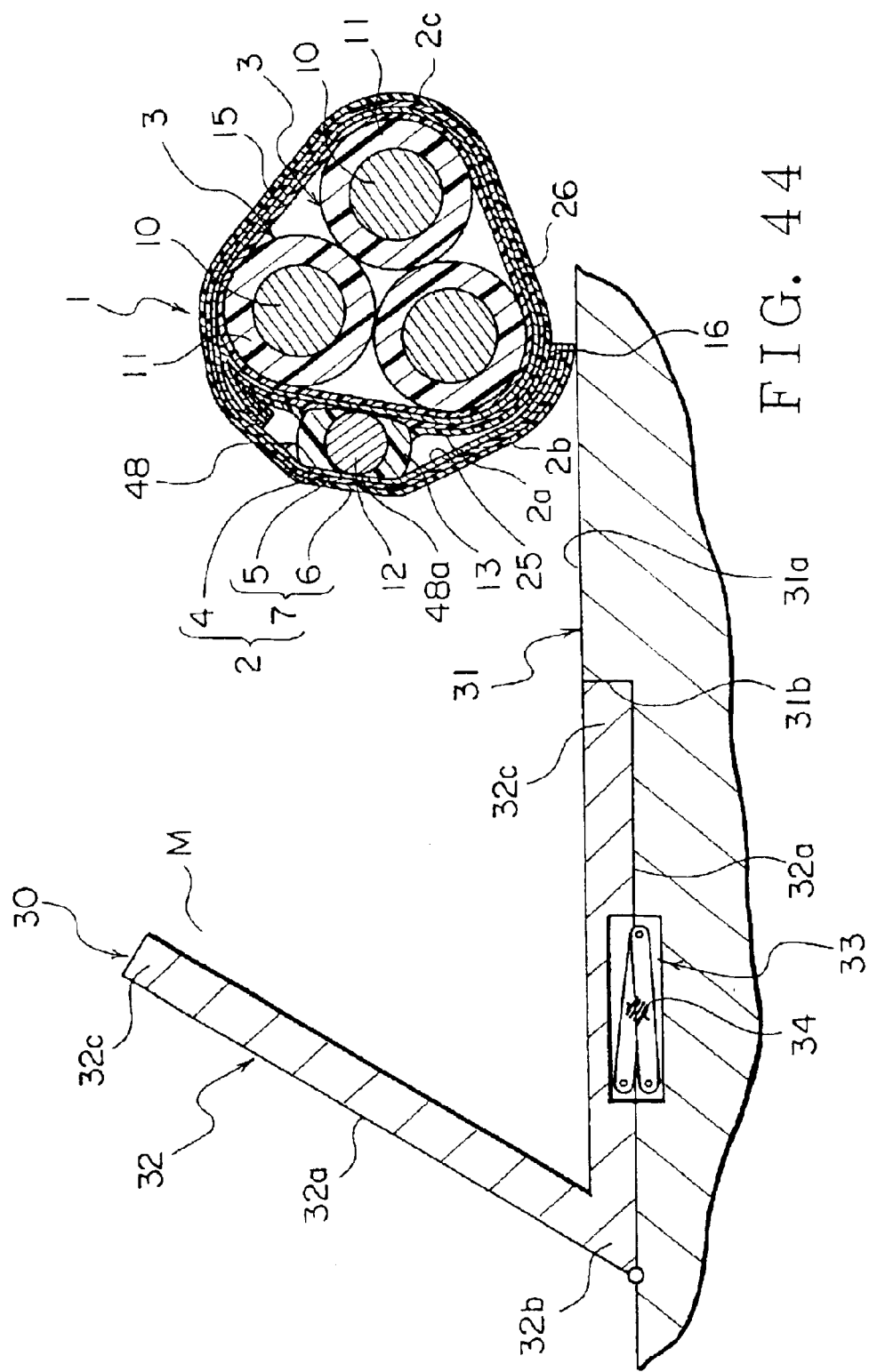
FIG. 44 is a view shown the state where the both-sided tape at the other end of the ALS shown in FIG. 43 is pasted on the other surface of the ALS.

As seen from FIGS. 42 and 43, the bunched electric wires 3 is rolled toward the other end 2b. Accordingly, the both-sided tape 16 at the other end 2b is pasted on the other surface of the ALS 2. Thus, the shield harness having the configuration described above is acquired.

The plurality of shield harnesses 1 thus obtained are combined with one another to constitute a wire harness. The second electric wire 48 bonded to the conductive layer 4 is connected to a desired grounding circuit and others. The shield harness 1 dissipates the noise which tends to invade the core 10 of the electric wire 3 through the conductive layer 4 of the ALS 2 and the core 12 of the second electric wire 48 bonded thereto. Thus, the ALS 2 of the shield harness 1 electrically shields the electric wires 3.

In accordance with this embodiment, with the plurality of electric wires 3 superposed on the ALS 2, they can be held by the jig 30 which includes the holding member 32 having a V shape in section and coil spring 34 which urges the holding member 32 so that its opening M leaves from the stand 31 and holds the holding member 32 in the state where the opening M is far from the stand 31.

Against the elastic restoring force of the coil spring 34, the holding member 32 is brought down toward the stand 31 of the holding member 32. Therefore, the bunched electric wires 3 can be surely rolled onto the other end of the ALS 2.

Therefore, with the second electric wire 48 located between the one end 2a and the other end 2b of the ALS 2, the shield harness 1 can be assembled. In this way, with the one end 2a pasted on (fixed to) the other end 2b, the bunched electric wires 3 are rolled onto the other end 2b so that the ALS 2 can be easily wound on the outer periphery of the electric wires.

The core 42 of the second electric wire 48 and the conductive layer 4 of the ALS 2 are bonded to each other by ultrasonic welding, and the ALS 2 is wound on the outer periphery of the plurality of electric wires 3. The second electric wire 48 can be employed as a drain wire. The core 42 of the second electric wire 48 and the conductive layer 4 are bonded to each other by the ultrasonic welding, they are bonded without using any specific component which is separate from the second electric wire 48 and the ALS 2. This contributes to prevent an increase in the number of components.

Since an increase in the number of components of the shield harness 1 can be prevented, the production cost of the wire harness assembled using the shield harnesses can be suppressed.

Since the core 12 of the second electric wire 48 and the conductive layer 4 of the ALS 2 are bonded to each other by the ultrasonic welding, they can be surely metallic-bonded to each other. Therefore, they are surely electrically connected to each other. Accordingly, the shield harness 1 can surely dissipate the noise which tends to invade the core 10 of the electric wire 3 through the conductive layer 4 of the ALS 2 and the core 12 of the second electric wire 48 bonded thereto.

Since the conductive layer 4 of the ALS 2 and the core 12 of the second electric wire 48 are bonded to each other by the ultrasonic welding, the insulating layer 7 at the one end 2a and the cladding 13 at the one end 48a are molten and removed from between the conductive layer 4 and the core 12. Since they are not required to be removed separately, the number of man-hours in assembling can be prevented from being increased. The production cost of the shield harness and wire harness equipped with the shield harnesses can be surely suppressed.

With the conductive layer 4 located inside and the insulating layer 7 located outside, the ALS 2 is wound on the outer periphery of the plurality of electric wires 3. Therefore, the ALS 2 and hence the second electric wire 48 serving as the drain wire can be prevented from short-circuited to the other electric wire or the electronic component outside the shield harness 1.

Since the core 12 of the second electric wire 48 is formed to have a round shape in section, the force which causes the tip 20 and anvil 21 to approach each other is concentrated on the position where the ALS 2 and the second electric wire 48 are in contact with each other. Therefore, the insulating layer 7 and cladding 13 which have molten are removed swiftly from between the conductive layer 4 and the core 12. Thus, the conductive layer 4 and the core 12 are surely bonded. Accordingly, the noise which tends to invade the electric wire 3 can be surely dissipated outwardly from the shield harness 1 through the second electric wire 48.

After a plurality of electric wires 3 have been superposed on the central portion of the ALS 2, the one end 2a is pasted on the other end 2b and the bunched electric wires 3 is rolled onto the other end 2b. Therefore, the second electric wire 48 is sandwiched between the one end 2a and the other end 2b.

In this embodiment, the ALS 2 made of aluminum or aluminum alloy was used as the conductive thin film sheet. However, in place of the ALS, the conductive thin film sheet made of copper or copper alloy other than aluminum or aluminum alloy may be adopted.

In this embodiment, the plurality of electric wires 3 each round-shaped in section are bunched. However, a flat cable, such as a flexible flat cable (FFC) in which conductors each square-shaped in section are arranged or a flexible printed circuit (EPC), may be adopted.

In this embodiment, the core 12 and conductive layer 4 were bonded at the single point 87. However, in order to enhance the mechanical strength for fixing the core 12 and the conductive layer 4, the core 12 and the conductive layer 4 may be bonded at plural points.

In this embodiment, the second electric wire 48 which is used as the drain wire is a coated or cladded electric wire. However, in this invention, it should not be limited to it, but may be only the core 12. Further, in this embodiment, the ALS 2 is composed of the conductive layer 4 and the insulating layer 7. However, it should not be limited to it, but may be a conductive thin film sheet equipped with only the conductive layer 4.

In the shield harness 1 which is composed of the drain wire of the core 12 and the conductive thin film sheet equipped with only the conductive layer 4, the core 12 and conductive layer 4 are not necessarily required to be bonded. The reason is as follows. After the plurality of electric wires 3 have been superposed on the central portion 2c of the ALS 2, the one end 2a is pasted on the other end 2b and the plurality of electric wires 3 are rolled onto the other end 2b. Therefore, the second electric wire 48 is sandwiched between both ends 2a and 2b.

Thus, the core 12 and the conductive layer 4 are surely brought into contact with each other. Accordingly, the noise which tends to invade the core 10 of each electric wire 3 can be surely extracted through the conductive layer 4 of the ALS 2 and the second electric wire 48.

What is claimed is:

1. A device to be wound around an outer periphery of electric wires; the device comprising:
    a single conductive thin film sheet further comprising a conductive layer and an insulating layer laminated together substantially over an entire area of said conductive thin film sheet; and
    a conductive metallic piece bonded onto said conductive layer;
    wherein said conductive thin film sheet is wound around an outer periphery of electric wires; and
    said metallic piece is shaped like a belt and a length of said metallic piece extends transverse to a longitudinal direction of the electric wires when said conductive thin film sheet is wound around the outer periphery of the electric wires.

2. The device according to claim 1, wherein said metallic pieces are located at both ends of said conductive thin film sheet, respectively which are spaced apart from each other in the longitudinal direction of the electric wires when said conductive thin film sheet is wound around the outer periphery of the electric wires.

3. A method of manufacturing the device according to claim 2, comprising the step of:
    subjecting said insulating layer and said metallic piece superposed on each other to ultrasonic welding so that said conductive layer of said conductive thin film sheet and said metallic piece are bonded to each other.

4. The device according to claim 1, wherein said conductive thin film sheet is wound around the outer periphery of the electric wires in such a fashion that said conductive layer is located inside and said insulating layer is located outside.

5. The device according to claim 1, wherein said metallic piece is superposed on said insulating layer and also partially bonded to said conductive layer.

6. The device according to claim 1, wherein said conductive layer is extended from an edge of said adhesive on the side of other end in the widthwise direction to said other end of said insulating layer.

7. A conductive thin film sheet to be wound around an electric wire for preventing noise from invading the electric wire, the conductive thin film sheet comprising:
    an insulating layer;

an adhesive formed on a first surface of said insulating layer and at one end of said insulating layer in a widthwise direction;

a conductive layer stacked on said first surface of said insulating layer at a second end of said insulating layer in the widthwise direction;

a second surface of said insulating layer, opposite to said first surface, lacking any additional layer of adhesive or conductive material;

wherein the conductive thin film sheet is wound around said electric wire in a circumferential direction with said one end covering said second end from outside and said adhesive is pasted on the other surface of said insulating layer.

8. The conductive thin film sheet according to claim 7, wherein said conductive layer has a thickness equal to that of said adhesive.

9. A shield harness comprising:

a plurality of electric wires arranged in parallel; and a conductive thin film sheet to be wound around the outer periphery of the plurality of electric wires to prevent noise from invading them, wherein said conductive thin film sheet includes an insulating layer;

an adhesive formed on a first surface of said insulating layer and at one end of said insulating layer in a widthwise direction;

a conductive layer stacked on said first surface of said insulating layer at a second end of said insulating layer in the widthwise direction;

a second surface of said insulating layer, opposite to said first surface, lacking any additional layer of adhesive or conductive material;

wherein the conductive thin film sheet is wound around said electric wire in a circumferential direction with said one end covering said second end from outside and said adhesive is pasted on the other surface of said insulating layer.

10. The shield harness according to claim 9, wherein said conductive layer is extended from an edge of said adhesive on the side of other end in the widthwise direction to said other end of said insulating layer.

11. The shield harness according to claim 9, wherein said conductive layer has a thickness equal to that of said adhesive.

12. A shield harness comprising:

a plurality of first electric wires arranged in parallel;

a conductive thin film sheet having a conductive layer;

a second electric wire composed of a conductive core and a cladding which dads the core, wherein said plurality of first electric wires are bunched, the conductive layer at one end in the width direction of said conductive thin film sheet and the core of said second electric wire are bonded to each other, and with the one end of said conductive thin film sheet located inside and the other end thereof located outside and both ends superposed on each other, said conductive thin film sheet is wound on an outer periphery of the plurality of first electric wires.

13. The shield harness according to claim 12, wherein said other end is superposed on an outside of said second electric wire.

14. The shield harness according to claim 12, wherein said conductive thin film sheet includes an insulating layer stacked on said conductive layer, and with the conductive layer located inside and insulating layer located outside, said conductive thin film sheet is wound on the outer periphery of the plurality of first electric wires.

15. The method of manufacturing a shield harness according to claim 12, comprising the steps of:

subjecting said insulating layer and said second electric wire superposed on each other to ultrasonic welding so that said conductive layer of said conductive thin film sheet and the core of said second electric wire are bonded to each other; and with said conductive layer of the conductive thin film sheet located inside and said insulating layer located outside, winding said thin film conductive sheet on the outer periphery of said plurality of first electric wires continuously from the one end of the thin film conductive sheet to the other end thereof.

16. A shield harness comprising:

a plurality of first electric wires arranged in parallel;

a conductive thin film sheet having a conductive layer;

a second electric wire composed of a conductive core and a cladding which dads the core, wherein said plurality of first electric wires are bunched, said conductive thin film sheet is wound on an outer periphery of the plurality of first electric wires, and the conductive layer of said conductive thin film sheet and the core of said second electric wire are bonded to each other.

17. The shield harness according to claim 16, wherein said conductive thin film sheet includes an insulating layer stacked on said conductive layer, and with the conductive layer located inside and insulating layer located outside, said conductive thin film sheet is wound on the outer periphery of the plurality of first electric wires.

18. A method of manufacturing a shield harness according to claim 17, comprising the steps of:

subjecting said insulating layer and said second electric wire superposed on each other to ultrasonic welding so that said conductive layer of said conductive thin film sheet and the core of said second electric wire are bonded to each other; and with said conductive layer of the conductive thin film sheet located inside and said insulating layer located outside, winding said thin film conductive sheet on the outer periphery of said plurality of first electric wires.

19. A method for assembling a shield harness by winding a conductive thin film sheet having a conductive layer on an outer periphery of a plurality of electric wires arranged in parallel, comprising the steps of:

holding said conductive thin film sheet and said plurality of electric wires by a holding portion so that said plurality of electric wires are superposed on the one surface of said thin film conductive sheet at a central portion in a width direction of the conductive thin film sheet, and a conductive wire is superposed on the other surface of said conductive thin film sheet at one end thereof in the width direction;

superposing said one end as well as said conductive wire on said plurality of electric wires and attaching said one end to the other end in the width direction of said conductive thin film sheet; and rolling said plurality of first electric wires onto said other end so that said other end is attached on the other surface of said conductive thin film sheet.

20. A method for assembling a shield harness by winding a conductive thin film sheet having a conductive layer on an outer periphery of a plurality of electric wires arranged in parallel using a jig including a stand, a holding portion formed in a V-shape in section which is rotatably supported on said stand, and an urging means which urges said holding portion in a direction of leaving its opening from said stand and supports said holding portion in a state where the opening has left from said stand, comprising the steps: comprising the steps of:

holding said conductive thin film sheet and said plurality of electric wires so that said thin film conductive sheet is placed in said opening, said plurality of electric wires are superposed on the one surface of said thin film conductive sheet at a central portion in a width direction of the conductive thin film sheet, and a second electric wire is superposed on the other surface of said thin film conductive sheet at one end thereof in the width direction;

superposing said one end as well as said conductive wire on said plurality of electric wires and attaching said one end to the other end in the width direction of said conductive thin film sheet; and bringing said holding portion toward said stand by said urging means against elastic restoring force of said urging means and rolling said plurality of wires onto said other end so that said other end is attached on the other surface of said conductive thin film sheet;

wherein said conductive layer and said second electric wire are bonded to each other.

21. The method of assembling a shield harness according to claim 20, wherein said conductive thin film sheet has an insulating layer stacked on said conductive layer, said second electric wire is coated with a cladding, and with said conductive layer located on the one surface of said conductive thin film sheet and said insulating layer located on the other surface thereof, said insulating layer and said cladding are welded to each other at a position where said conductive layer and the cladding are bonded.

* * * * *